US008521432B2

(12) United States Patent
Ju

(10) Patent No.: US 8,521,432 B2
(45) Date of Patent: Aug. 27, 2013

(54) PERFORMANCE ASSESSMENT SYSTEM FOR DEEP GEOLOGIC REPOSITORY FOR RADIOACTIVE WASTE DISPOSAL

(75) Inventor: Shin-Jon Ju, Taoyuan (TW)

(73) Assignee: Institute of Nuclear Energy Research Atomic Energy Council, Taoyuan County (TW)

( * ) Notice: Subject to any disclaimer, the term of this patent is extended or adjusted under 35 U.S.C. 154(b) by 468 days.

(21) Appl. No.: 12/727,388

(22) Filed: Mar. 19, 2010

(65) Prior Publication Data

US 2010/0241356 A1 Sep. 23, 2010

(30) Foreign Application Priority Data

Mar. 19, 2009 (TW) ............................ 098108861 A

(51) Int. Cl.
*G01V 5/04* (2006.01)

(52) U.S. Cl.
USPC ...................... 702/8; 702/2; 702/81; 702/123

(58) Field of Classification Search
USPC ................. 702/2, 8, 40, 49, 81, 83, 123, 134, 702/182
See application file for complete search history.

(56) References Cited

U.S. PATENT DOCUMENTS 3,597,596 A * 8/1971 Lawless et al. ............... 250/362
4,483,816 A * 11/1984 Caldwell et al. .............. 376/158
4,950,105 A * 8/1990 Meess et al. ............. 405/129.57
4,977,529 A * 12/1990 Gregg et al. .................... 703/18
5,649,894 A * 7/1997 White et al. .................. 588/256
6,002,063 A * 12/1999 Bilak et al. ...................... 588/17
7,855,375 B2 * 12/2010 Kearfott ..................... 250/484.3

* cited by examiner

*Primary Examiner* — Mohamed Charioui
*Assistant Examiner* — Paul D Lee
(74) *Attorney, Agent, or Firm* — WPAT, PC; Justin King

(57) ABSTRACT

A performance assessment system for deep geologic repository for radioactive waste disposal is introduced to integrate a number of independent sub-system to perform the repository assessments in a systematic way under computer-based environment. Basically, the sub-system includes the input data file preparation sub-system for near-field/far-field multiple running, the near-field/far-field multiple running sub-system and the uncertainty and sensitivity analysis sub-system. With the system, the assessment for the deep geologic repository for radioactive waste disposal in many aspects can be achieved more completely and precisely.

13 Claims, 66 Drawing Sheets

PERFORMANCE ASSESSMENT SYSTEM FOR DEEP GEOLOGIC REPOSITORY FOR RADIOACTIVE WASTE DISPOSAL

TECHNICAL FIELD

The present invention generally relates to a performance assessment system of a deep geologic repository for the radioactive waste disposal, more particularly, to a system of assessing the long-term resistance function of the nuclide transportation before the actual construction and operation of the final deep geologic repository for the radioactive waste disposal.

TECHNICAL BACKGROUND

As FIG. 1 shows, the concept of the radioactive waste deep geologic repository equipped with the multiple barriers that has been considered as the most feasible and reliable final disposal method for the radioactive waste globally. Radioactive waste shall be long-term and permanently isolated from the biosphere, thus it sets the multiple barrier system to dispose the radioactive waste. Basically speaking, the multiple barrier system is composed of the engineered barrier and natural barrier systems, which can be used to retard the release and transportation of the radioactive nuclides in order to ensure the safety and reliability of the final repository; therefore, before actual construction and operation of the final repository, the long-term retarding function of the nuclide transportation shall be precisely and completely assessed in advance.

In addition, the construction of the multiple barrier system will expend considerable resources (time and money), and the isolation effect between the radioactive waste and biosphere after completing the construction will acutely affect human living and life in the future; therefore, the assessment process has become extremely important before actual construction of the repository.

Presently, in the field of disposing radioactive waste, there is not yet a professional and complete assessment system which can precisely and completely assess the isolation effect between the buried and disposed radioactive waste and the biosphere in order to be the basis of constructing the final repository for the radioactive waste disposal.

The invention of the radioactive waste deep geologic repository performance assessment system provides a precise and complete assessment direction for assuring the safety and reliability of the radioactive waste final repository, which can precisely assess the long-term retarding function of nuclide transportation and the isolation effect between the radioactive waste and the biosphere before actually constructing and operating the radioactive waste final repository; in addition, it is undoubtedly an optimal solution in the field of assessing the radioactive waste disposal.

TECHNICAL SUMMARY

The main purpose of the invention is to provide a performance assessment system for supplying complete assessment information on the long-term retarding effect of the radioactive waste nuclide transportation before actually constructing and operating the radioactive waste final repository for the radioactive waste deep geologic repository.

DETAILED DESCRIPTION OF EXEMPLIFICATION

The system, in order to assure the safety and reliability of the radioactive waste final repository, will thus propose a precise and complete assessment solution for the long-term retarding function of the nuclide transportation before actually constructing and operating the final repository.

The function assessment of the radioactive waste final repository is a difficult process which involves numerous influential factors, such as the geologic heterogeneity of rock and the geographic environment change in a long period of time; in addition, as for many factors (or can be called as the parameter or variable) of affecting the isolation function of the repository, their values certainly are unable to be ascertained; thus, when assessing the function of a repository, it is usually common to set each factor's value as a certain reasonable distribution pattern and scope, and by means of the parameter sampling to conduct multiple computer calculations, to use the uncertainty and parameter sensitivity analysis, such as Monte Carlo assessment process and technique, to dispose then.

According to the path of transporting the radioactive nuclide, the total system function assessment of the repository can be divided into various sub-systems, such as the near-field transportation, far-field transportation (or entitled as the geological migration) and the biosphere transportation to carry out the assessment. The near-field transportation assessment includes how the nuclide can be transported by passing through those barriers: the waste form, waste canister, buffered material layer, backfilled layer, and the excavation disturbed zone (EDZ), etc., (collectively entitled as the engineered barrier system, EBS); as for the far-field transportation assessment, it shall be assessed as how the nuclide can be penetrated through the host rock to transport to human's living environments; and as for the biosphere transportation assessment, it shall be assessed as how the nuclide can reach to the human body by means of drinking well water and the food-chain of the biosphere.

Figure 1:
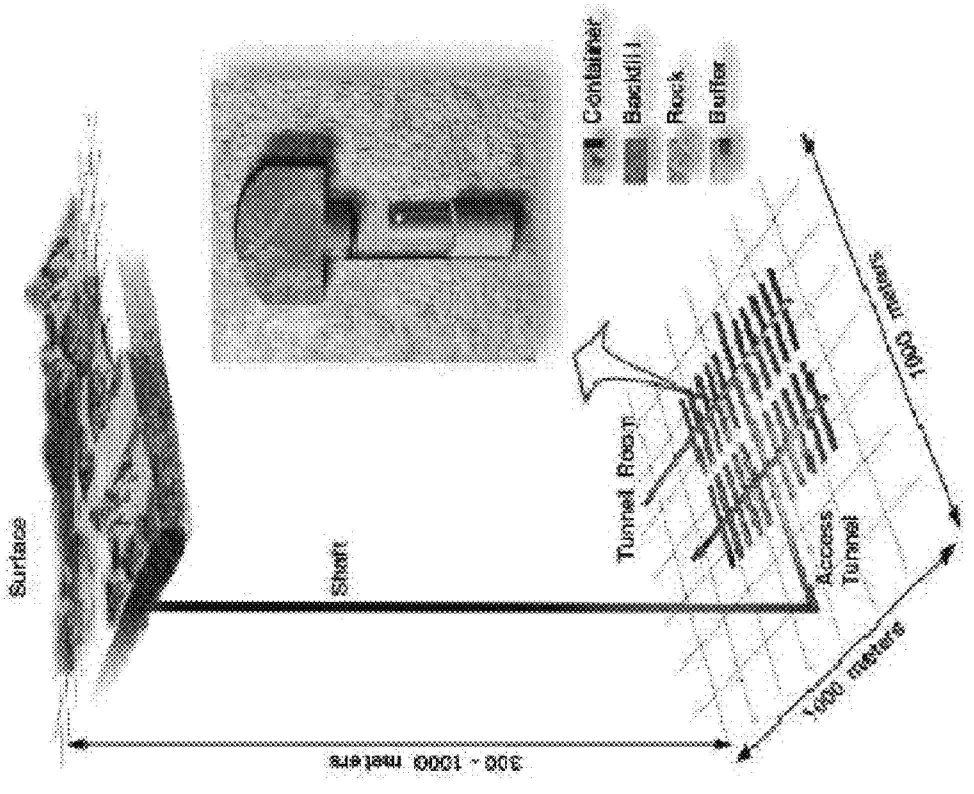
FIG. 1 is the conceptual diagram of the radioactive waste deep geologic repository which is equipped with the multiple barriers.
Figure 2:
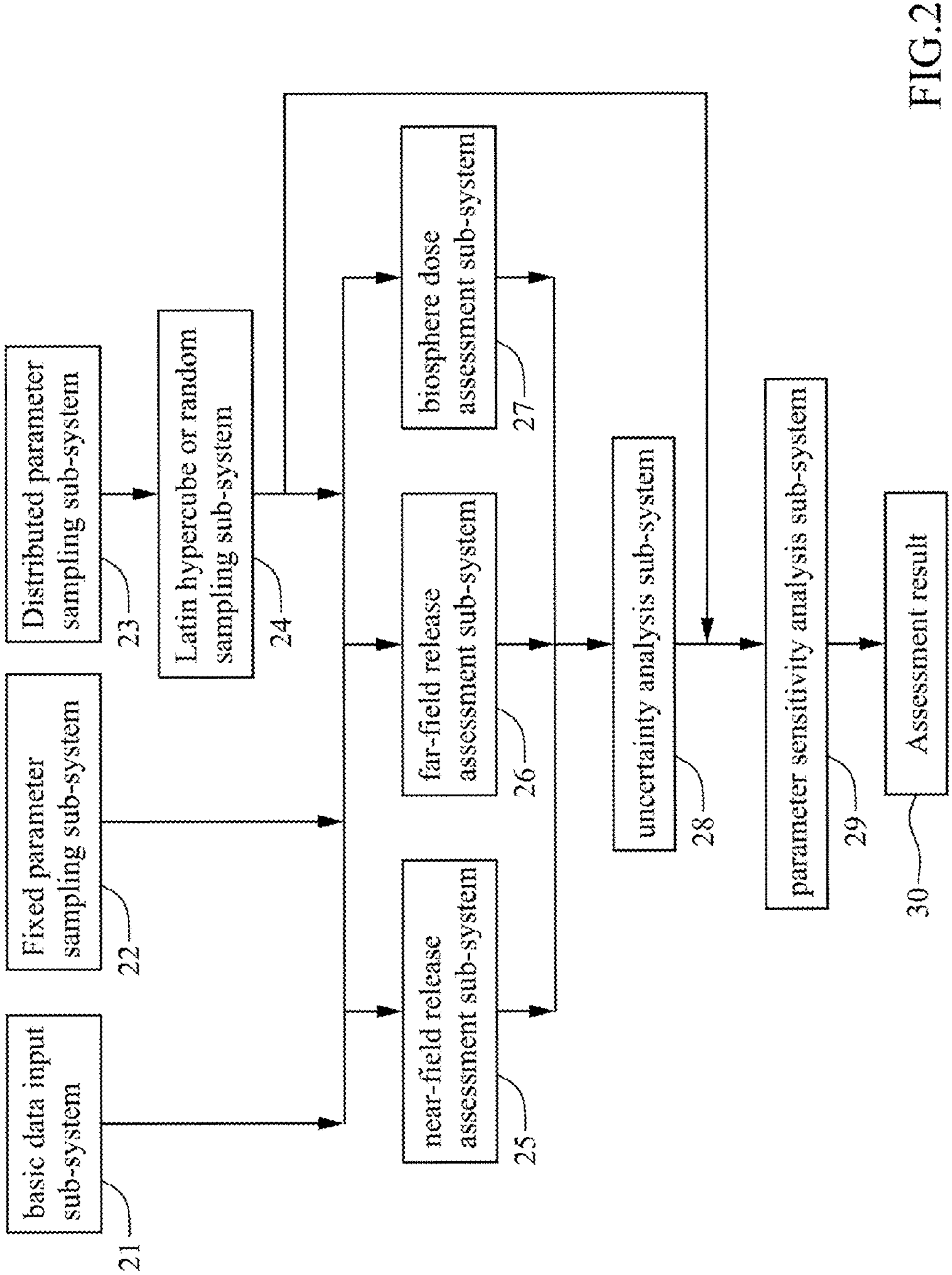
FIG. 2 is the main framework of the invention for the radioactive waste deep geologic repository performance assessment system (hereinafter referred to as the system).

Please refer to FIG. 2, which is a main framework figure of the system. From FIG. 2, we know that the system has included 9 major sub-systems: the basic data input sub-system 21, fixed parameter setting sub-system 22, distributive parameter sampling sub-system 23, Latin hypercube or random sampling sub-system 24, near-field release assessment sub-system 25, far-field release assessment sub-system 26, biosphere dose assessment sub-system 27, uncertainty analysis sub-system 28 and sensitivity analysis sub-system 29.

Figure 3A:
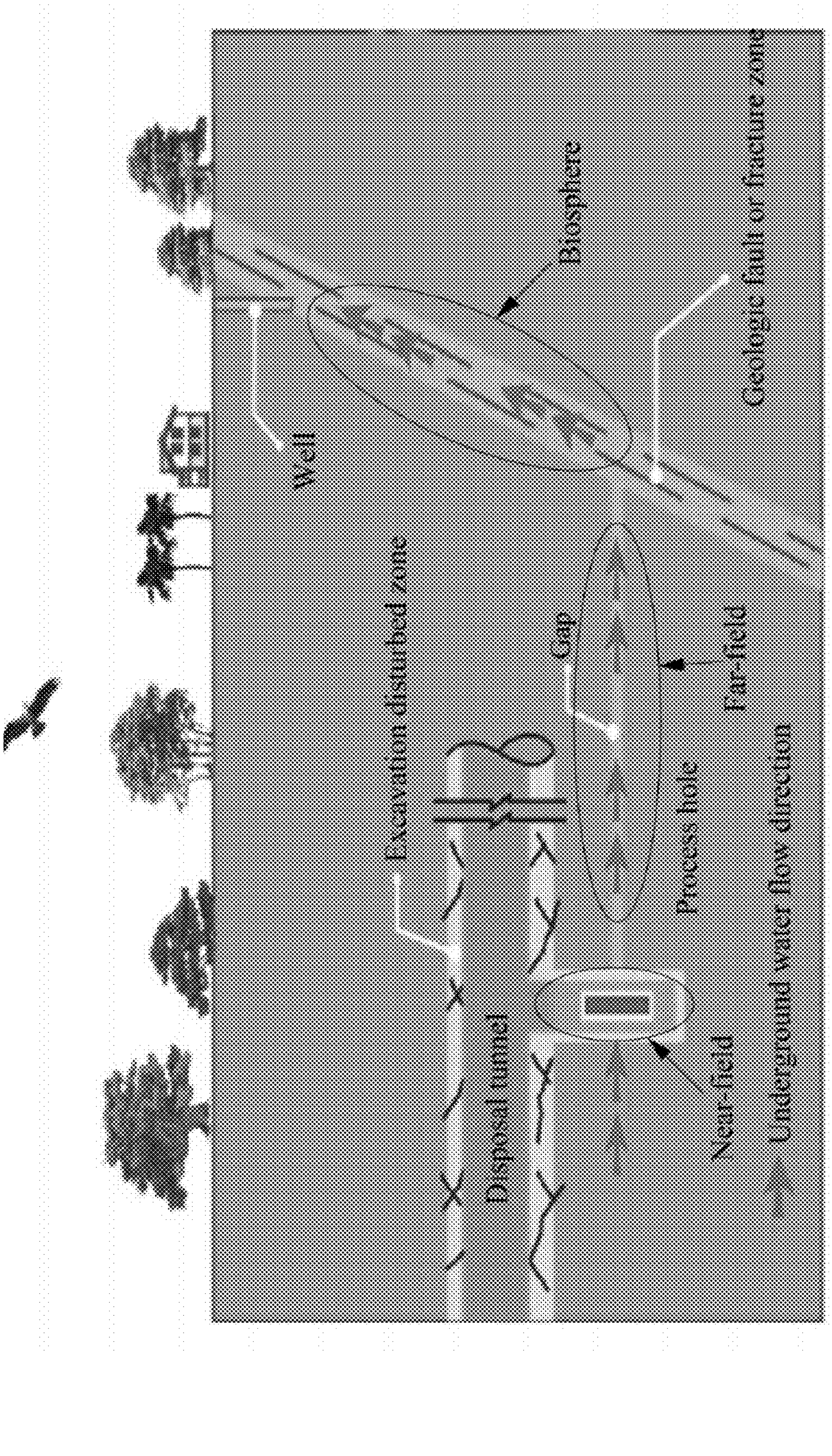
FIG. 3A is the diagram of the analytic and applied scope for the system's near-field release assessment sub-system, far-field release assessment sub-system and biosphere dose assessment sub-system.
Figure 3B:
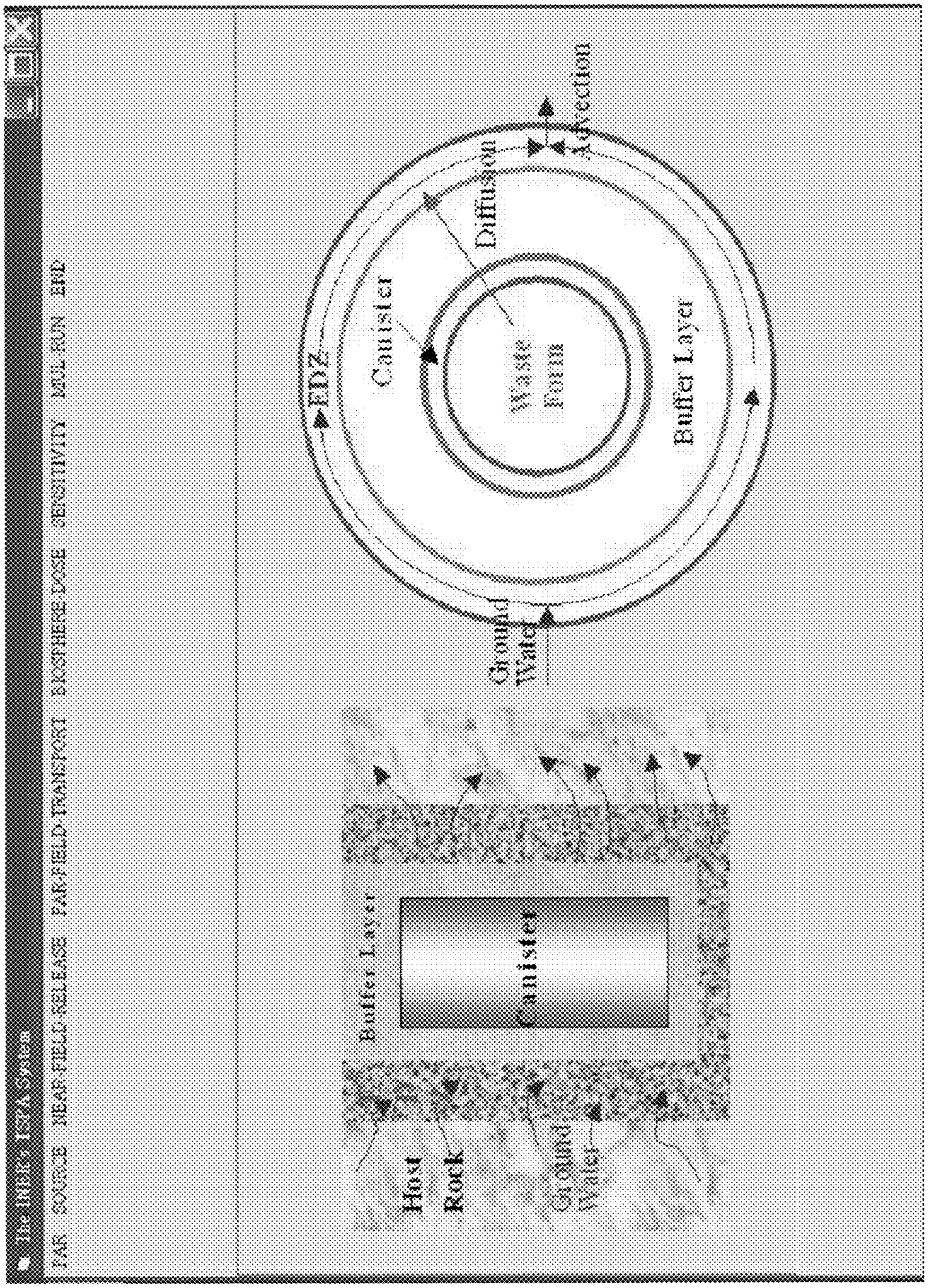
FIG. 3B is the conceptual diagram of transportation for the system's near-field release assessment sub-system near-field.
Figure 3C:
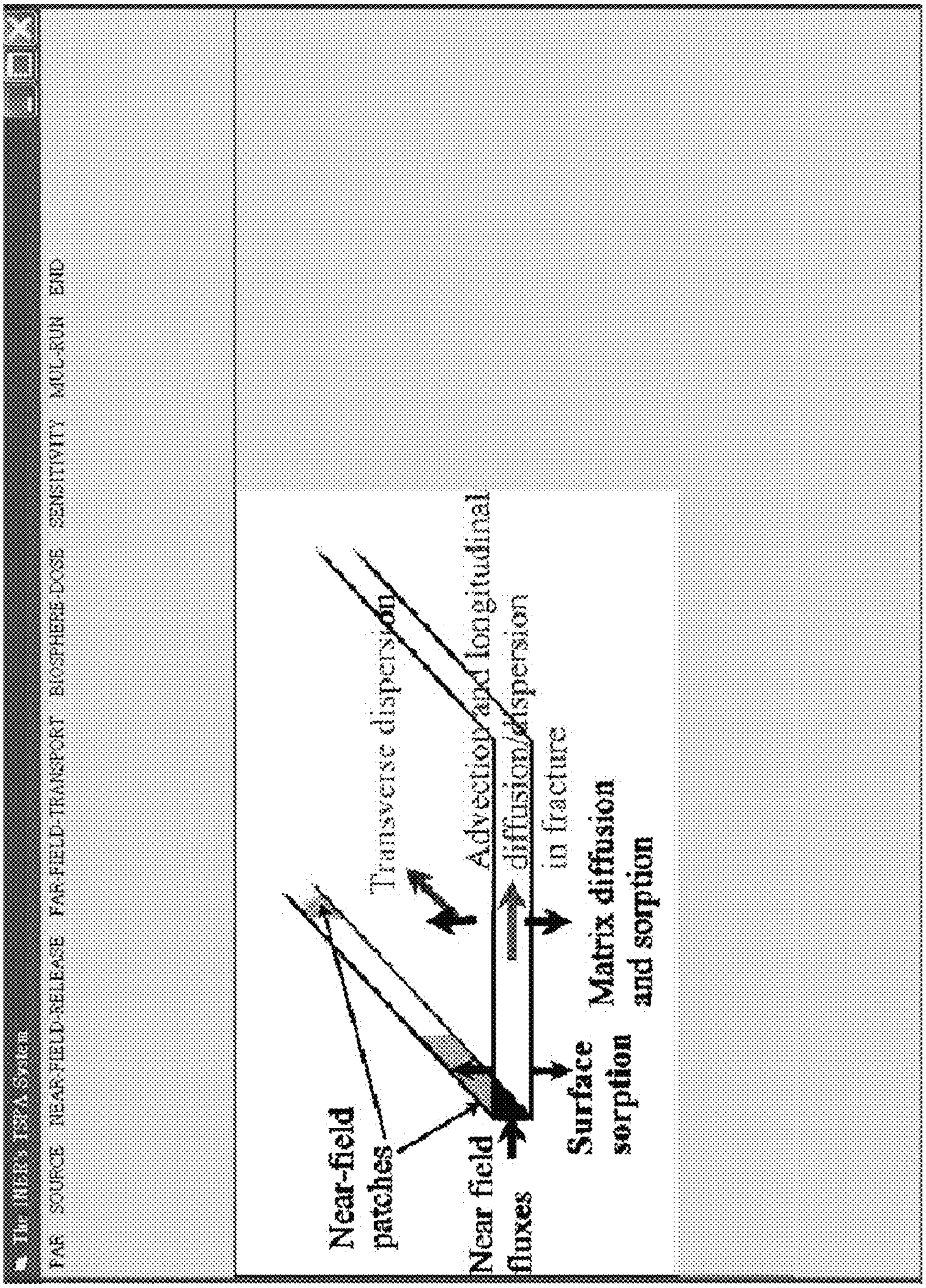
FIG. 3C is the conceptual diagram of transportation for the system's far-field release assessment sub-system far-field.

Among which, the scope of analytic application for the near-field release assessment sub-system, far-field release assessment sub-system and the biosphere dose assessment sub-system will be shown in FIG. 3A; the concept of near-field transportation will be shown in FIG. 3, and the idea of the far-field transportation will be shown in FIG. 3 C.

In addition, the uncertainty and sensitivity analysis sub-systems include two sets of sampling techniques: Latin Hypercube Sampling and Random Sampling, for further application, adopt the Stepwise Regression Analysis technique to conduct the analysis of the parameter sensitivity.

Figure 4A:
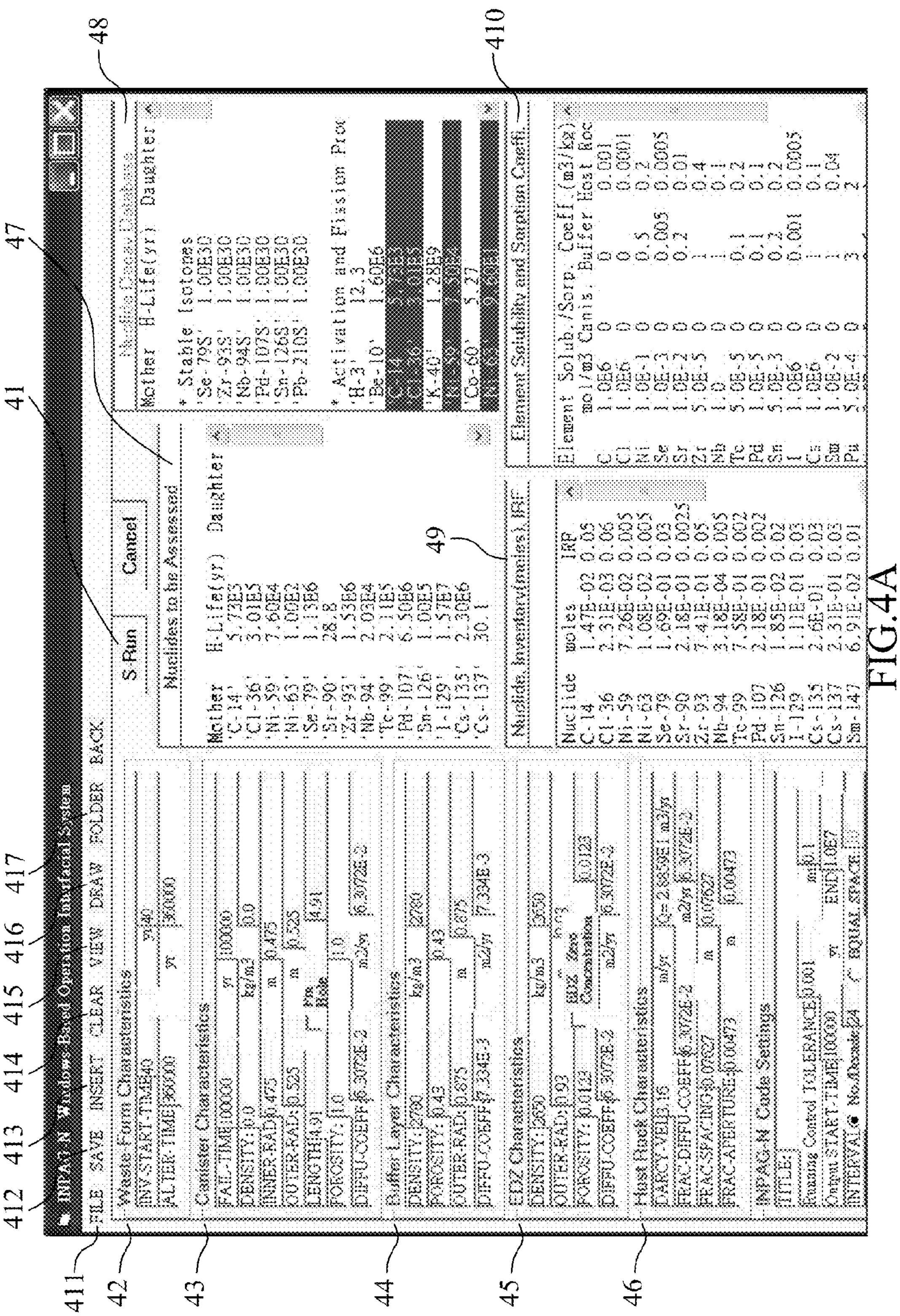
FIG. 4A is the diagram of near-field release assessment data input sub-system for the system's basic data input sub-system.

Herein described the functions of these 9 major sub-systems that are contained in the system as follows; first of all, please refer to FIG. 4A, FIG. 4B and FIG. 4C. FIG. 4A is the figure of the near-field release assessment data input sub-system in the system's basic data input sub-system, and from it we can know that the input data of the near-field release assessment data input sub-system includes:

(1). Waste property data 42 includes the data of the starting time of inventory and the time of complete dissolution of the waste form;

(2). Waste canister property data 43 includes the data of life-span, corrosion product density, inner radius, outer radius, length, corrosion product porosity, and diffusion coefficient in the corrosion product;

(3). Buffered layer property data 44 includes the data of density, porosity, outer radius, and diffusion coefficient;

(4). Excavation disturbed zone (EDZ) property data 45 includes the data of rock density, outer radius, porosity and diffusion coefficient;

(5). Host rock property data 46 includes the data of Darcy flow rate, fracture diffusion coefficient, fracture spacing, fracture opening;

(6). Title of released nuclide, half-life and decay phase data 47;

(7). Host nuclide, half-life and sub-nuclide data 48;

(8). Nuclide title, inventory and Instant Release Fraction (IRF) data 49; and (9). Chemical element solubility and sorption coefficient data 410.

Figure 4B:
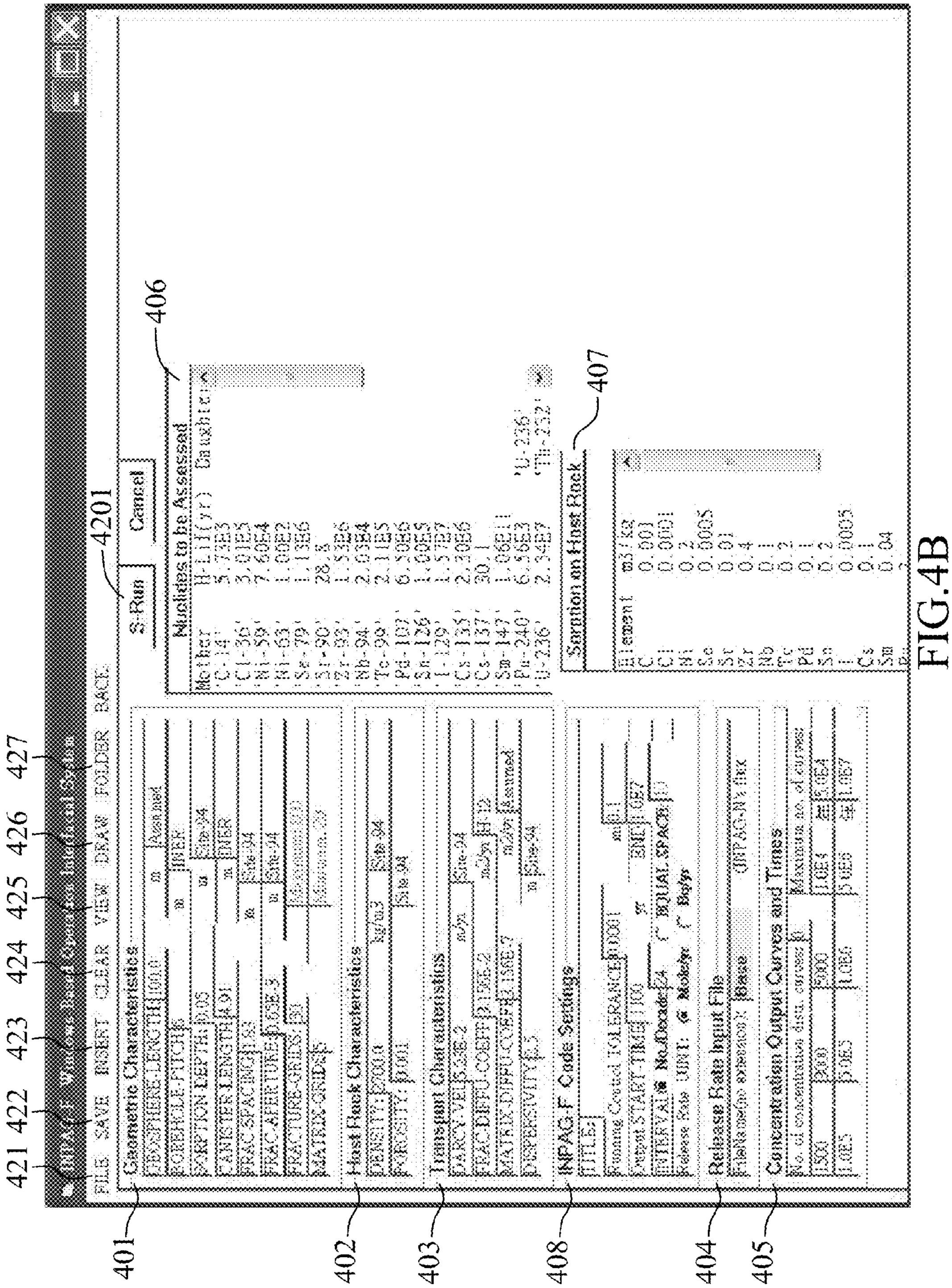
FIG. 4B is the diagram of the far-field release assessment data input sub-system for the system's basic data input sub-system.

Please also refer to FIG. 4B, which is the figure of the far-field release assessment data input sub-system in the system's basic data input sub-system, from FIG. 4B we can know that the input data by the far-field release assessment data input sub-system includes:

(1). Geometric property data 401 includes the data of the geological transportation distance, waste pit spacing, nuclide sorption coefficient, fracture surface sorption depth, waste canister length, fracture spacing, fracture opening, fracture transportation division number, and rock mass diffusion division number;

(2). Host rock property data 402 includes the data of the density and porosity data; (3). Transportation property data 403 includes the data of Darcy flow rate, fracture diffusion coefficient, rock mass diffusion coefficient, and the dispersivity;

(4). Nuclide flux input data 404;

(5). Nuclide concentration output time 405;

(6). Release rate assessment of the nuclide decay chain data 406, which includes the data of host nuclide, half-life and sub-nuclide; and (7). Chemical element's sorption coefficient data in the host rock 407.

Figure 4C:
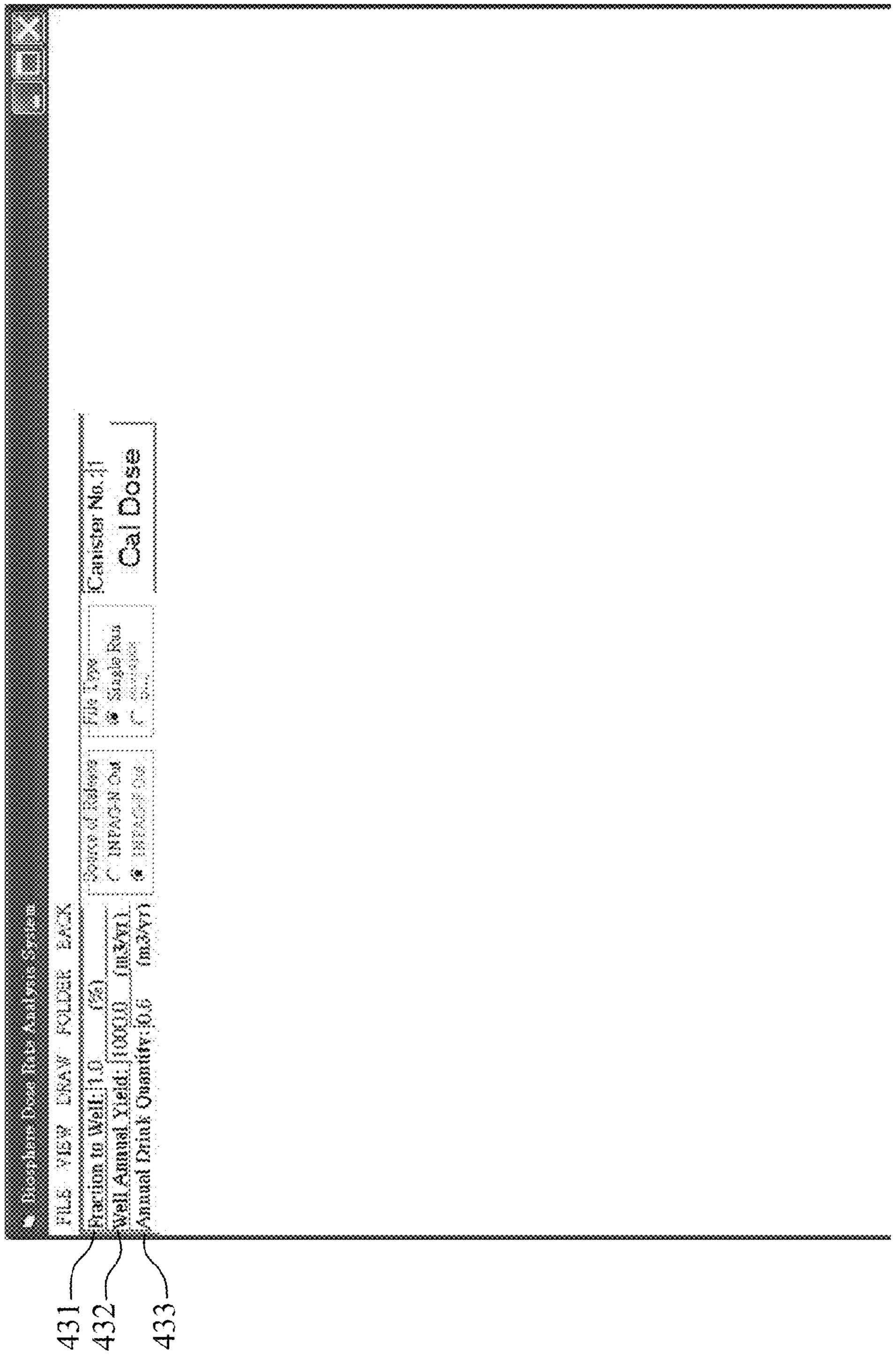
FIG. 4C is the diagram of the biosphere dose assessment data input sub-system for the system's basic data input sub-system.

Next, please refer to FIG. 4C, which is the figure of biosphere dose assessment data input sub-system in the system's basic data input sub-system. Form FIG. 4C we know that the input data of this biosphere dose assessment data input sub-system includes: far-field nuclide release rate, the well entering percentage of nuclide 431, the annual water output volume of the well 432, annual water consumption for individual 433, and the annual dose rate.

After completing the input of basic data, the next function and operation of the invention's near-field release assessment sub-system will be explained. Before implementing the system's near-field release assessment sub-system, the distributive parameter sampling sub-system of this system shall be implemented in advance which includes 2 sampling methods: Latin Hypercube Sampling and Monte Carlo Random Sampling.

Figure 5:
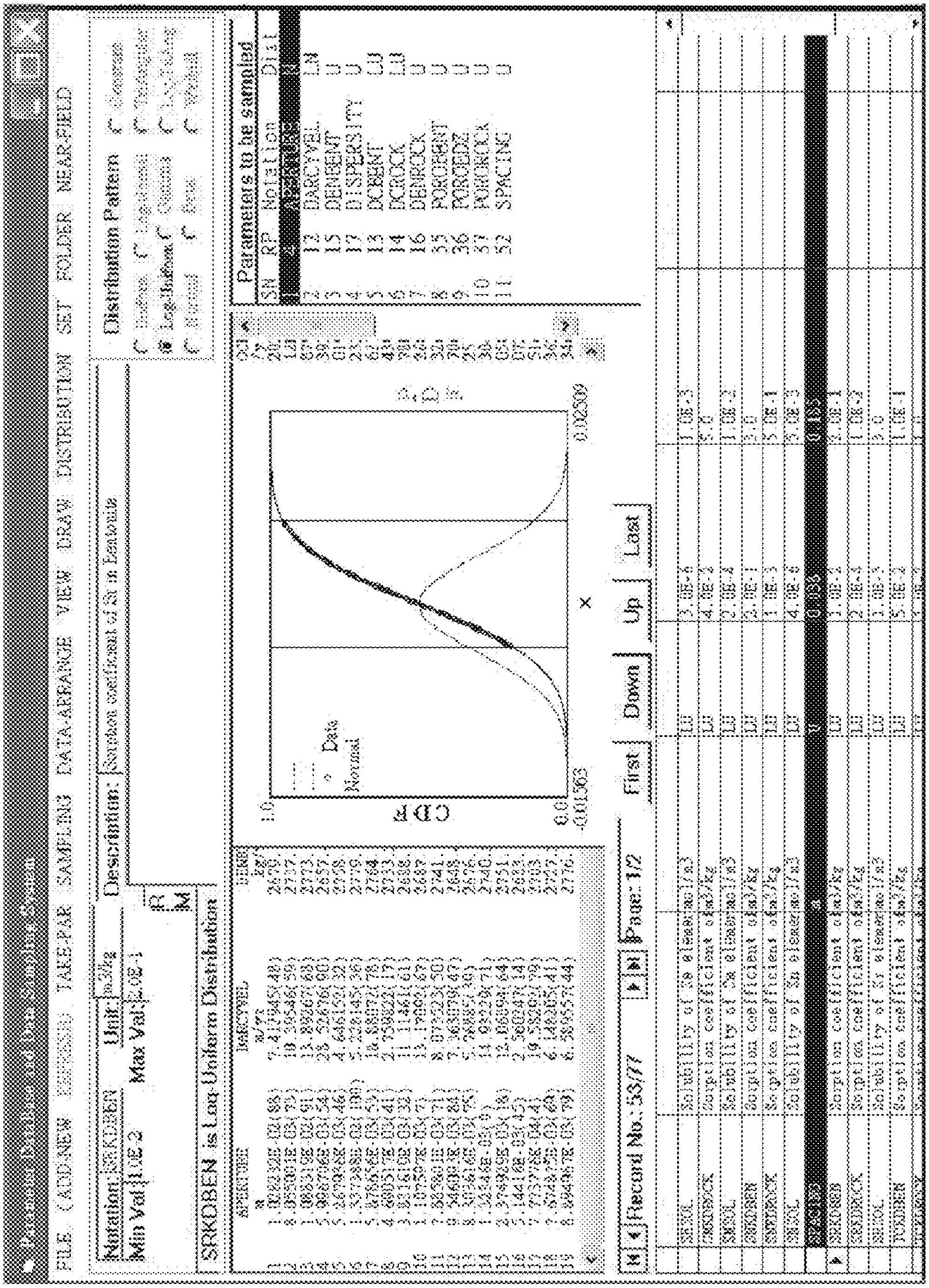
FIG. 5 is the diagram of the sampled result from the implemented nuclide parameter data sampling process for the system's parameter sampling sub-system.

Please refer to FIG. 5, which is the figure of the result after implementing the nuclide parameter data sampling by the system's parameter sampling sub-system.

Figure 6:
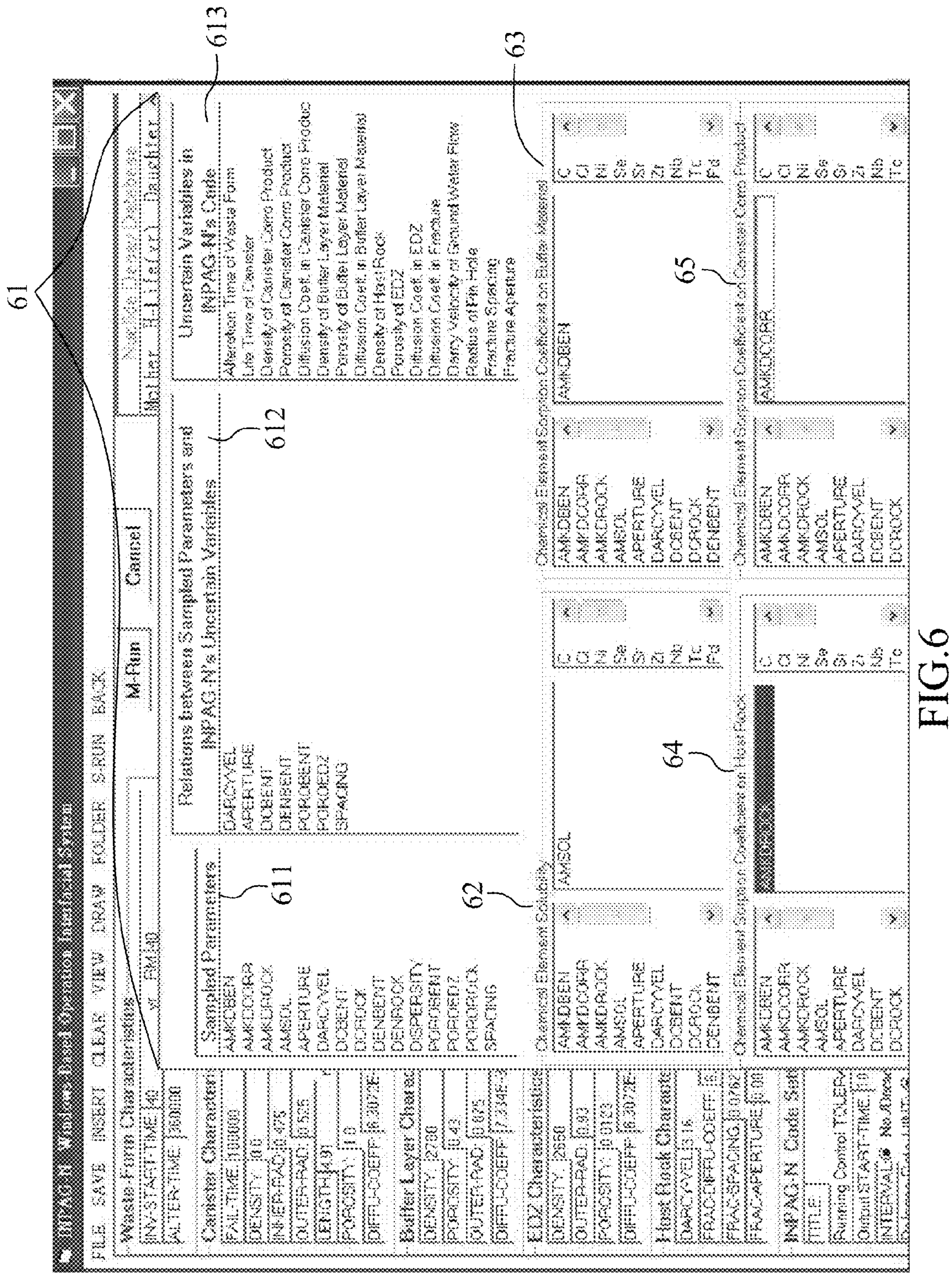
FIG. 6 is the diagram of the preparation function of the data input file for the system's multiple running of the near-field release assessment sub-system.
Figure 7:
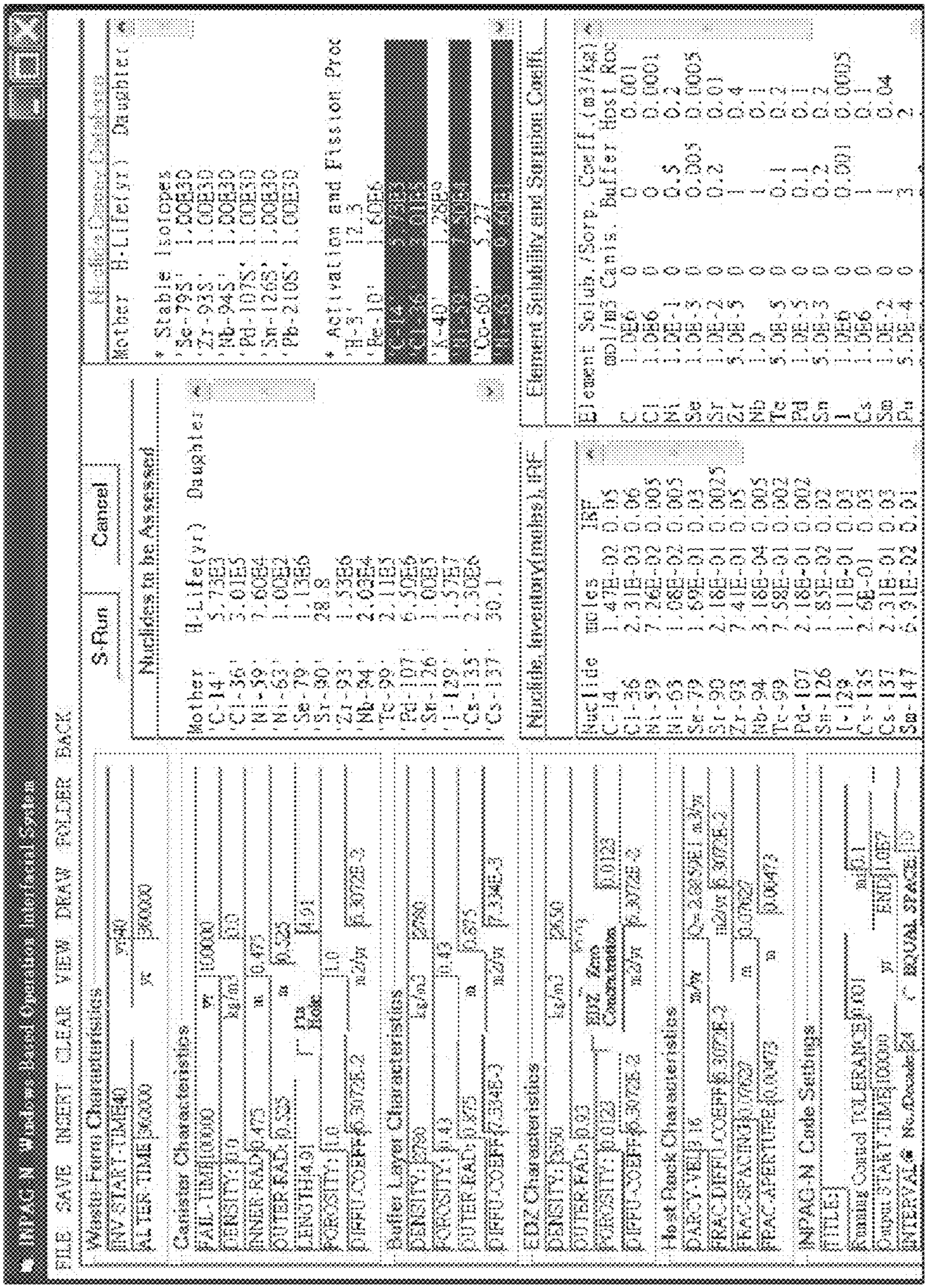
FIG. 7 is the diagram of the preparation function of the data input file for the system's multiple running of the near-field release assessment sub-system of the near-field release assessment sub-system after the execution of the preparation function is complete.

After completed the sampling process, the near-field release assessment of the radioactive waste near-field release can then be implemented; and before implementing multiple running of the near-field release assessment sub-system, the preparation function of the data input file shall be implemented in advance as shown in FIG. 6. FIG. 6 shows that the preparation function of the data input file for multiple running of the invention's near-field release assessment sub-system, and its main data related input area is: (1) the disposal facility design and the geologic property correlative setting zone 61 which contains 3 data setting zones—the well-obtained data of the parameter list 611; the correlative setting list 612 which contains the well-obtained parameter data and uses the near-field release assessment sub-system to assess the variable sensitivity; and the random parameter list 613 which is contained in the near-field release assessment sub-system; (2) Chemical element solubility correlative setting zone 62; (3) Chemical element's correlative setting zone 63 of sorption coefficient for buffered materials; (4) Chemical element's correlative setting zone 64 of sorption coefficient for host rock; (5) Chemical element's correlative setting zone 65 sorption coefficient for the erosion object in waste tanks, etc.

As implied in the title, the correlative setting zone 61 of disposal facility design and geologic property is used to connect with uncertain parameters that are related to the disposal facility design and the geologic property; the correlative setting zone 62 of chemical element solubility is used to connect with uncertain solubility of chemical element; the correlative setting zone 63 is used to connect with uncertain sorption coefficient of buffered materials for chemical element; the correlative setting zone 64 is used to connect with the uncertain sorption coefficient of host rock for chemical element; and the correlative setting zone 65 is used to connect with the uncertain sorption coefficient of the erosion object in waste tanks for chemical element. Each property correlative zone contains 3 data display zones—that is, the left-side well-sampled parameter title listing zone, the right-side random parameter listing zone or element title listing zone of the near-field release assessment sub-system; and correlative listing zone in the middle.

After implementing the distributive parameter sampling sub-system, the invention system can then be implemented in the "Single Running" or "Multiple Running" function for near-field release assessment sub-system; at this moment, users shall input proper data in advance to provide the near-field release assessment sub-system for carrying out the assessment calculation. The screen of the result after inputting the data input file is shown in FIG. 4A, at this time, if users selected the "Single Running" function 41, then the system will directly implement a single calculation of the near-field release assessment sub-system in accordance with the data that displayed on the screen.

Figure 8:
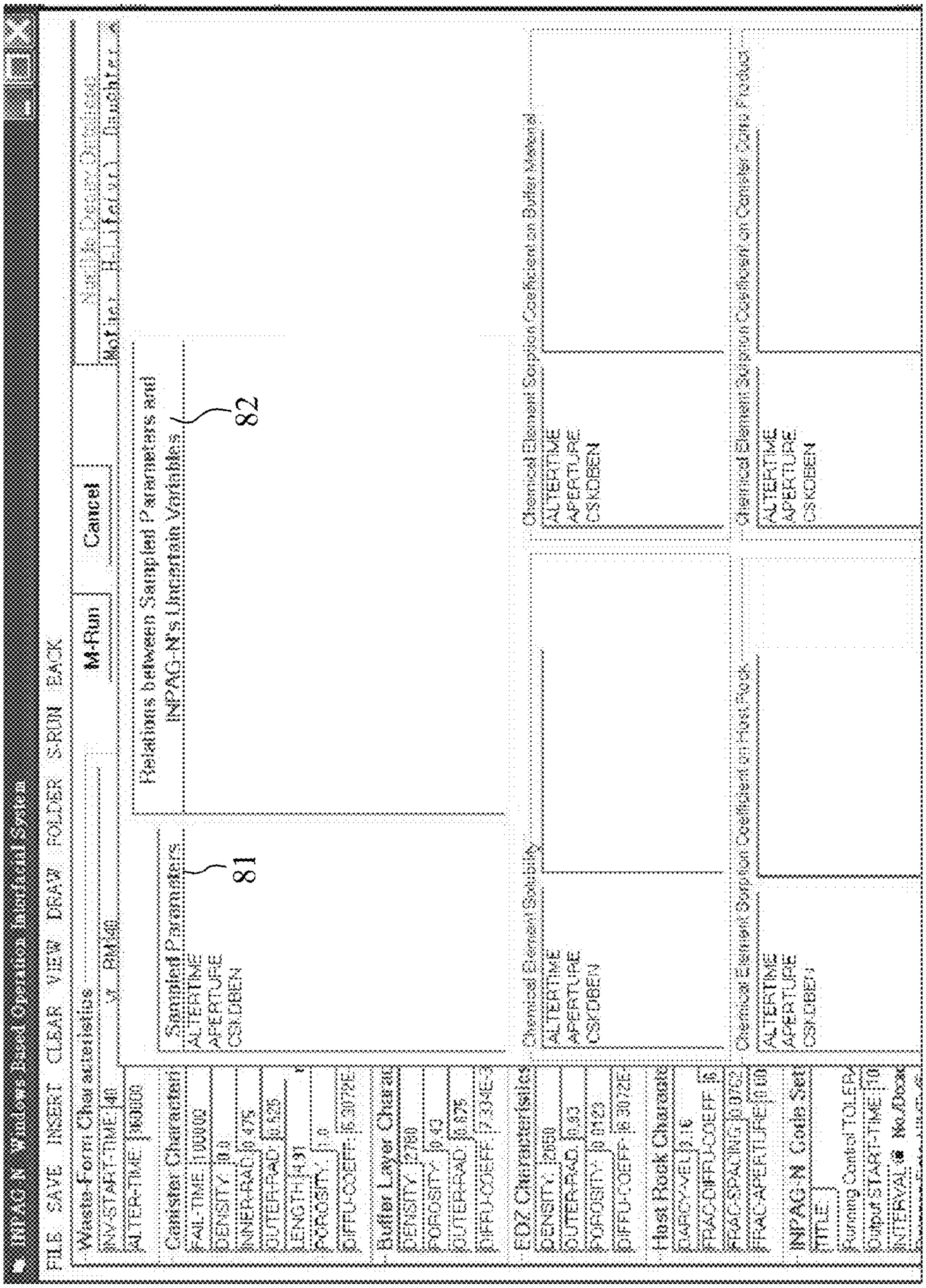
FIG. 8 is the diagram of implementing the multiple running function for the system's near-field release assessment sub-system.
Figure 9:
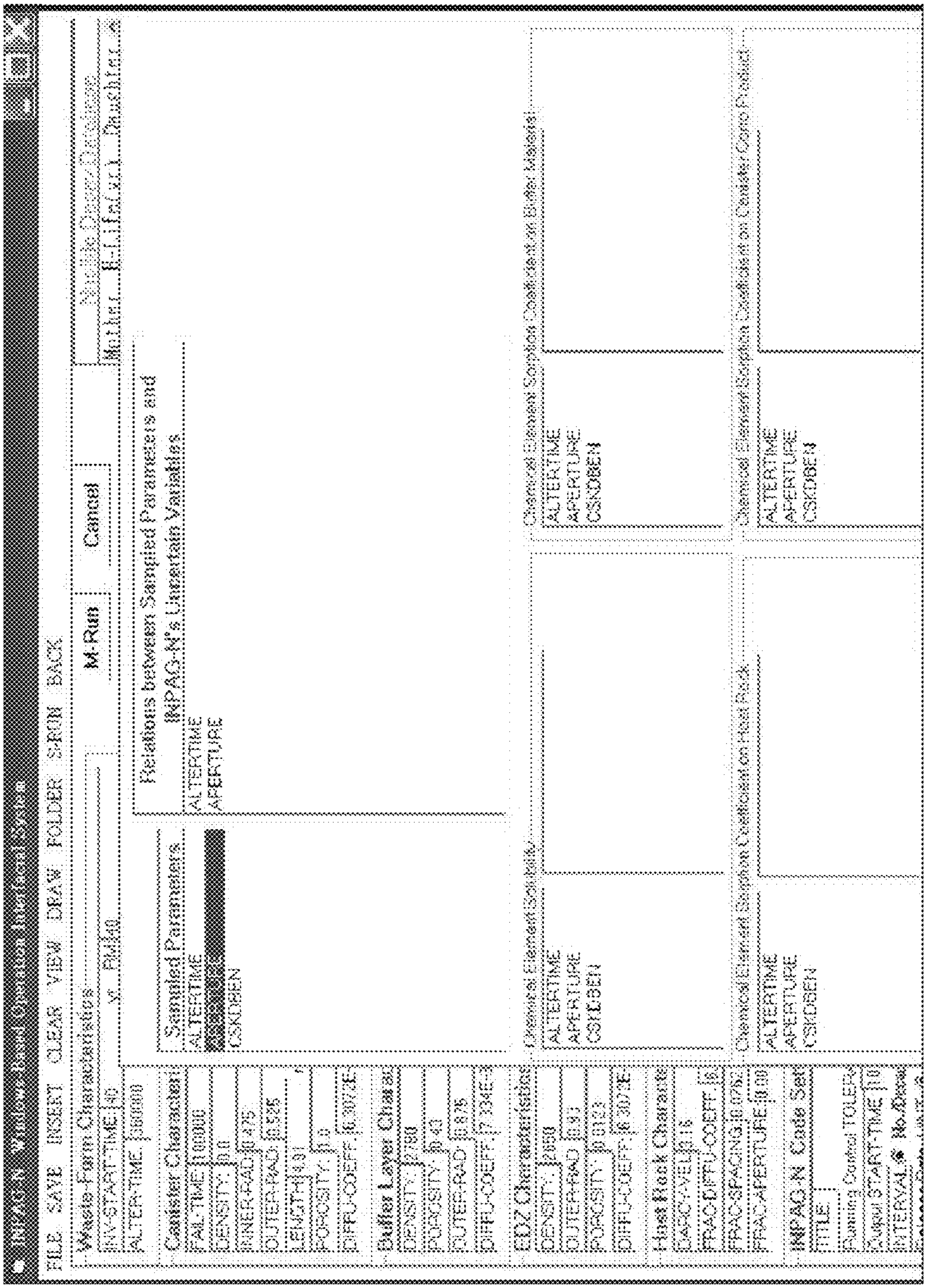
FIG. 9 is the diagram of parameter sensitivity for implementing the near-field release assessment sub-system of the system.

After inputting a complete data input file of the near-field release assessment sub-system, the "multiple running" function of the invention can be implemented then. The implementation figure of the "multiple running" function for the near-field release assessment sub-system is as shown in FIG. 8, users can select the parameter when they want to explore its variable sensitivity, from the list that is titled as the "parameter list of the well-obtained data" 81 in the system, and such parameter will be automatically added into the list of the "correlative setting list of the well-obtained parameter and the exploration of variable sensitivity by using the near-field release assessment sub-system" 82 as shown in FIG. 9.

Figure 10A:
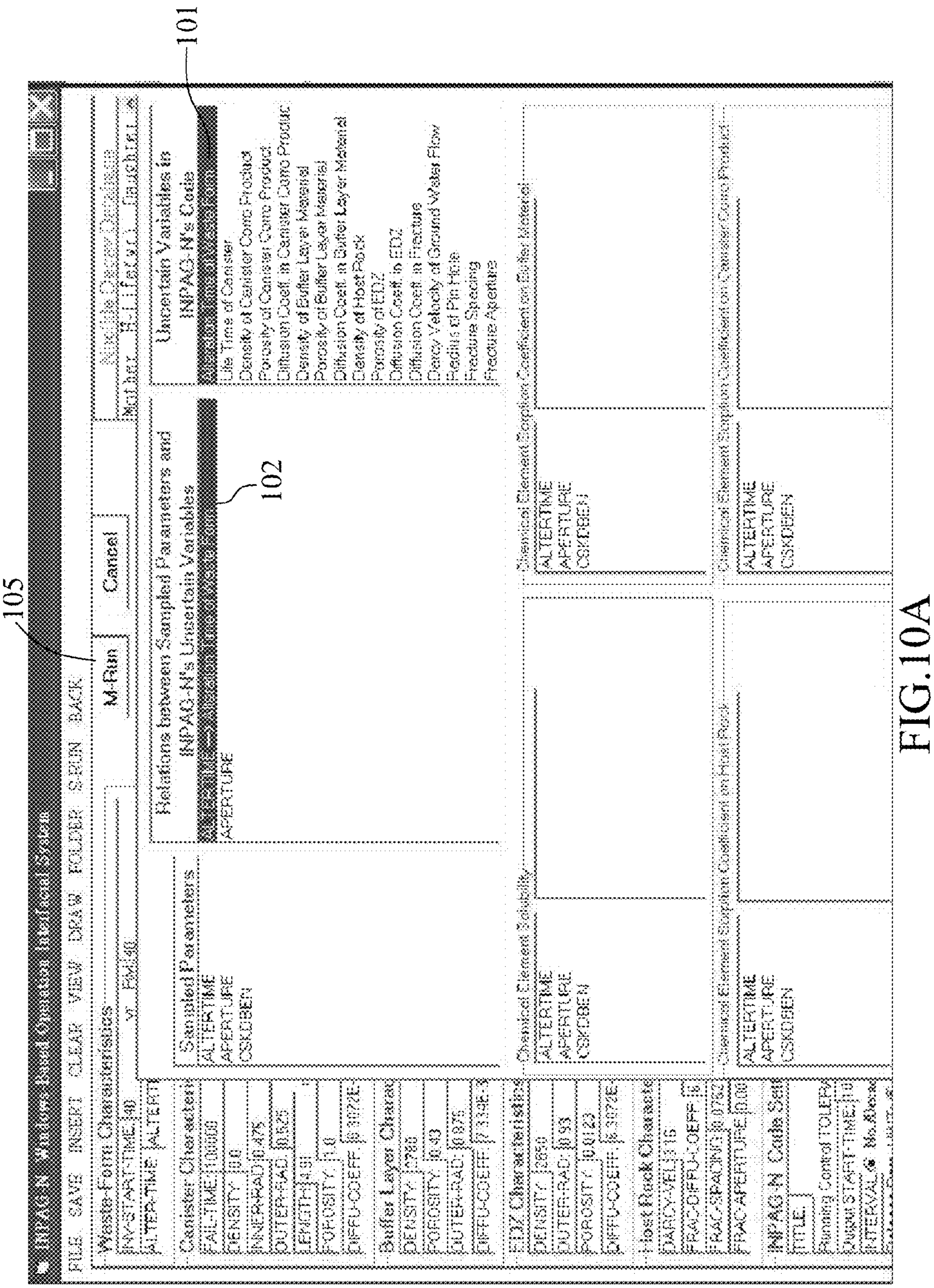
FIG. 10A is the diagram parameter sensitivity for implementing the near-field release assessment sub-system of another system.

After selecting the required parameter from the "correlative setting list of the well-obtained parameter and the exploration of variable sensitivity by using the near-field release assessment sub-system", the system will display a data input zone for "the random parameter list of near-field release assessment sub-system" 101 as shown in FIG. 10A. In the list of "the random parameter list of near-field release assessment sub-system" 101, users can select the correlative parameter from the near-field release assessment sub-system when they want to assess its variable sensitivity, and it will yield the result of zone 102 as shown in FIG. 10A. Now, it needs to be carefully concerned that such sensitivity exploring parameter shall not be correlated with the parameter of the near-field release assessment sub-system; however, the correlating parameter has to be in the selected status, and the correlation can then be established.

Figure 10B:
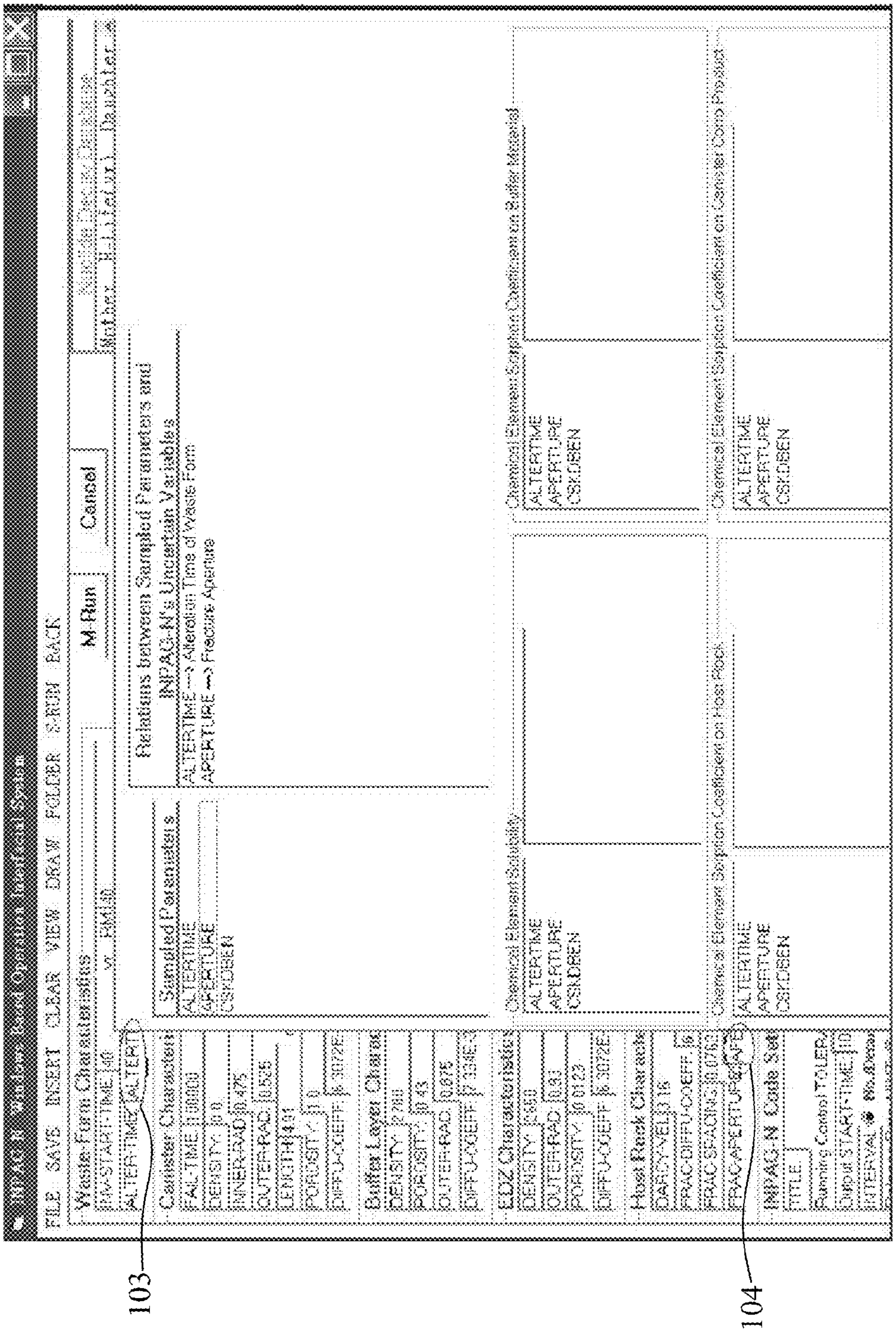
FIG. 10B is the diagram parameter sensitivity for implementing the near-field release assessment sub-system of another system.

Related parameter that is selected from the correlative near-field release assessment sub-system will be shown the selected status in the parameter value column of the near-field release assessment sub-system as shown in 103 and 104 of FIG. 10B, which indicates the parameter of assessing variable sensitivity has been selected already.

Similarly speaking, users can select the parameter of assessing variable sensitivity from those data zones: "chemical element solubility", "chemical element's sorption coefficient in host rock", "chemical element's sorption coefficient in buffered materials", and "chemical element's sorption coefficient in corrosion object in waste tanks".

Figure 11:
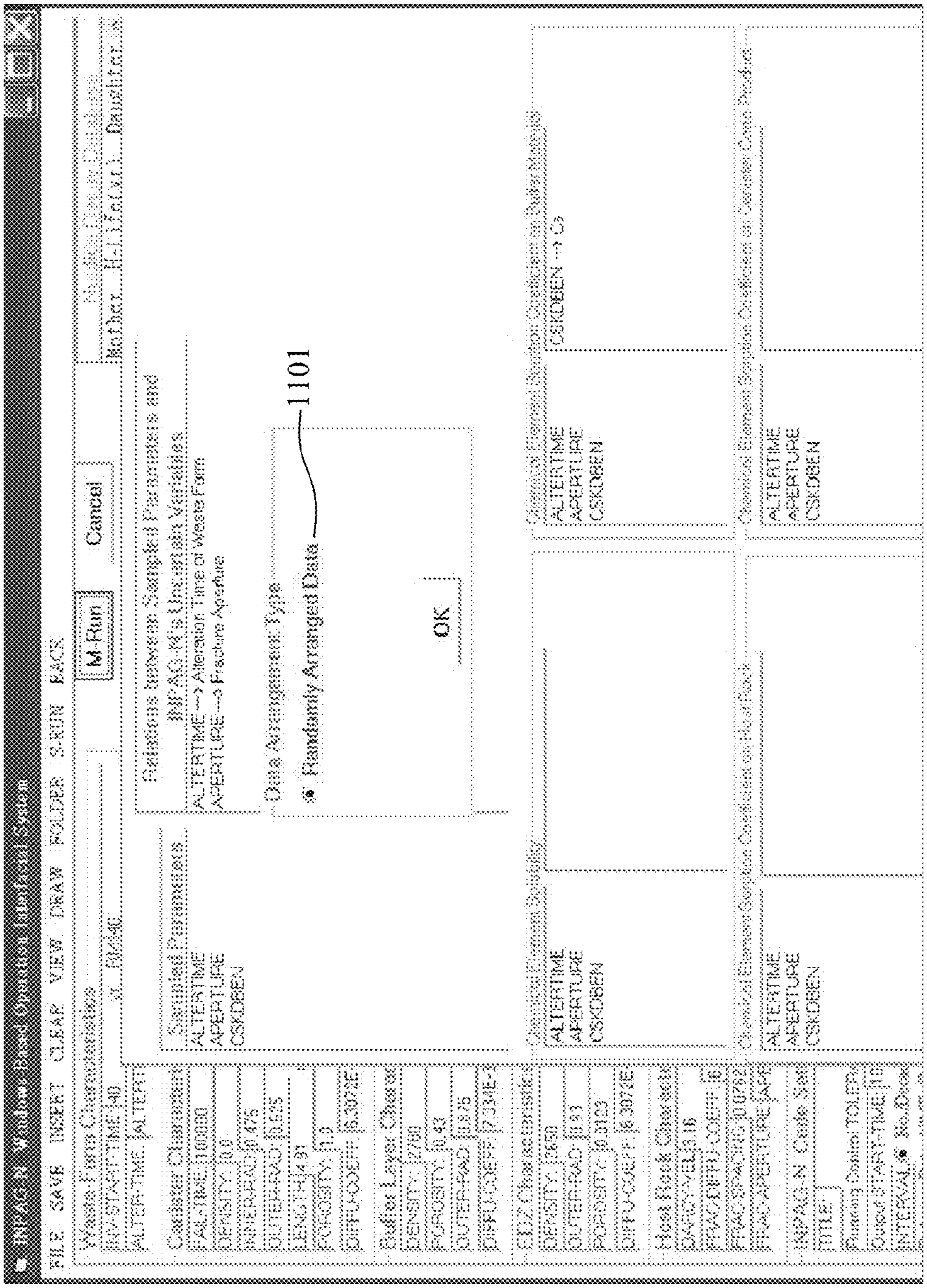
FIG. 11 is the diagram of the sampled result from the implemented near-field release assessment sub-system for the system by using the Monte Carlo Random Sampling process.
Figure 12:
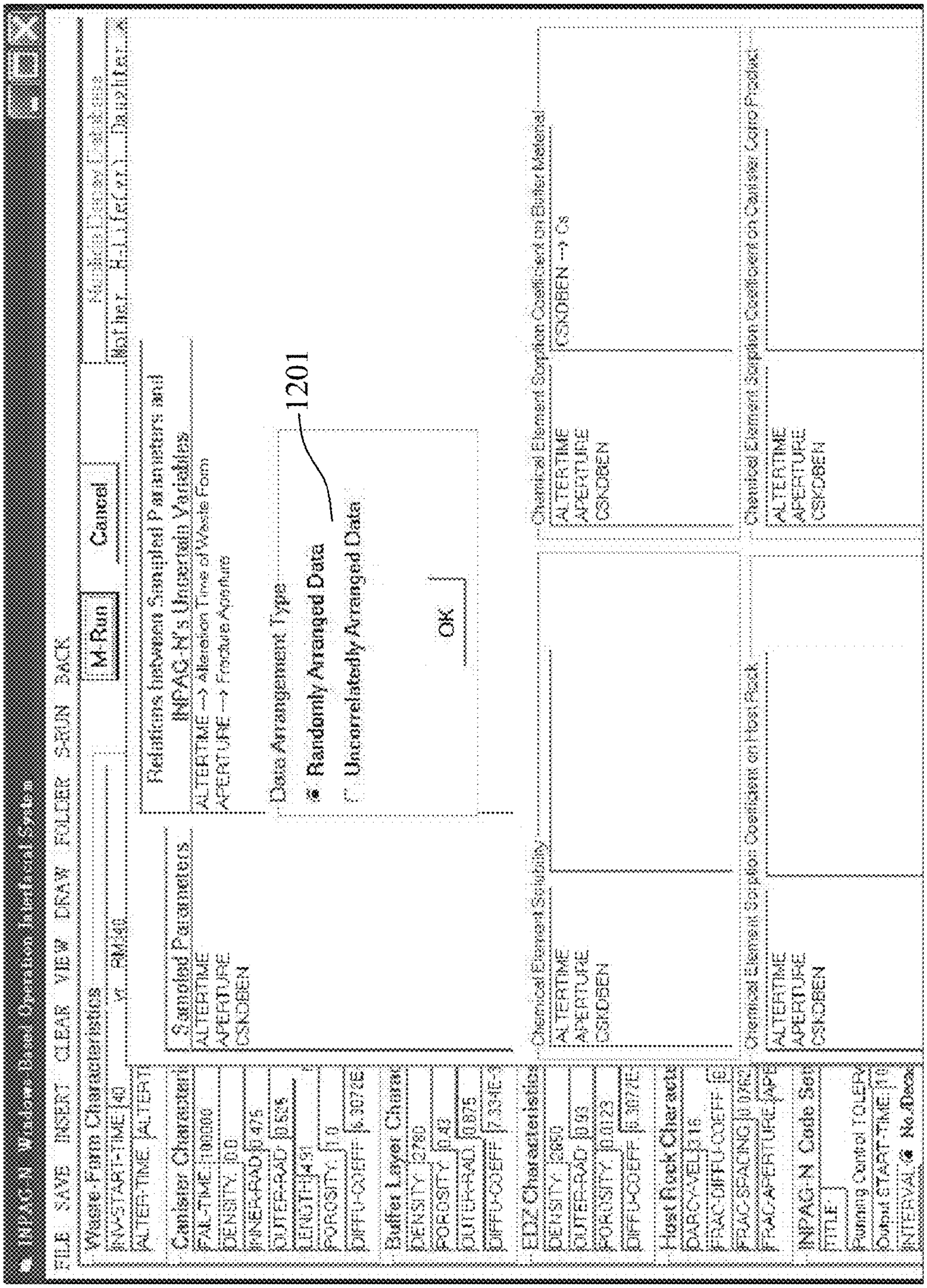
FIG. 12 is the diagram of the sampled result from the implemented near-field release assessment sub-system for the system by using the Latin Hypercube Sampling process.
Figure 13:
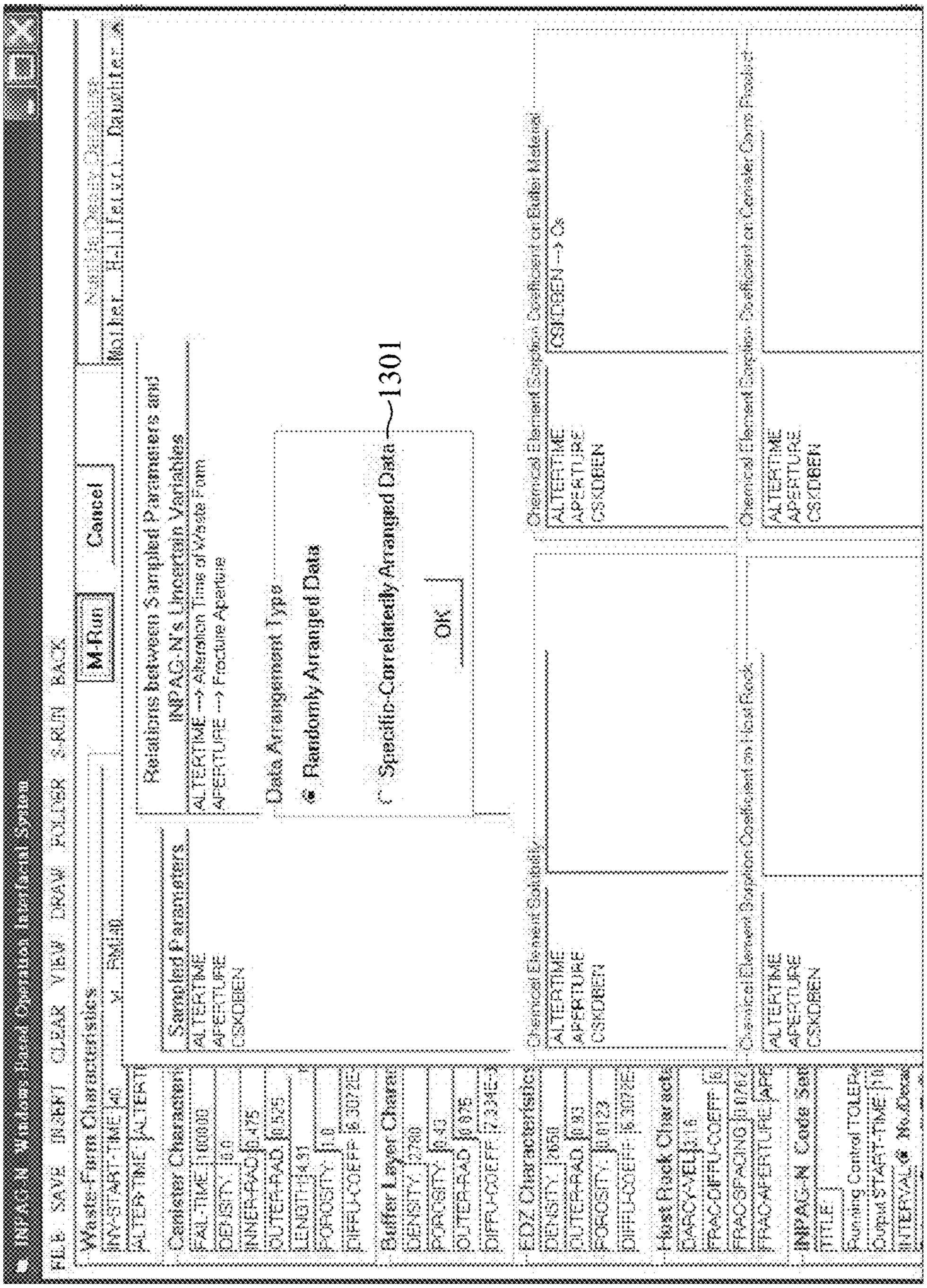
FIG. 13 is the diagram of the sampled result from the implemented near-field release assessment sub-system for another system by using the Latin Hypercube Sampling process.

After completing the correlation setting of the assessing sensitivity parameter, the "multiple running" function 105 of FIG. 10A shall be implemented then; if using only the Monte Carlo Random Sampling to conduct the sampling process, the result will be shown as the same as in FIG. 11; if only adopting the Latin Hypercube Sampling to implement the sampling process, then only the item of "random arrangement" 1101 function for the "data arrangement" in the parameter sampling system can be implemented then, and the result will be the same as the result of using the Monte Carlo Random Sampling; in addition, the result will be shown as the same as in FIG. 11; if increasingly implementing the item of "non-correlative arrangement" 1201 function for the "data arrangement", the result will be shown as the same in FIG. 12; in addition, if increasingly implementing the item of "specific correlative arrangement" 1301 function for the "data arrangement", the result will be shown as the same in FIG. 13.

Figure 14:
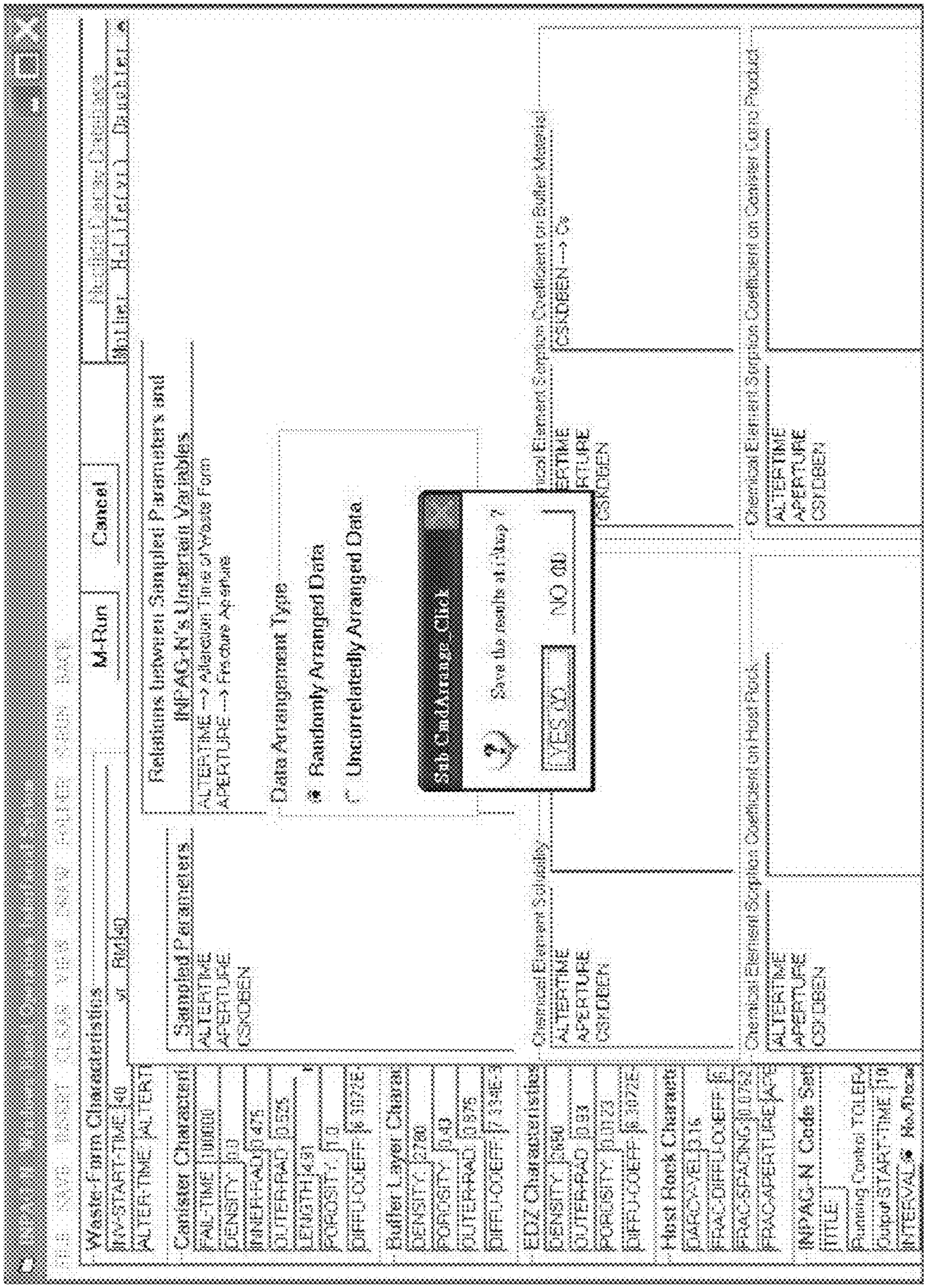
FIG. 14 is the diagram after implementing the multiple running of the near-field release assessment sub-system (multiple running) for the system.
Figure 15:
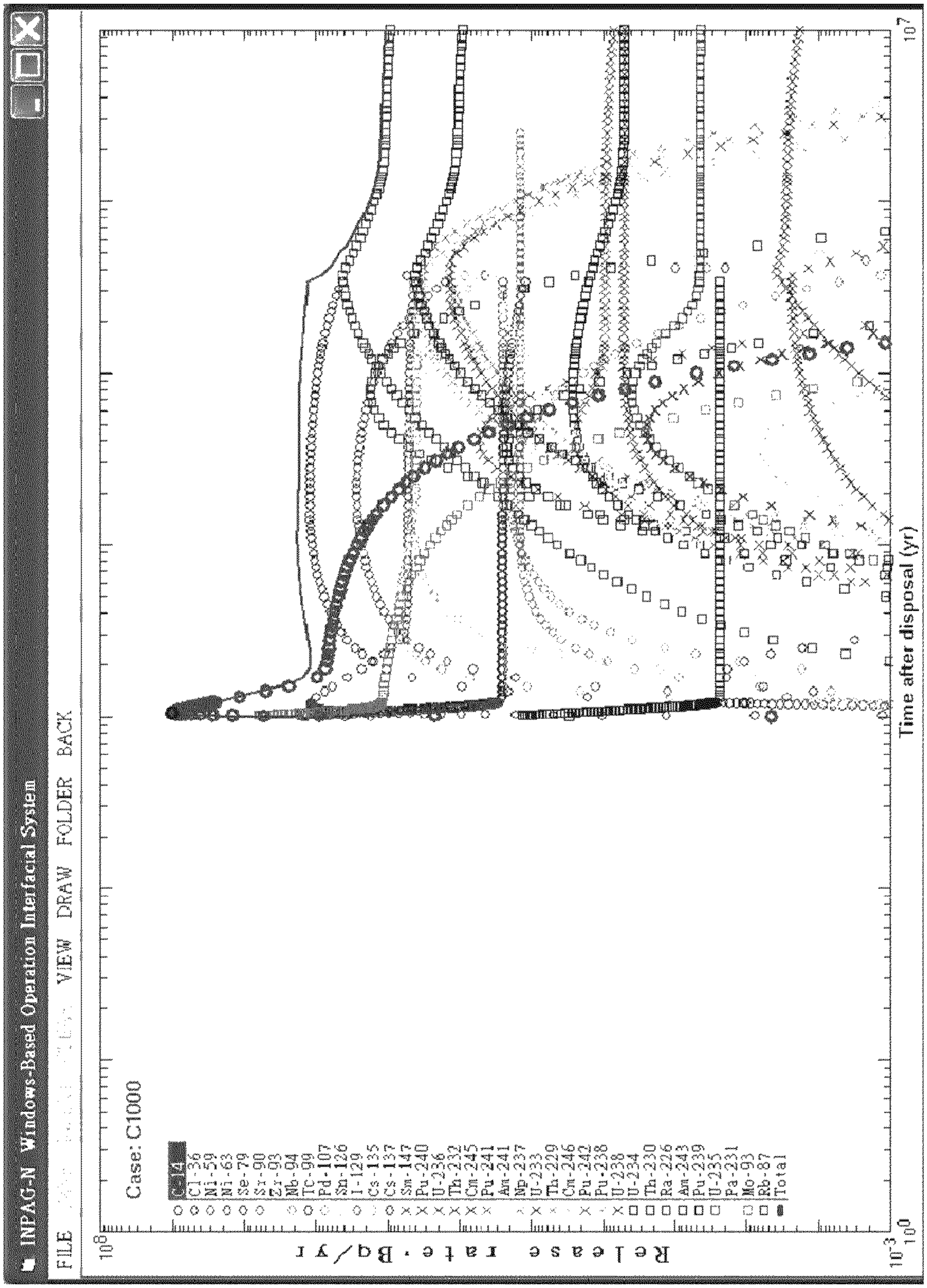
FIG. 15 is the diagram after implementing the multiple running of the near-field release assessment sub-system (multiple running) for another system.

When implementing the type of selected data arrangement from the "selecting data arrangement type, the system will display the result as shown in FIG. 14, and the system will confirm whether users will save/store related data of multiple running into the certain category or not. At this moment, the implementation of calculation for the system's near-field release assessment sub-system can then be considered as a completion, select the block of "assessed result" from the "near-field release assessment sub-system", and the system will display the near-field release assessed result as shown in FIG. 15.

As showed in FIG. 4A, the system's near-field release assessment sub-system includes functions of "File" 411, "Save As" 412, "Insert" 413, "Clear" 414, "Review" 415, "Drawing" 416 and "Work Directory" 417; in addition, those functions and follow-up explanations are almost identical to those functions in the system's far-field release assessment sub-system, such as "File", "Save As", "Insert", "Clear", "Review", "Drawing" and "Work Directory". Except the "File" function in the system's near-field release assessment sub-system, it is not included those functions of 『file mergence』, 『file name change』 and 『file delete』, other functions will be identical to each other, thus it will not explain herein, and it will be explained in the system's far-field release assessment sub-system then.

Next, it will explain the function and its operation method for the system's far-field release assessment sub-system, such as the system's "far-field release assessment sub-system" function as shown in FIG. 4B. After entered the far-field release assessment sub-system, from FIG. 4B, we know the sub-system will include those file control and drawing control functions, such as "File" 421, "Save As" 422, "Insert" 423, "Clear" 424, "Review" 425, "Drawing", and "Work Directory" 427.

As shown in FIG. 4B, after completing the basic data input for the invention's far-field release assessment sub-system, its data will include "Geometry property" 401, "Host Rock property" 402, and "Transport property" 40, "program setting for the far-field release assessment sub-system" 408, "Nuclide Flux Input File" 404, "Nuclide Concentration Output Time" 405, "the nuclide decay chain that needs to conduct the release rate assessment" 406 and "element's sorption coefficient in the host rock" 407 nuclide property data setting and the assessment implementing functions.

"Geometry property" 401, "Host Rock property" 402 and "Transport property" 403 are jointly titled as the data of natural barrier system (NBS) property. These 2 parts, "the nuclide decay chain that needs to be conducted the release rate assessment" 406 and "element's sorption coefficient in the host rock" 407, can be jointly named as the data of the nuclide decay chain, half-life and sorption coefficient. As for these 3 parts, the "program setting for the far-field release assessment sub-system"408, "Nuclide Flux Input File" 404 and "Nuclide Concentration Output Time"405, can be jointly named as the system setting data of calculation implementation.

With particular attention, in the "File name" column of "Nuclide Flux Input File" 404, you have to key in the correct operation in the performed near-field release assessment sub-system after the output of the nuclide flux output data, as the implementation of far-field release assessment sub-system is required for the nuclide data flux input file The function and its operation method of the far-field release assessment sub-system will be described as follows, basically speaking, the nuclide transportation data used by the far-field release assessment sub-system will be the result data after assessed the near-field release assessment sub-system, that is, the input data used by the far-field release assessment sub-system is the assessed output data for the near-field release assessment sub-system; thus, the "File" function will be explained first for the far-field release assessment sub-system to understand how to make the assessed result of the near-field release assessment sub-system to be the assessment data for the far-field release assessment sub-system. First of all, as shown in FIG. 16, there are 4 sub-function items will be displayed in the scroll menu of the "File" function items, such as 『Open Old File』, 『Establish New Data File』, 『Implement Previous Data File』 and 『File Processing』, and the operation and function of these 4 sub-function items for the function item will be explained.

Figure 16:
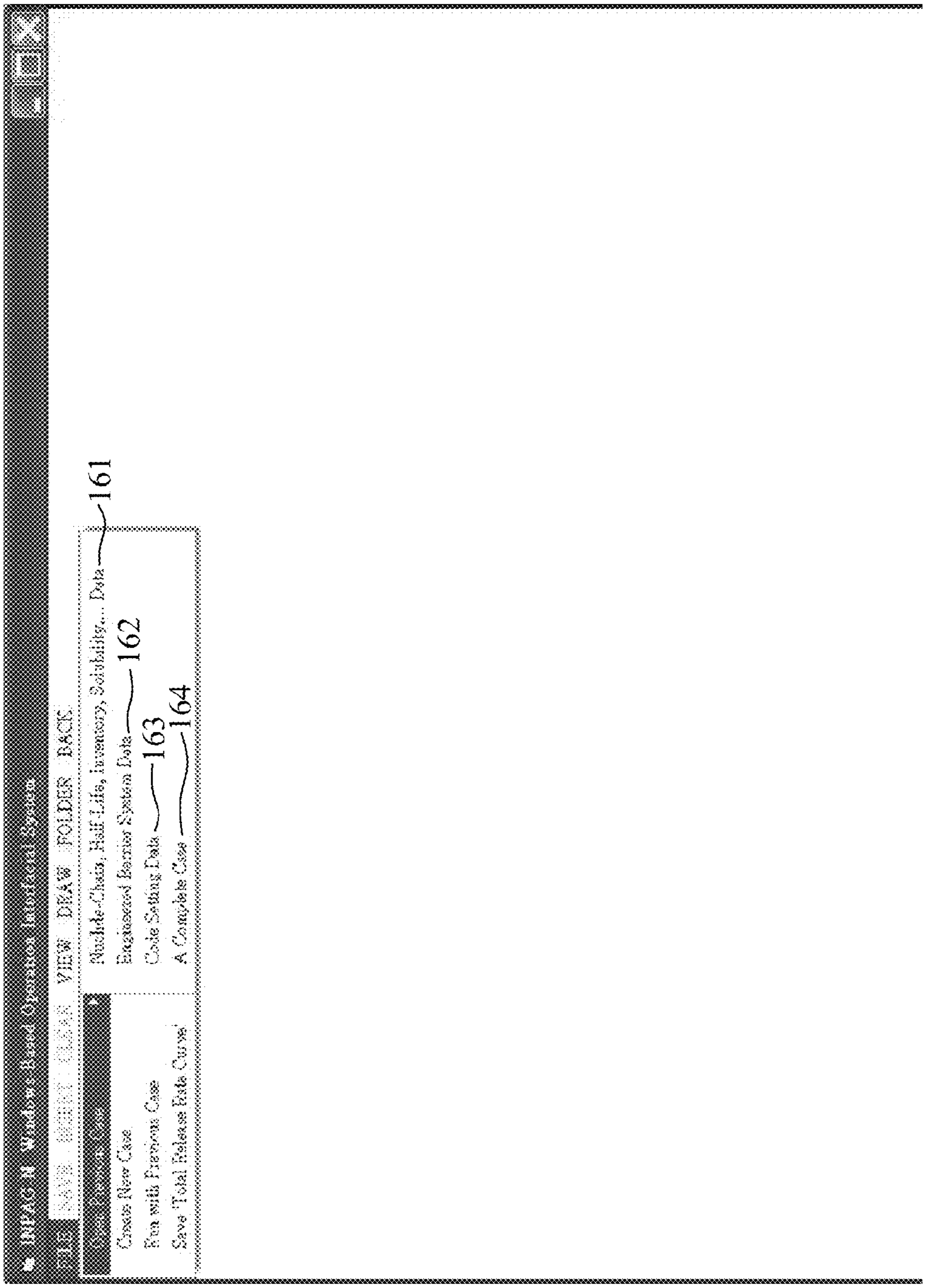
FIG. 16 is the diagram of the file control sub-system for implementing the far-field release assessment sub-system of the system.

As shown in FIG. 16, 4 sub-functions in the 『Open Old File』, such as the 『files of nuclide decay chain, half-life, sorption coefficient data』 161; 『data of natural barrier system (NBS) property』 162, 『setting data of calculation implementation』 163 and 『abovementioned 3 data (one complete implementation case)』 164. If the data existed, then the established old file can be selected from 『Open Old File』 function item. Thus, operation and function of these 4 sub-function items of the function item will be introduced respectively.

Figure 17:
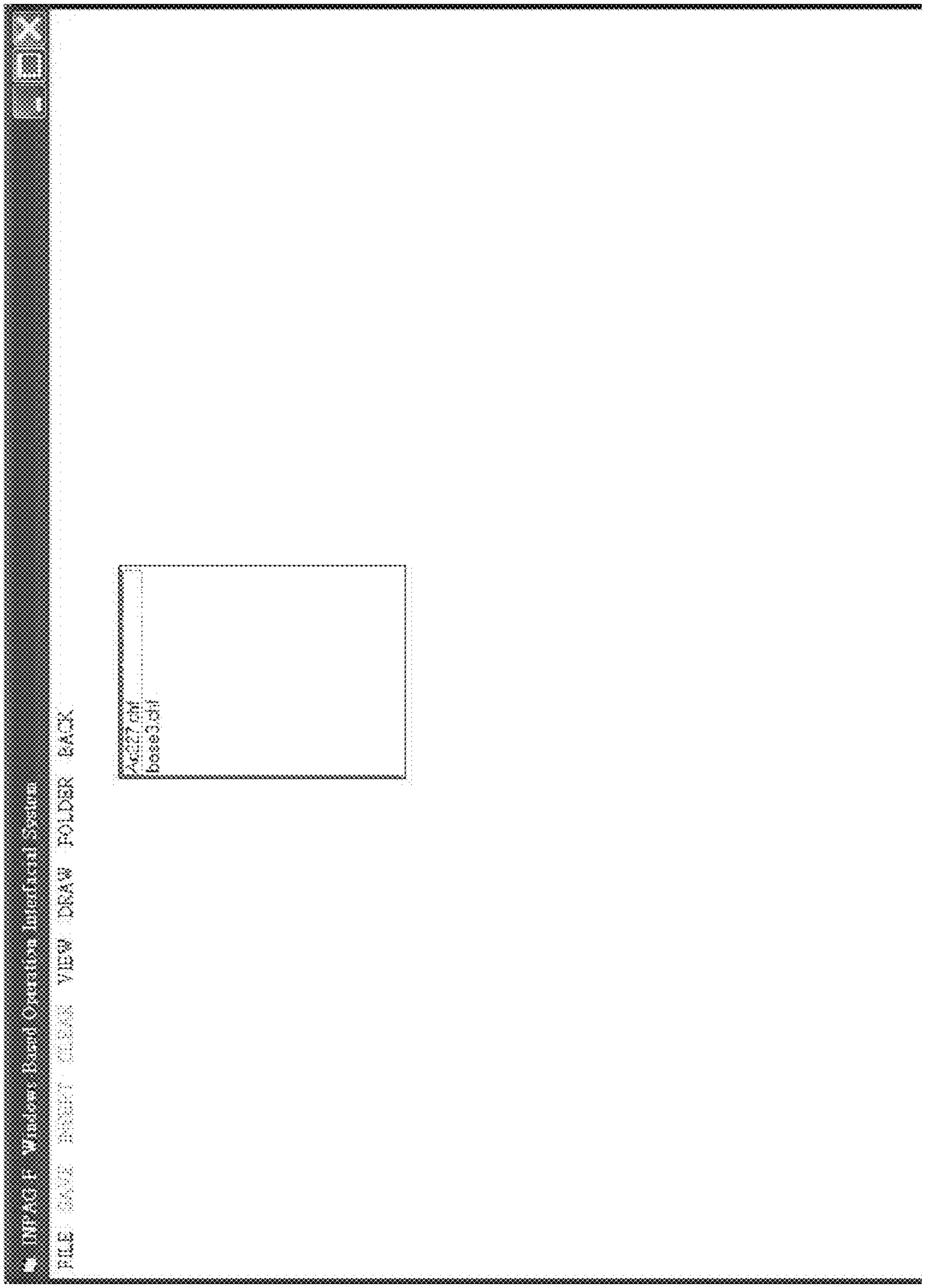
FIG. 17 is the diagram of the nuclide decay chain, half-life, sorption, and coefficient data for implementing the file control sub-system of far-field release assessment sub-system in the system.

When selecting the 『data of the nuclide decay chain, half-life and sorption coefficient』 161 function item as shown in FIG. 17, users can select the Open Old File and key in the nuclide-related data in the "data of the nuclide decay chain, half-life and sorption coefficient"161.

It needs particular attention that users have to select the output data of the "title of released nuclide, half-life and decay chain" that is yielded from implementing the calculation of the near-field release assessment sub-system which will then be able to be consistent with the nuclide transportation types of the near-filed assessment.

If the data input is good, then the data will display as shown in FIG. 4B, now, if users implemented "Single Running" function 4201, the system will directly implement a single calculation of the far-field release assessment sub-system according to the data on the screen.

After selecting certain nuclide data from the "the nuclide decay chain that needs to conduct the release rate assessment" function, selecting the "Delete" function, such nuclide data will be deleted; when certain element's isotopes nuclide has been completely deleted, then such element's sorption coefficient in the zone of "element's sorption coefficient in the host rock" will be automatically deleted as well. Users can make modifications and revisions of parameter input in the parameter and noted input zone.

Figure 18:
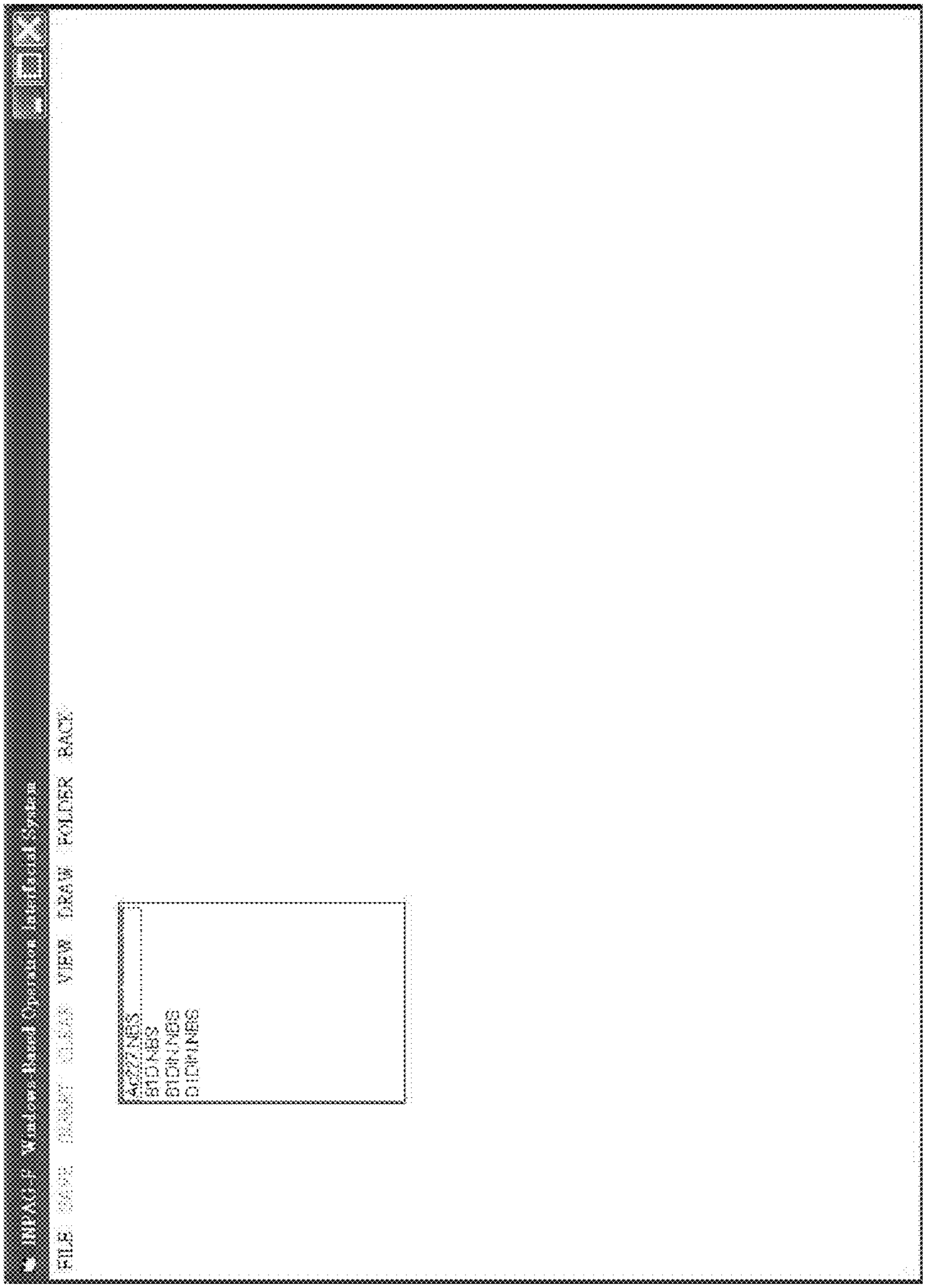
FIG. 18 is the diagram of the data of natural barrier system (NBS) property for implementing the far-field release assessment sub-system of the system.

When implementing the 『data of natural barrier system (NBS) property』 162 function, as shown in FIG. 18, the system will display a file list block, and the listed File name is the old File name for the data of natural barrier system (NBS) property that was established by users before. After selecting such file, the previous data file can be opened to input the data of natural barrier system (NBS) property.

When selecting the 『program implementing setting data』 163 function, such system will display a file list, and the listed file is the File name of the system program implementing setting data that was established by users previously. After selecting the file, the previous data file can be opened then.

After selecting the 『abovementioned 3 data (one complete implementation case)』 164 function item, such system will display a file list, the listed file is the File name that was established by users previously. After selecting the file, the previous data file can be opened then. When implementing this function item, it can be concurrently read that the set file data of 『files of nuclide decay chain, half-life, sorption coefficient data』 161, 『data of natural barrier system (NBS) property』 162, and 『program implementing setting data』 1633.

The main purpose of the 4 sub-function item in the 『Open Old File』 function is to increase the freedom for users to select different data files freely to compose a new implementing parameter content for the far-field release assessment sub-system, or directly click on the 『abovementioned 3 data (one complete implementation case)』 function item to read a complete data to implement the far-field release assessment sub-system.

Figure 19:
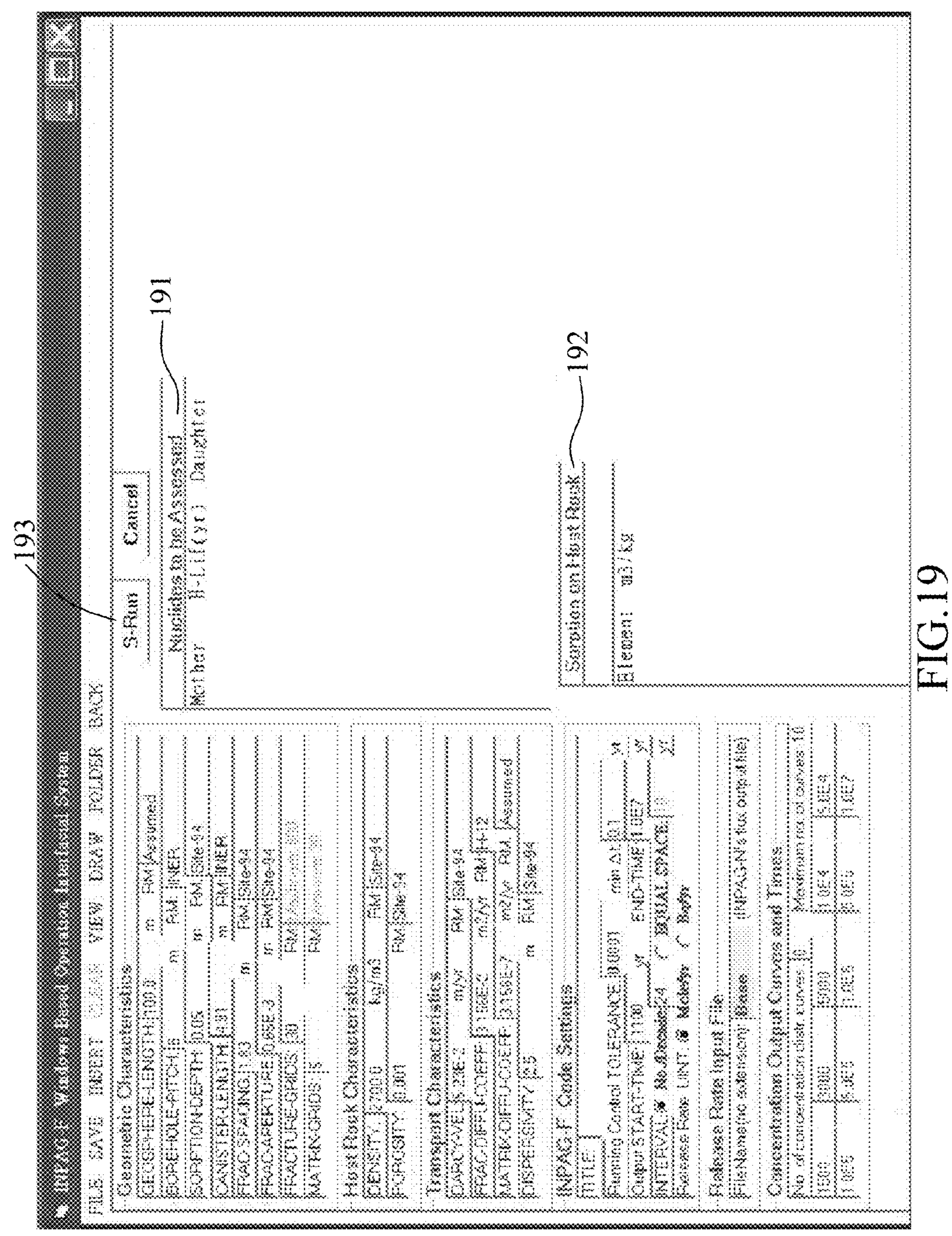
FIG. 19 is the diagram of establishing the new data file in the file control sub-system of implementing the far-field release assessment sub-system for another system.

If users are first-time users for the system, then there's no previous data file available; however, now the function item of 『 Establish New Data File』 can be made use of establishing the New Data File, as shown in FIG. 19. After selected the 「Establish New Data File」 function, users can establish new data in such function to conduct the assessment.

It needs extra attention, the analyzing nuclide shall be identical to the nuclide that analyzes by implementing the near-field release assessment sub-system; thus, when implementing the near-field release assessment sub-system, the system will automatically yield the output data file of the "title of released nuclide, half-life and decay chain" and be used for implementing the far-field release assessment sub-system; as a result, it can be identical to the transportation nuclide type for the near-filed assessment, in FIG. 19, "the nuclide decay chain that needs to be conducted the release rate assessment" 191 will display the nuclide data that needs to conduct the assessment.

After all nuclide data have been completely inputted, users can select their required element from the list of "element's sorption coefficient in the host rock" 192, and then they can modify and revise each element's sorption coefficient.

After completely inputting the related data, users can click on the "Save As" function to save the inputted related data.

Within these 3 data zones, such as the "data of natural barrier system (NBS) property", "sub-system implementing setting data" and "data of the nuclide decay chain, half-life and sorption coefficient", data has to be available and integral in these zones; otherwise, the 「Single Running」 function or 「multiple running」 function of the far-field release assessment sub-system cannot be implemented.

After selected the function item of 「Implement Previous Data File」, such system will display a file list, listed File name is the File name that established by users previously; in addition, after users select their required data file, then implement the FIG. 19's "Single Running" 193 to implement the calculation and assessment. After completely implementing the far-field release assessment sub-system, a nuclide release flux file and an implementation file will be generated then.

Figure 20:
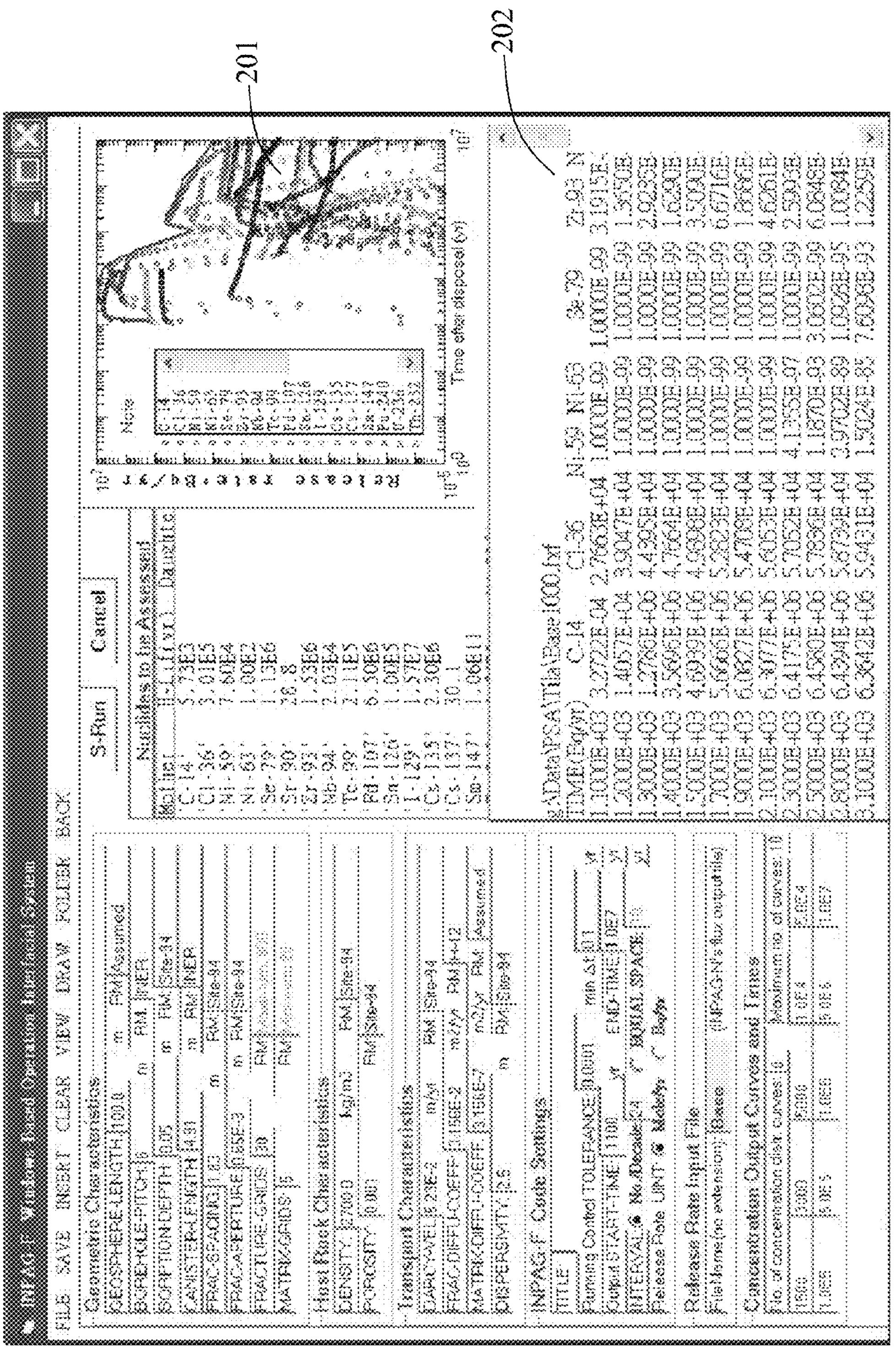
FIG. 20 is the diagram of the result after implementing the far-field release assessment sub-system for the system.

After completely implementing the far-field release assessment sub-system to conduct the calculation and assessment, its diagram is as shown in FIG. 20. In FIG. 20, these calculated results of the far-field release assessment sub-system can be drawn as a time-changed figure of the nuclide release flux 201, and the data of calculated results that are displayed by words 202.

The 「File」 function in the far-field release assessment sub-system, its 「File Processing」 function item can be divided into 3 sub-function items, such as the 「file mergence」, 「filename changing」 and 「file delete」, and their function property and operation methods will be introduced as follows.

Figure 21A:
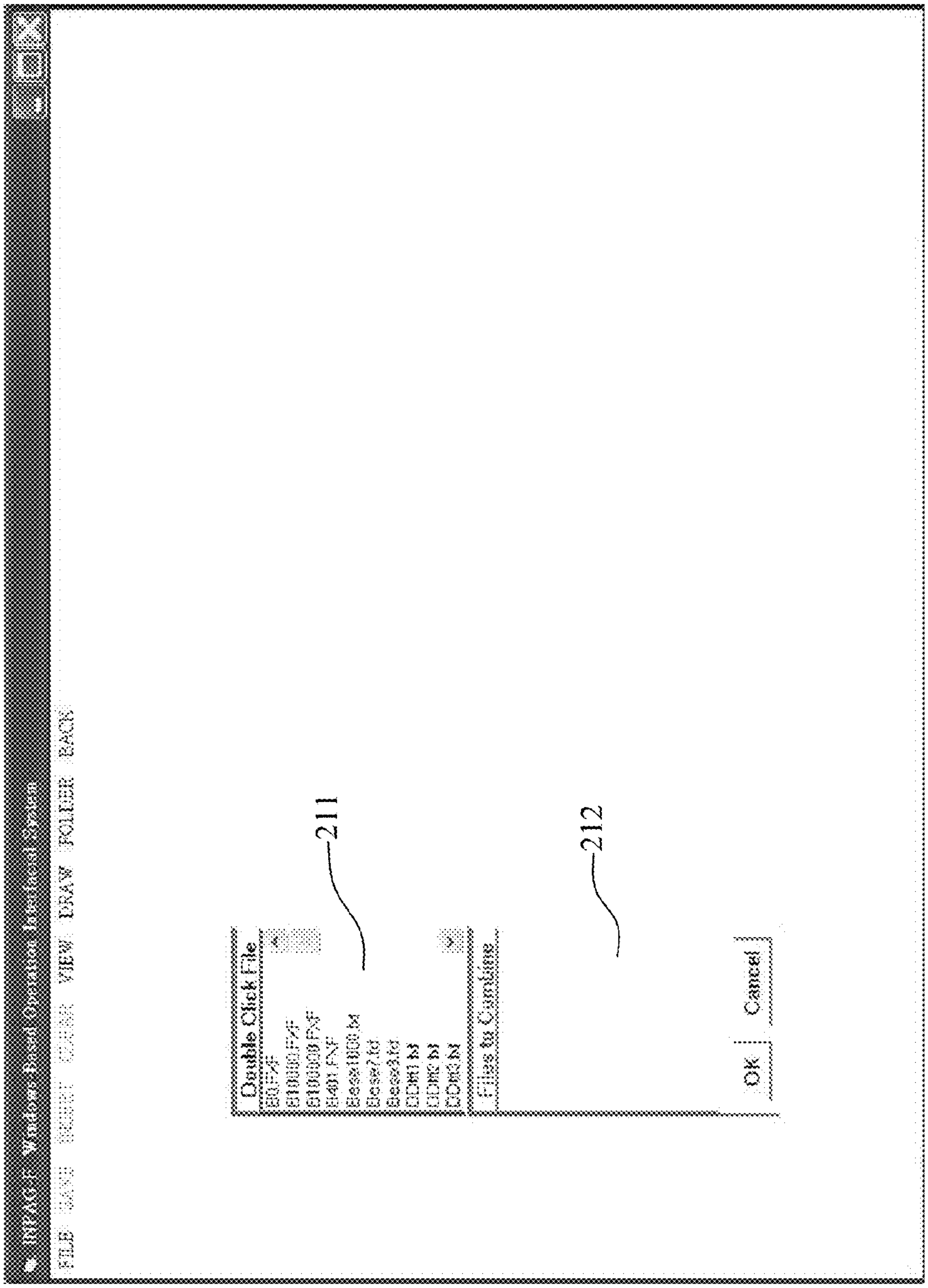
FIG. 21A is the diagram of implementing the file control sub-system of the far-field release assessment sub-system for another system.
Figure 21B:
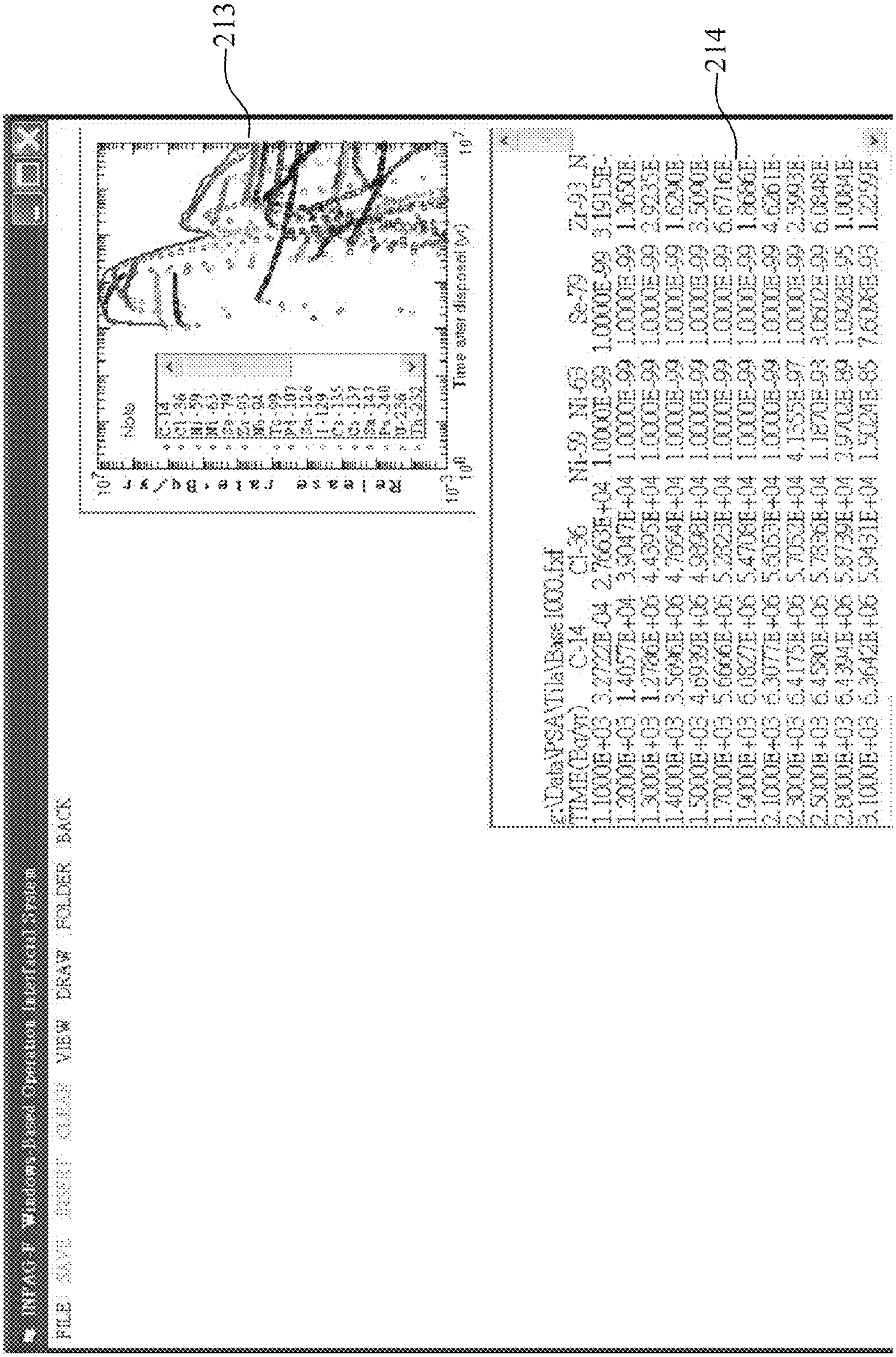
FIG. 21B is the diagram of implementing the file control sub-system of the far-field release assessment sub-system for another system.

After selecting the 「file mergence」, as shown in FIG. 21A, the upper zone is the merging file list 211, when selecting the merging file, the File name will be duplicated to the bottom menu 212, after implementing is as shown in FIG. 21B. The emerging file data that has already merged and displayed by words in 214, as well as drawn in the figure of merged data 213.

When implementing the 「filename changing」 or 「file delete」, users can change the file name or delete the name change or delete the file, and it will not explain herein.

After users opened Old File or a newly added data file, they can use the "Save As" function to save file. The "Save As" function has 4 sub-function items, such as the 「data of the nuclide decay chain, half-life and sorption coefficient」, 「data of natural barrier system (NBS) property」, 「program implementing setting data」, and 「abovementioned 3 data (one complete implementation case)」. After additionally increasing and modifying the data, users can select different sub-function items to save different file data, and it will not explain herein.

After opening Old File or newly added data file, the "Insert" function can then be applied. After selecting the "Insert" function item, users can use such function item to insert other nuclide items to connect and form a new nuclide data content.

After opening Old File, the "Clear" function item can then be applied; in addition, after using such function, users can clear nuclide decay chain, half-life, sorption coefficient, decay chain, and the element's sorption coefficient in the host rock.

Figure 22A:
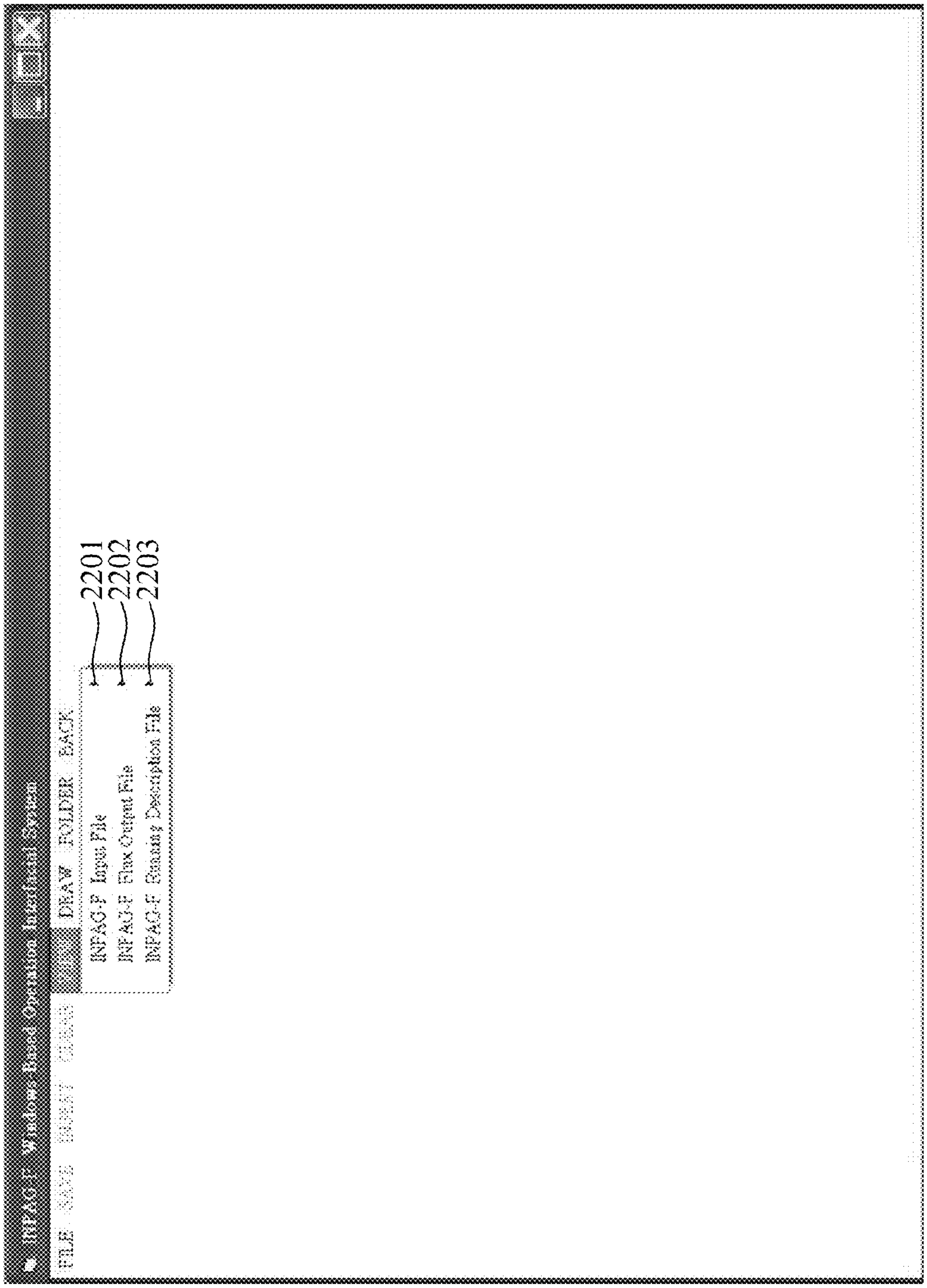
FIG. 22A is the diagram of implementing the Review function sub-system of the far-field release assessment sub-system for the system.

After implementing "Review" function, as shown in FIG. 22A, the "Review" function item will then contain the following 3 sub-function items, such as the 「program implementing data input file」 2201, 「program implementing output file」 2202 and 「program implementing output explanatory file」 2203, and they will be introduced as follows.

Figure 22B:
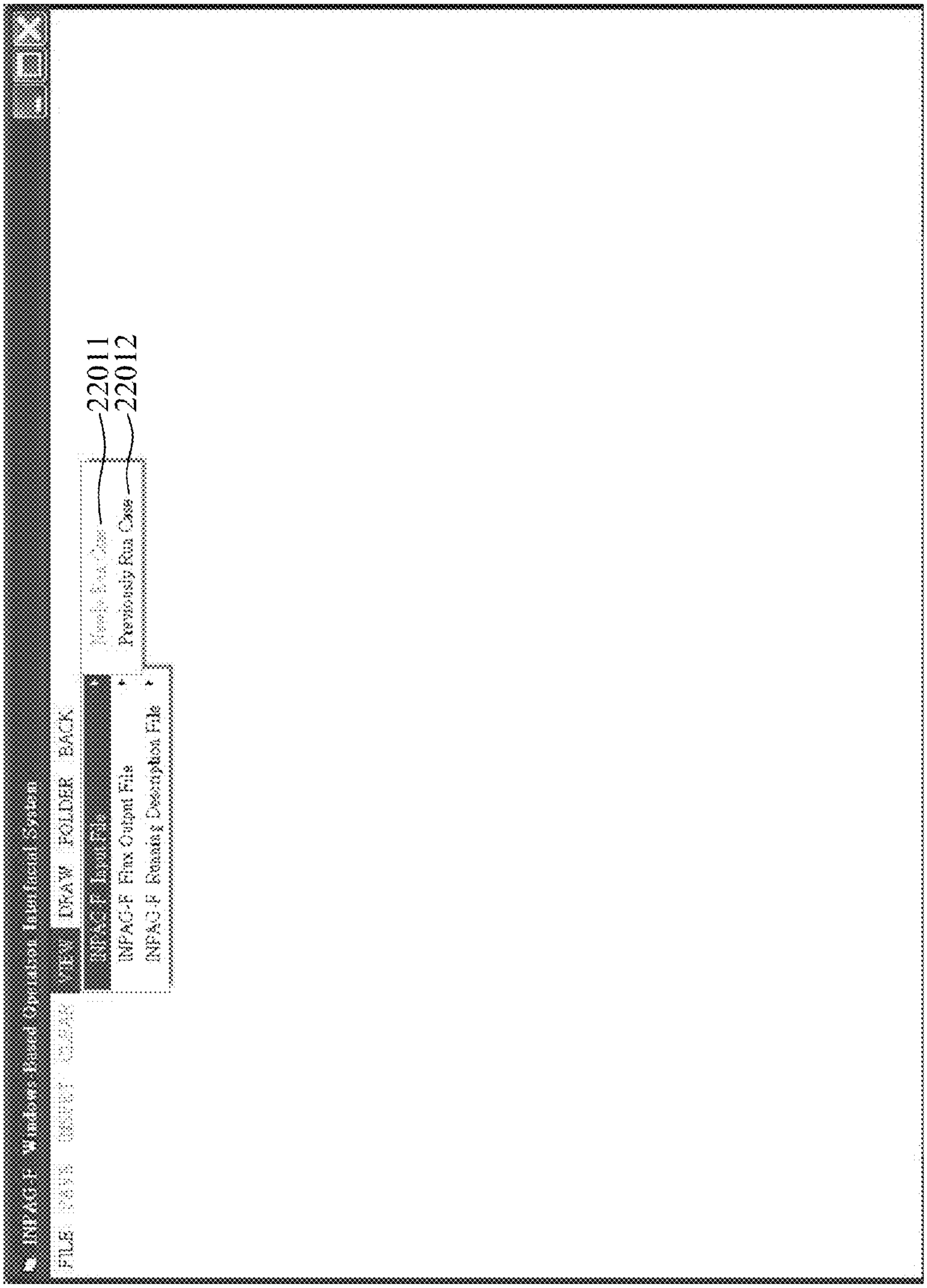
FIG. 22B is the diagram of implementing the Review function sub-system of the far-field release assessment sub-system for another system.

After selecting the 「program implementing data input file」 2201 function item, the 「program implementing data input file」 function item is also includes 2 sub-function items, such as the 「latest saved file」 22011 and 「previously established file」 22012, as shown in FIG. 22B. If users have not yet implemented the function of 「Implement Previous Data File」 or 「Save As above mentioned 3 data (one complete implementation case)」, and then the sub-function item of 「latest saved file」 for the 「program implementing data input file」 is unable to work then.

Figure 22C:
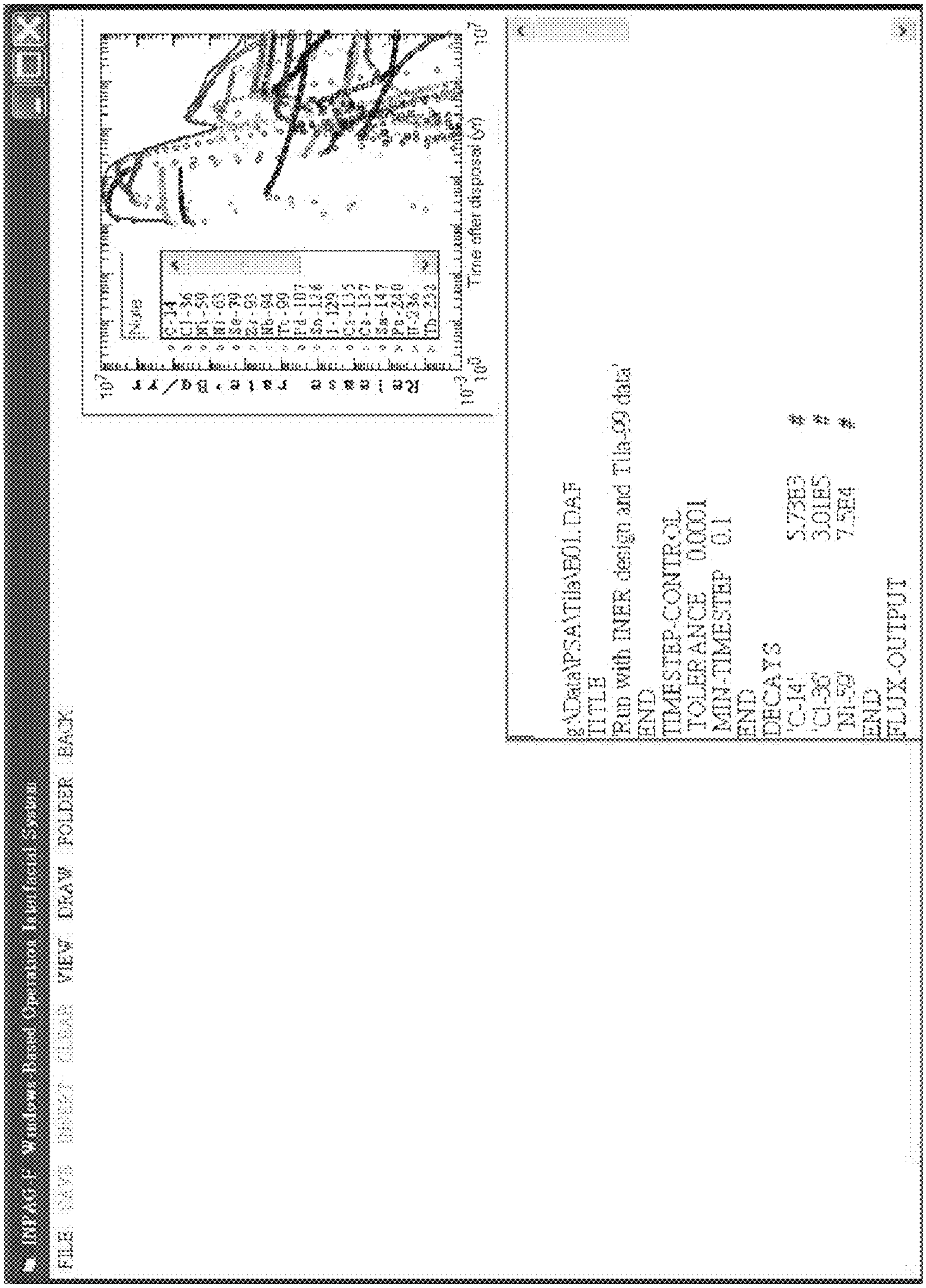
FIG. 22C is the diagram of implementing the Review function sub-system of the far-field release assessment sub-system for another system.

When selecting the function item of 「previously established file」 and the proper file data is implemented, the implemented result is as shown in FIG. 22C. File inputted by such function is the input file that is established for the data of the far-field release assessment sub-system.

Figure 22D:
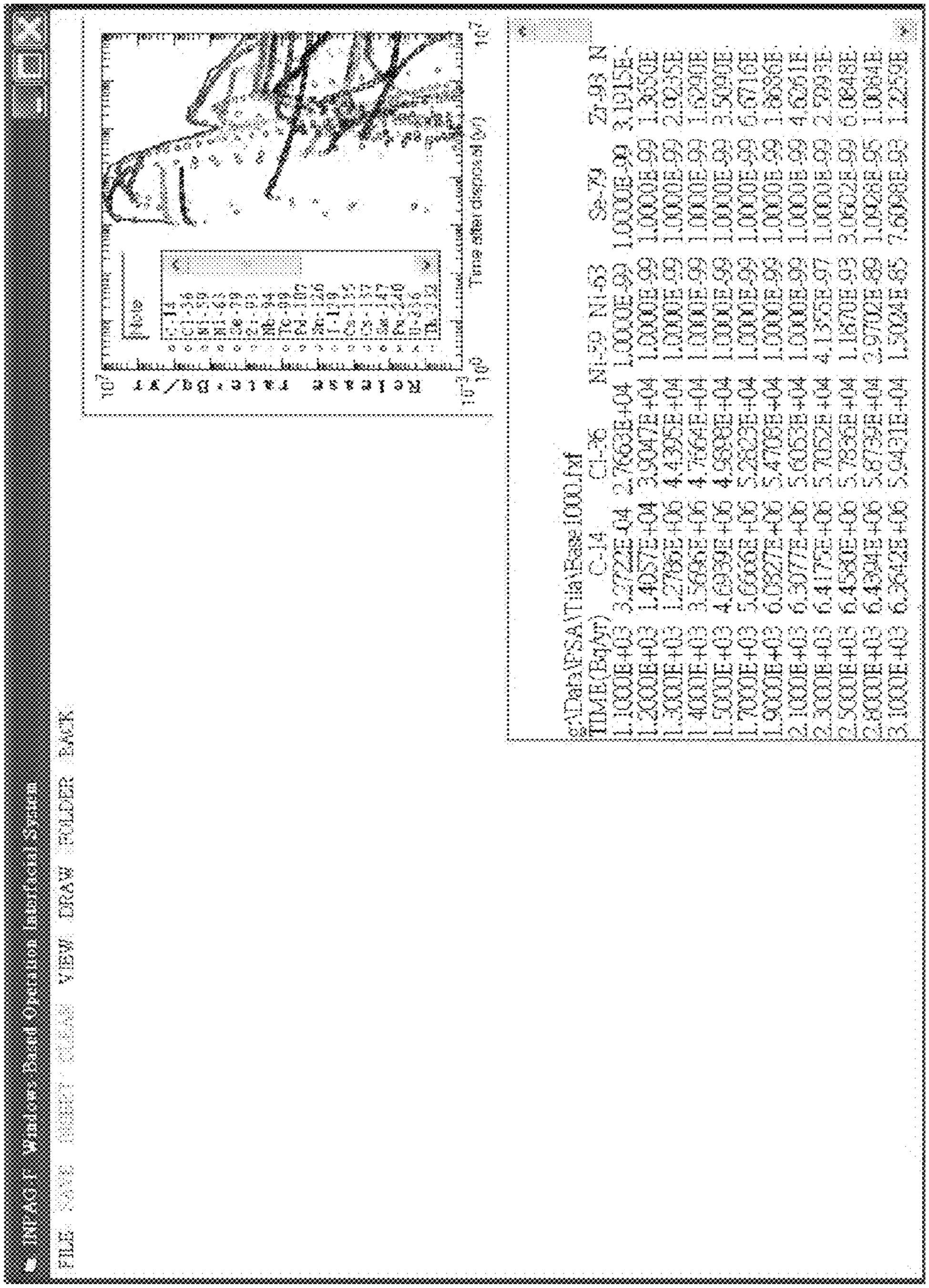
FIG. 22D is the diagram of implementing the Review function sub-system of the far-field release assessment sub-system for another system.

After selecting the 「previously established file」 of the 「program implementing output file」 function 2202, and after selecting the proper file data and is implemented, the implemented result is shown in FIG. 22D, and the input data of the function is the nuclide release flux output data when implemented the far-field release assessment sub-system.

Figure 22E:
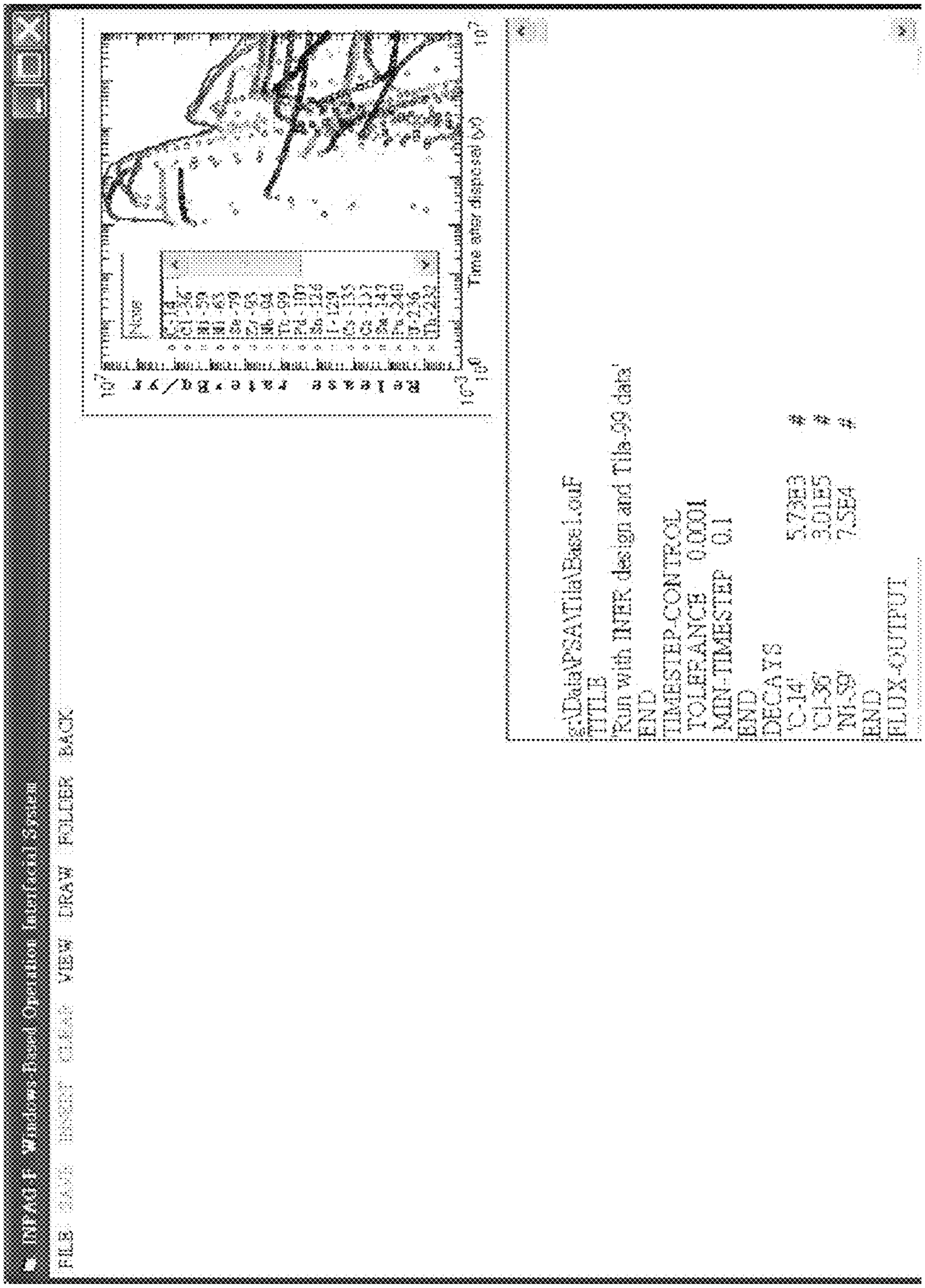
FIG. 22E is the diagram of implementing the Review function sub-system of the far-field release assessment sub-system for another system.

After selecting the 「previously established file」 of the 「program implementing output explanatory file」 function 2203, and after selected the proper file data and implemented, the implemented result is shown in FIG. 22E, and the inputted data of the function is the output explanatory file when implemented in the far-field release assessment sub-system.

In FIG. 4B, after selected the "Drawing" 426 function item, "Drawing" function item is contained in 5 sub-function items, such as the 「recently implemented case」, 「previously implemented case」, 「modified Y-axis」, 「modified X-axis」 and 「adding figure」.

If users have not yet calculated and implemented the far-field release assessment sub-system, then only the sub-function item of 「previously implemented case」 is effective and other 4 sub-function items will be temporarily ineffective. When users select the sub-function items of 「recently implemented case」 or 「previously implemented case」, after properly selecting the file, and then those sub-function items of 『modified Y-axis』, 『modified X-axis』 and 『adding figure』 can then be effective. Operation and function of these 5 sub-function items under the function item will be explained as follows.

After selecting the 『recently implemented case』 function item, the system will display the output result on the screen of data and figure that recently implemented the far-field release assessment sub-system, as shown in FIG. 20; at this moment, users can conduct other sub-function items of the "Drawing" function item, such as 『modified Y-axis』, 『modified X-axis』 and 『adding figure』, to clearly observe the changing situation of release flux for each nuclide.

After selecting the 『previously implemented case』 function item, and selecting the file, the system will display the screen of the output result and figure as shown in FIG. 20.

Figure 23:
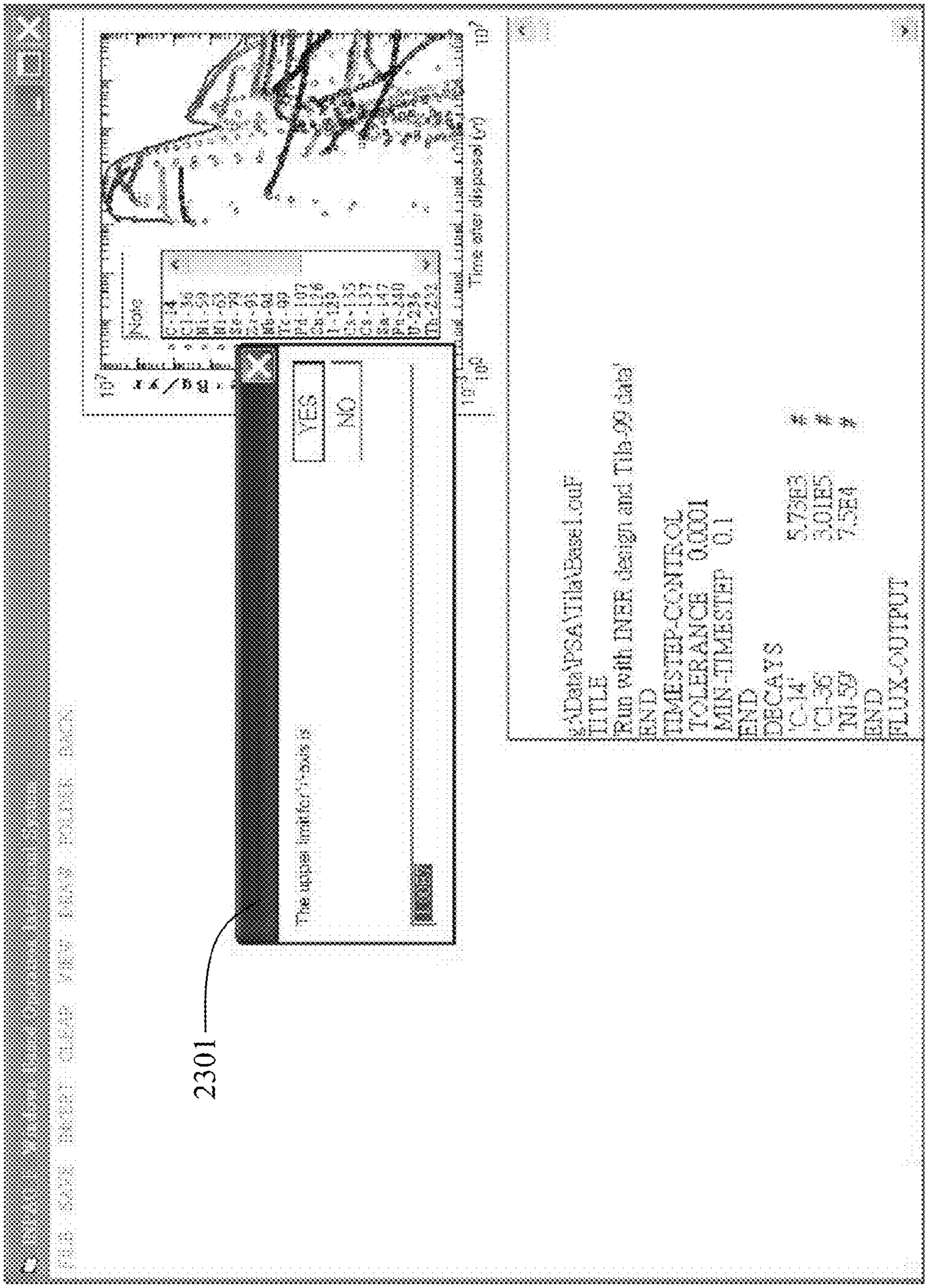
FIG. 23 is the diagram of implementing the Drawing function sub-system of the far-field release assessment sub-system for the system.

After selecting the 『modified Y-axis』 function item, the 『modified Y-axis』 function item is included 2 sub-function items, such as the 『maximum value』 and 『minimum value』. If selecting the 『maximum value』 function item, as shown in FIG. 23, users can input Y-axis's maximum value 2301, and then change Y-axis's maximum value in the figure. Similarly, if adopting the 『minimum value』 function item, the minimum value can be changed in the figure.

As for the effect of 『modified X-axis』 function item, as the introduction of the 『modified Y-axis』 function item, X-axis's maximum/minimum value can be changed in the figure, and it will not explain herein.

After selecting the 『adding figure』 function item, the system will display a file list, and after selecting the designated file, the figure of such file can be stacked onto the original figure; as a result, users can then be displayed different output results on a same screen, and it will also not explain herein.

After selecting the "Work Directory" function item, "Work Directory" contains 3 sub-function items, such as 『Display the Current Work Directory』, 『Change Work Directory』 and 『Establish New Work Directory』, as implied by the names, their functions are respectively notifying users of the current directory path of system and data, and users can then select the designated path to understand the directory path for their system and data, and they can also establish the path of a new directory to add a new directory as well.

Next, the preparation function of the input file for multiple running data in the far-field release assessment sub-system will be explained; the implementation of such preparation function of the input file for multiple running data in the far-field release assessment sub-system is similar to the implementation of preparation function of the input file for multiple running data in the near-field release assessment sub-system, except to implement the parameter sampling system in advance, the type of sampling parameter arrangement that is adopted by the far-field release assessment sub-system shall be identical to the type of sampling parameter arrangement that is used by the near-field release assessment sub-system. Since the output data file of the nuclide release rate that generated from the near-field release assessment sub-system shall be used when implementing the far-field release assessment sub-system; in addition, as considering the consistence of the parameter for further analysis process, users have been recommended to continuously implement the preparation function of the input file for multiple running data in the far-field release assessment sub-system after completely implementing the preparation function of the input file for multiple running data in the near-field release assessment sub-system to facilitate the further analysis of the near-field and far-field nuclide release uncertainty and parameter sensitivity.

Figure 24:
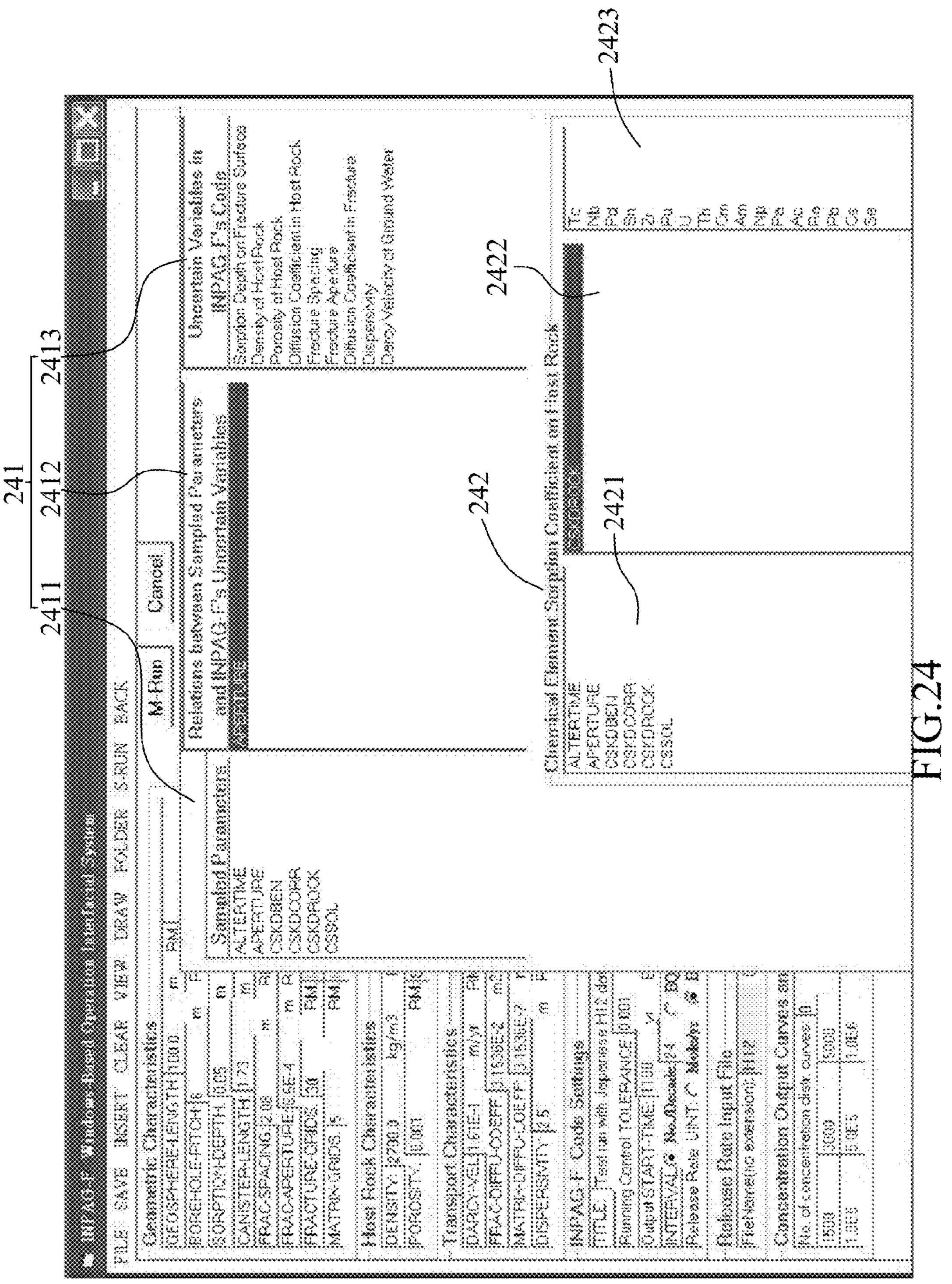
FIG. 24 is the diagram of implementing the preparation function of data input file for the multiple running of the far-field release assessment sub-system in the system.

The preparation function of the input file for the multiple running of the far-field release assessment sub-system data, as shown in FIG. 24, can be divided into 2 major nuclide property data correlative zones: (1) disposal facility design and geologic property correlative setting zone 241 (the parameter list of the well-obtained data 2411, the parameter of well-obtained data and the correlative setting list of the far-field release assessment sub-system that needs to be explored the variable sensitivity 2412, the random parameter list in the far-field release assessment sub-system 2413). (2) The correlative setting zone of chemical element's sorption coefficient in the host rock 242.

As implied in the name, the property correlative zone 241 is used to connect with uncertain parameters that are related to the disposal facility design and geologic property, etc.; the property correlative zone 242 is used to connect with the uncertain sorption coefficient for related chemical element in host rock. Each property correlative zone contains 3 blocks, such as the well-sampled parameter name list block 2411 on the left; the random parameter list block 2413 in the far-field release assessment sub-system on the right; or the element name list block 2423; and the correlative list block in the middle. Functions of these 2 property correlative zones will be explained as follows.

Figure 25:
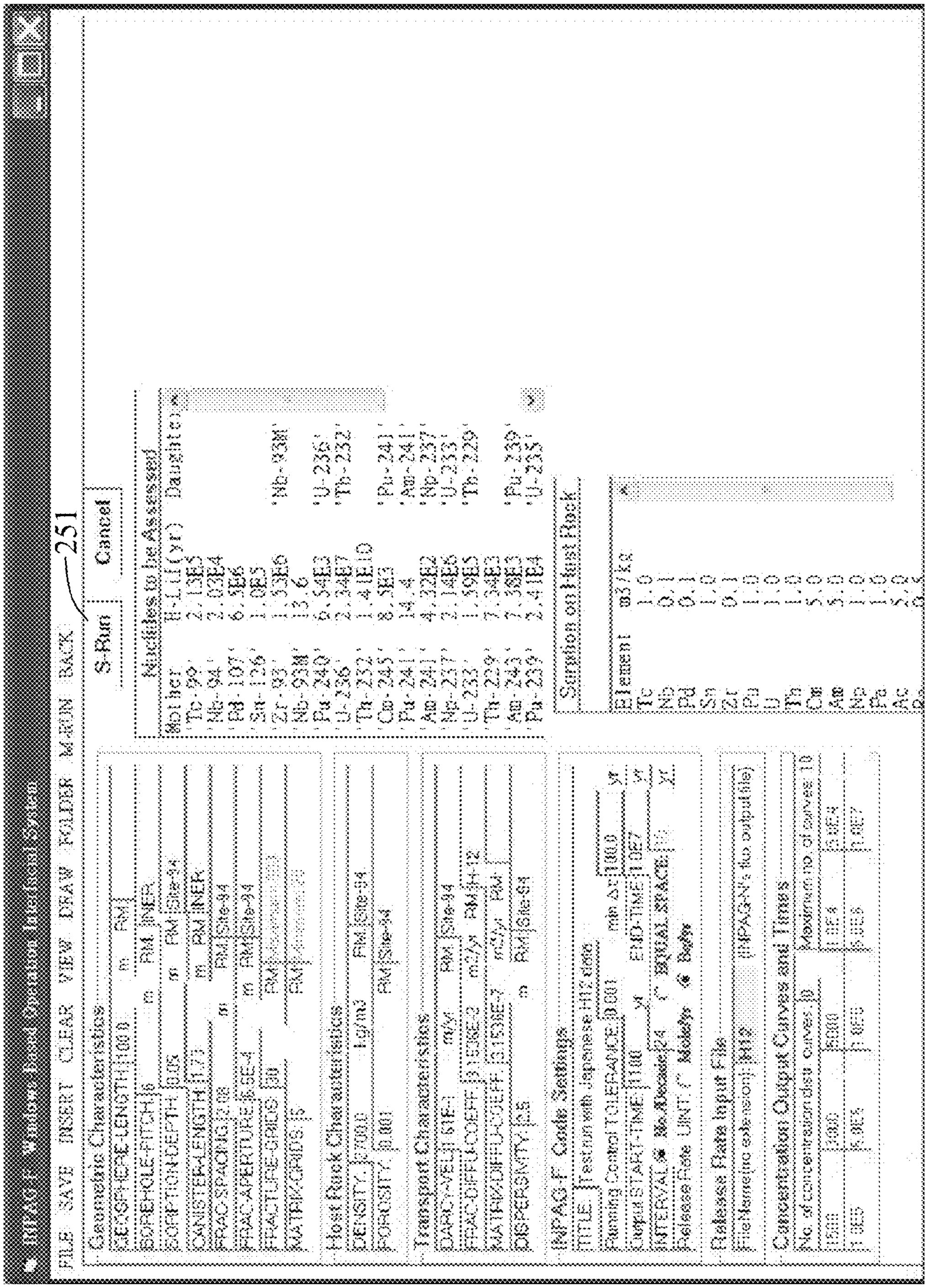
FIG. 25 is the diagram of implementing the data input of the far-field release assessment sub-system for the system.

After implementing the parameter sampling system and completing the multiple running of the near-field release assessment sub-system, the system will be automatically accessed to the far-field release assessment sub-system where users can then select the proper file data to input a complete data input file of the far-field release assessment sub-system to the far-field release assessment sub-system, as shown in FIG. 25. If, at this moment, users selected the function of "Single Running" 251, then a single assessing function can then be directly implemented for the far-field release assessment sub-system.

Figure 26:
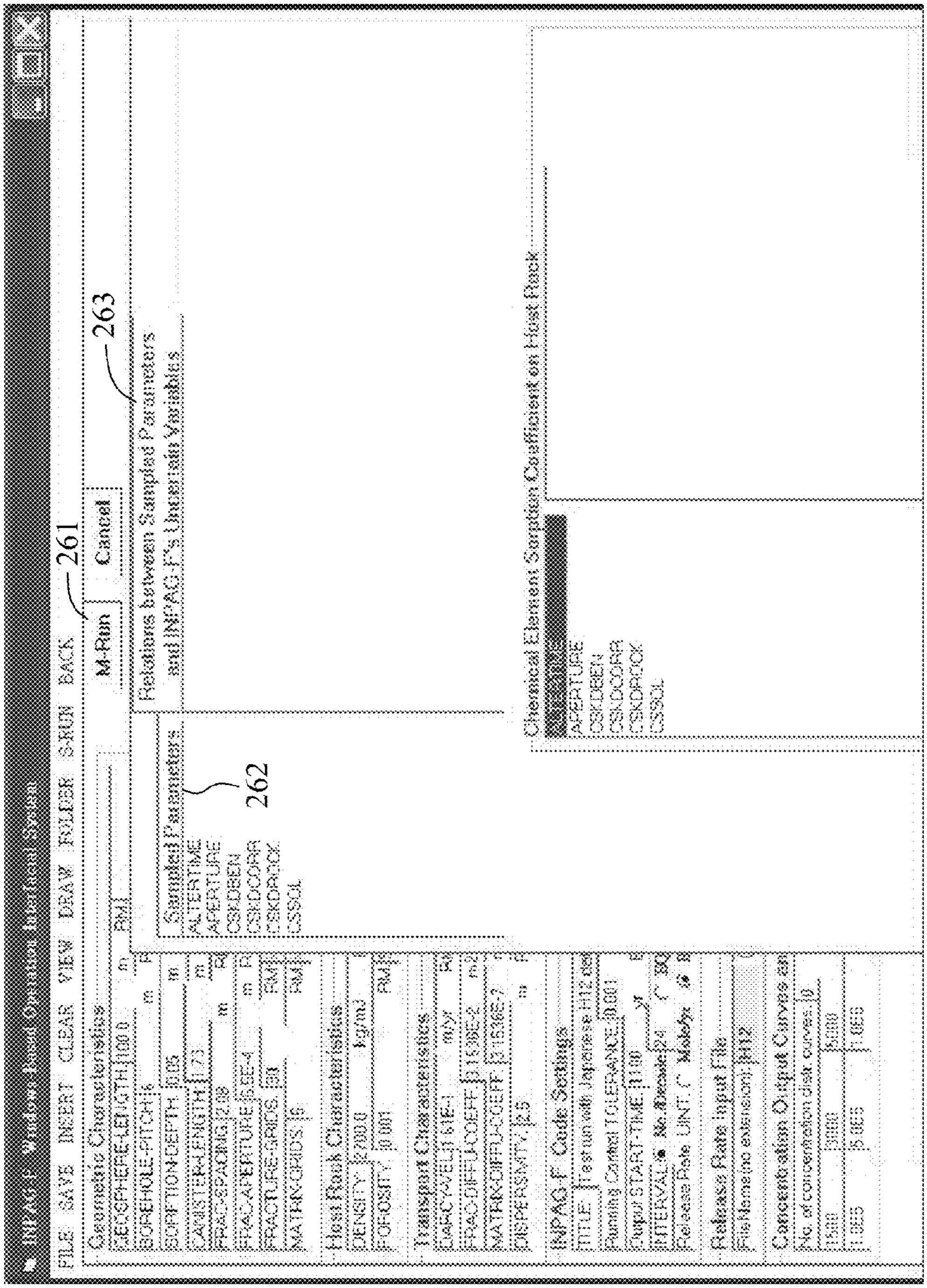
FIG. 26 is the diagram of implementing multiple running of the far-field release assessment sub-system for the system.

Next, implementing the function of "multiple running" 261 in FIG. 26, in the list 262 of "parameter list of the well-obtained data", selecting the parameter of assessing variable sensitivity, and then such parameter will be automatically added into the list 263 of "parameter table of the well-obtained data and using the far-field release assessment sub-system to explore the correlative setting for variable sensitivity", users can also delete the parameter from the list of the "parameter table of the well-obtained data and using the far-field release assessment sub-system to explore the correlative setting for variable sensitivity".

Figure 27:
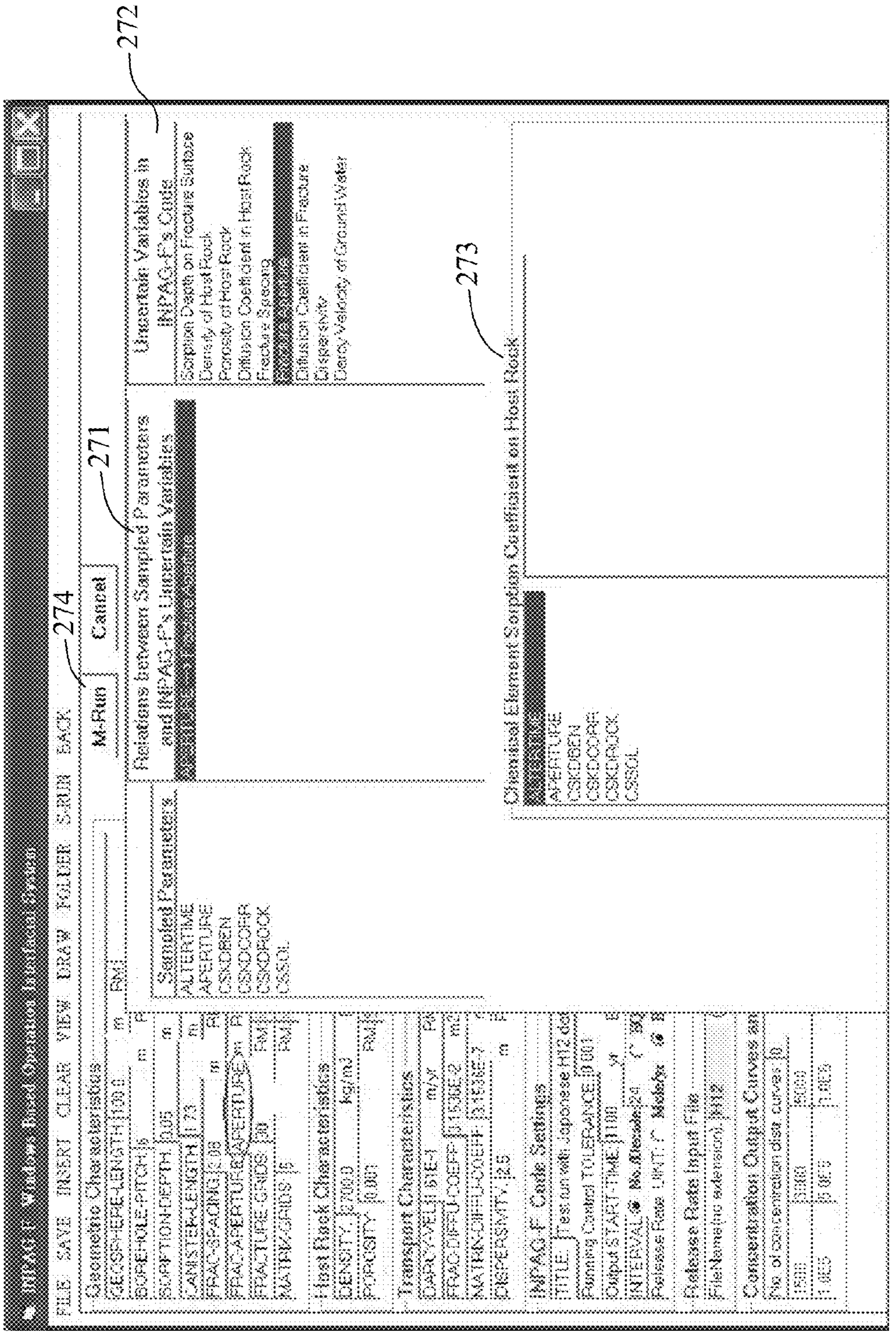
FIG. 27 is the diagram of implementing the correlative function for the variable sensitivity of the far-field release assessment sub-system in the system.

As shown in FIG. 27, in the list 271 of "parameter table of the well-obtained data and using the far-field release assessment sub-system to explore the correlative setting for variable sensitivity", after selecting the parameter, the system will display "the random parameter list in the far-field release assessment sub-system" 272, and in such list, users can then select the parameter of the far-field release assessment sub-system that related to the parameter needs to be assessed its variable sensitivity.

Similarly, selecting the parameter from the list of "chemical element's sorption coefficient in the host rock" 273 that needs to assess the variable sensitivity, the parameter will be added into the attached list, and users can also delete the parameter that they want to delete in the list, and it will also not explain herein.

Figure 28:
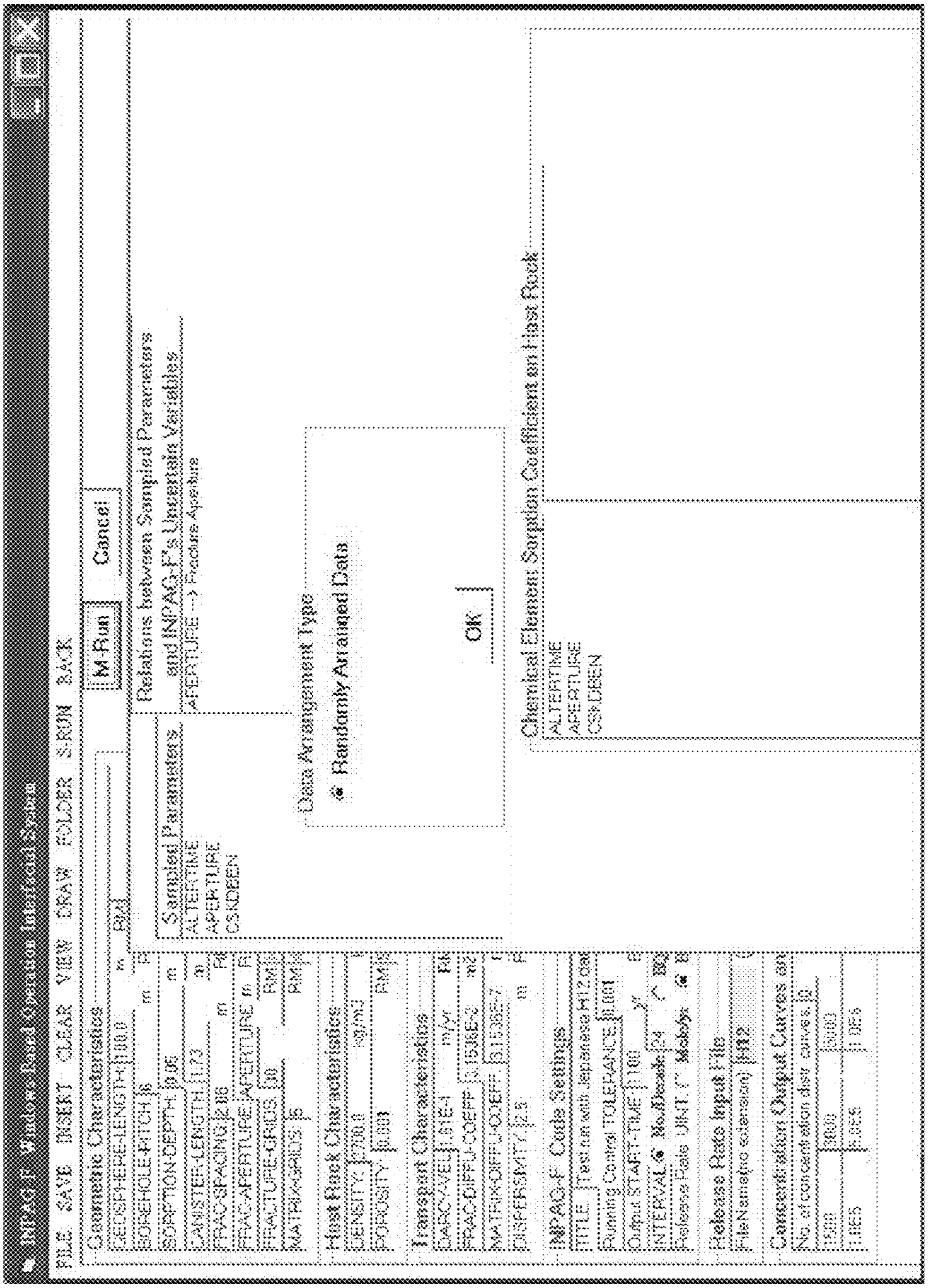
FIG. 28 is the diagram of implementing the multiple running of random sampling for the far-field release assessment sub-system in the system.
Figure 29:
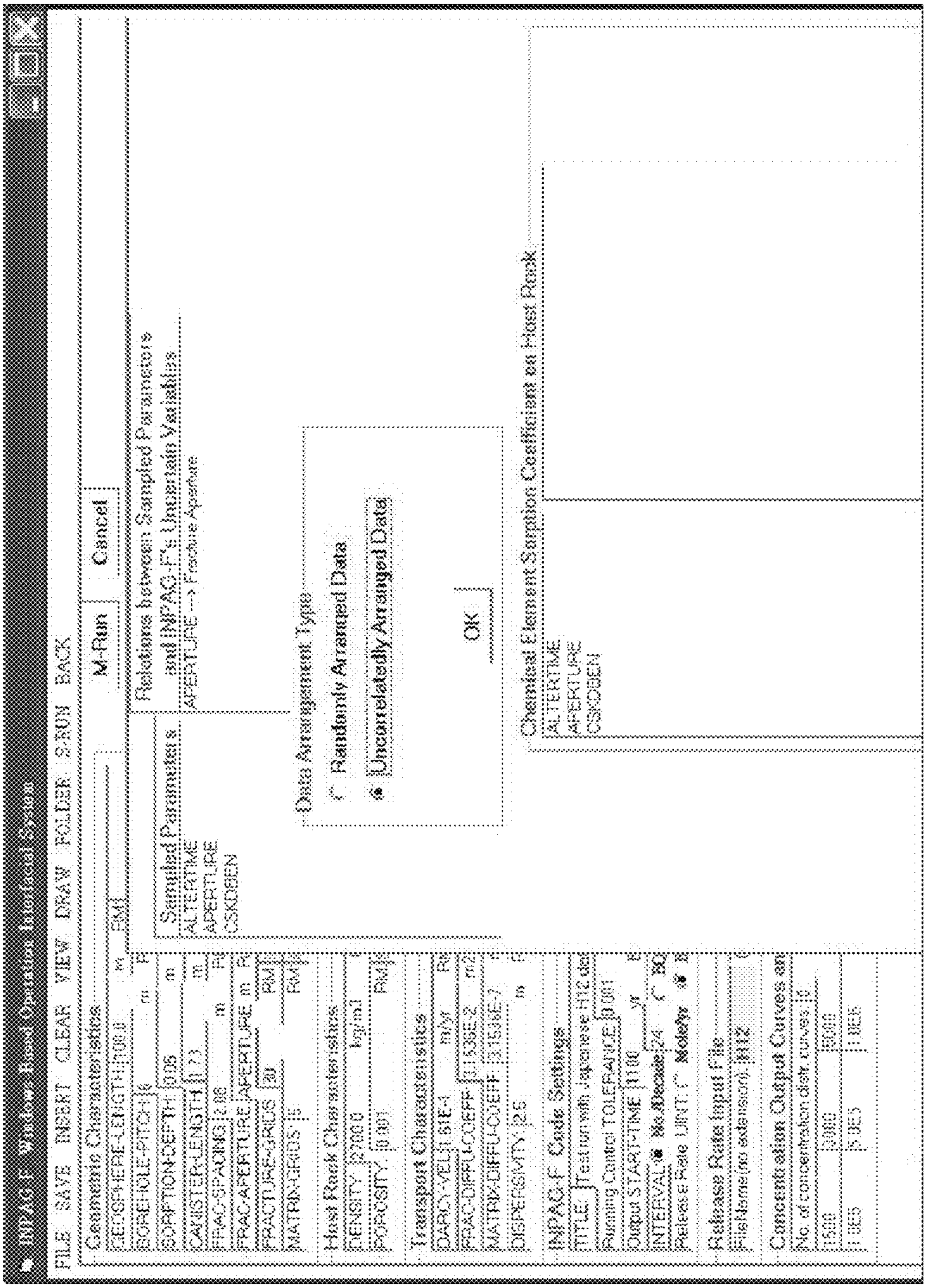
FIG. 29 is the diagram of implementing the multiple running of Latin hypercube sampling for the far-field release assessment sub-system in the system.
Figure 30:
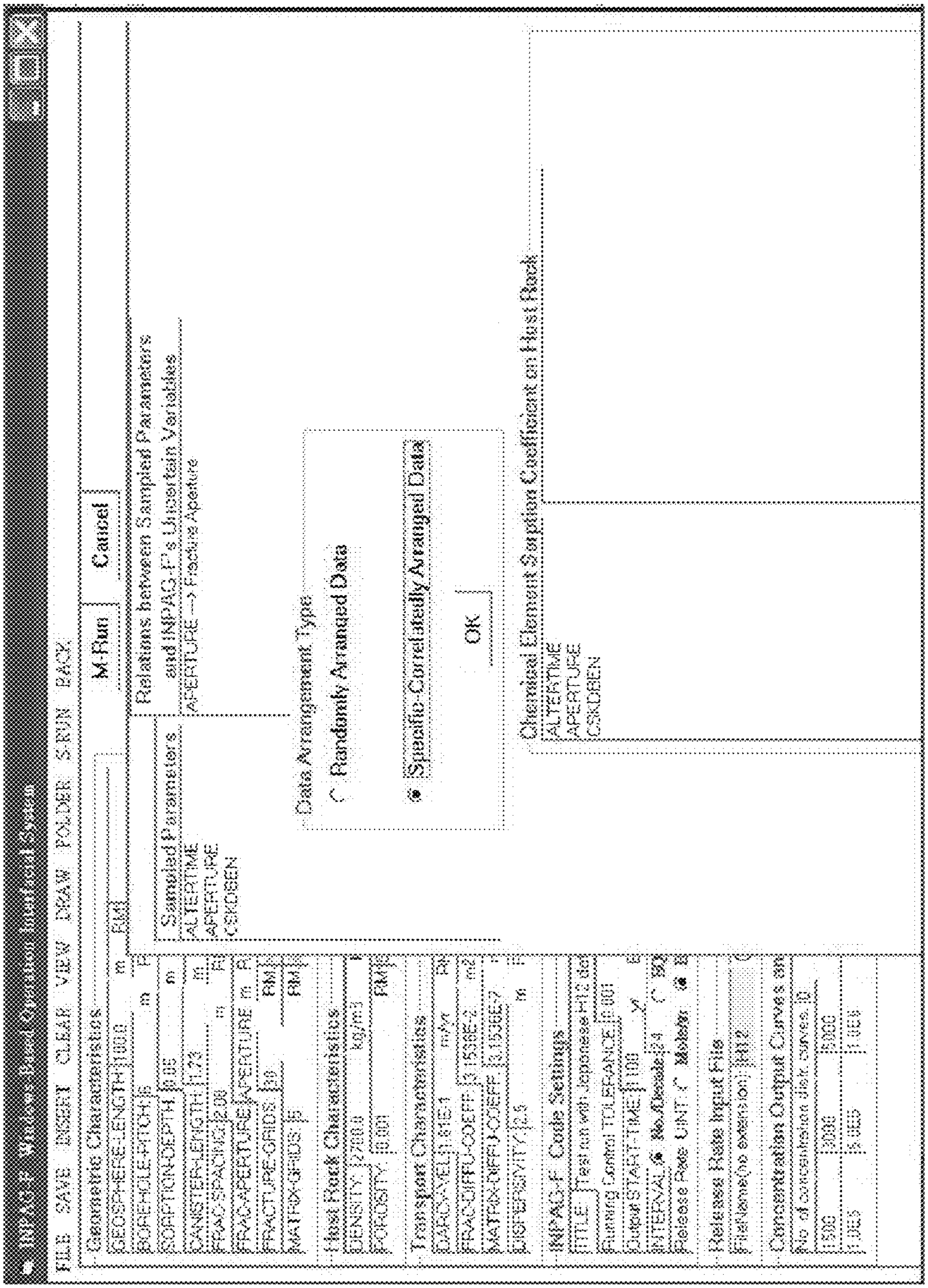
FIG. 30 is the diagram of implementing the multiple running of Latin hypercube sampling for the far-field release assessment sub-system in another system.

After completing the correlation setting of the sensitivity parameter that needs to be assessed, select the "multiple running" function 274 from the FIG. 27; in addition, adopt the Monte Carlo Random Sampling method to sample in the multiple running of the near-field release assessment sub-system. Since Monte Carlo Random Sampling is only adopting the random sampling method, thus the current multiple running of the far-field release assessment sub-system will only display the option of "using random arrangement data", as shown in FIG. 28; in the multiple running of the near-field release assessment sub-system the Latin Hypercube Sampling is adopted to sample and implement the option of "using random arrangement data", and then the result for the multiple running of the far-field release assessment sub-system will be consistent to the sampling operation by using Monte Carlo Random Sampling, as shown in FIG. 28; if adopting Latin Hypercube Sampling to sample the multiple running of the near-field release assessment sub-system, and after implementing the option of "using non-correlative arrangement data", then this multiple running of the far-field release assessment sub-system will display the result as shown in FIG. 29; if applying the Latin Hypercube Sampling to sample the multiple running of the near-field release assessment sub-system, and after implementing the option of "using specific correlative arrangement data", then this multiple running of the far-field release assessment sub-system will display the result as shown in FIG. 30. Since the consistence for the calculation and analysis is under the multiple running of the far-field release assessment sub-system system, the previously selected parameter sampling method for the multiple running of the near-field release assessment sub-system can only be displayed without any change or modification.

Figure 31:
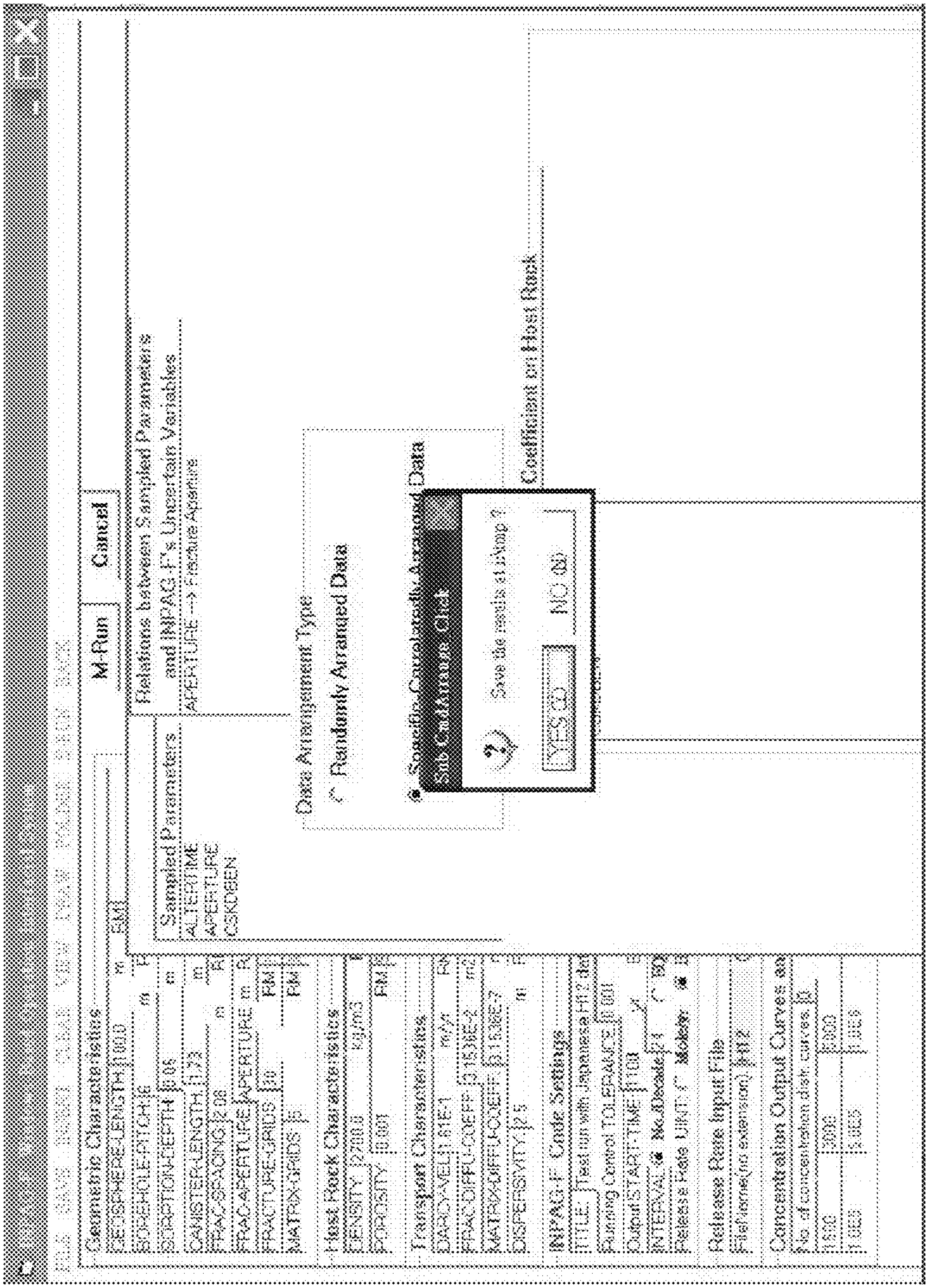
FIG. 31 is the diagram of implementing the multiple running of the far-field release assessment sub-system for another system.

In FIG. 30, after selecting the "selecting data arrangement type", the calculated result is as shown in FIG. 31. The system will make sure whether users will save the related data of this multiple running into the current directory or not, or users can change the sub-directory or can self establish a new sub-directory. In addition, the system will arrange the parameter that needs to be analyzed to the sensitivity according to the selected type of parameter arrangement to orderly write the parameter into the file they named in order to maintain the consistency in the type of parameter sampling arrangement for the near-field release assessment sub-system and multiple running of the far-field release assessment sub-system.

Next, the system will request users to input the nuclide flux output file name after completing the implementation of the far-field release assessment sub-system that is required for implementing the near-field release assessment sub-system.

The system according to the selected data arrangement type to automatically complete the number of data input file that is required for the far-field release assessment sub-system, then the system will automatically switch to the near-field release assessment sub-system and the multiple running of the far-field release assessment sub-system; thus, the pre-operation process is completed for the multiple running of far-field release assessment sub-system.

Next, the system's multiple running function will be introduced as follows, the invention's multiple running function is designed by focusing on the multiple running near-field release assessment sub-system and/or far-field release assessment sub-system; therefore, before implementing the multiple running function, the preparation function of the data input file shall be implemented in advance for the near-field release assessment sub-system and/or multiple running of the far-field release assessment sub-system.

Figure 32:
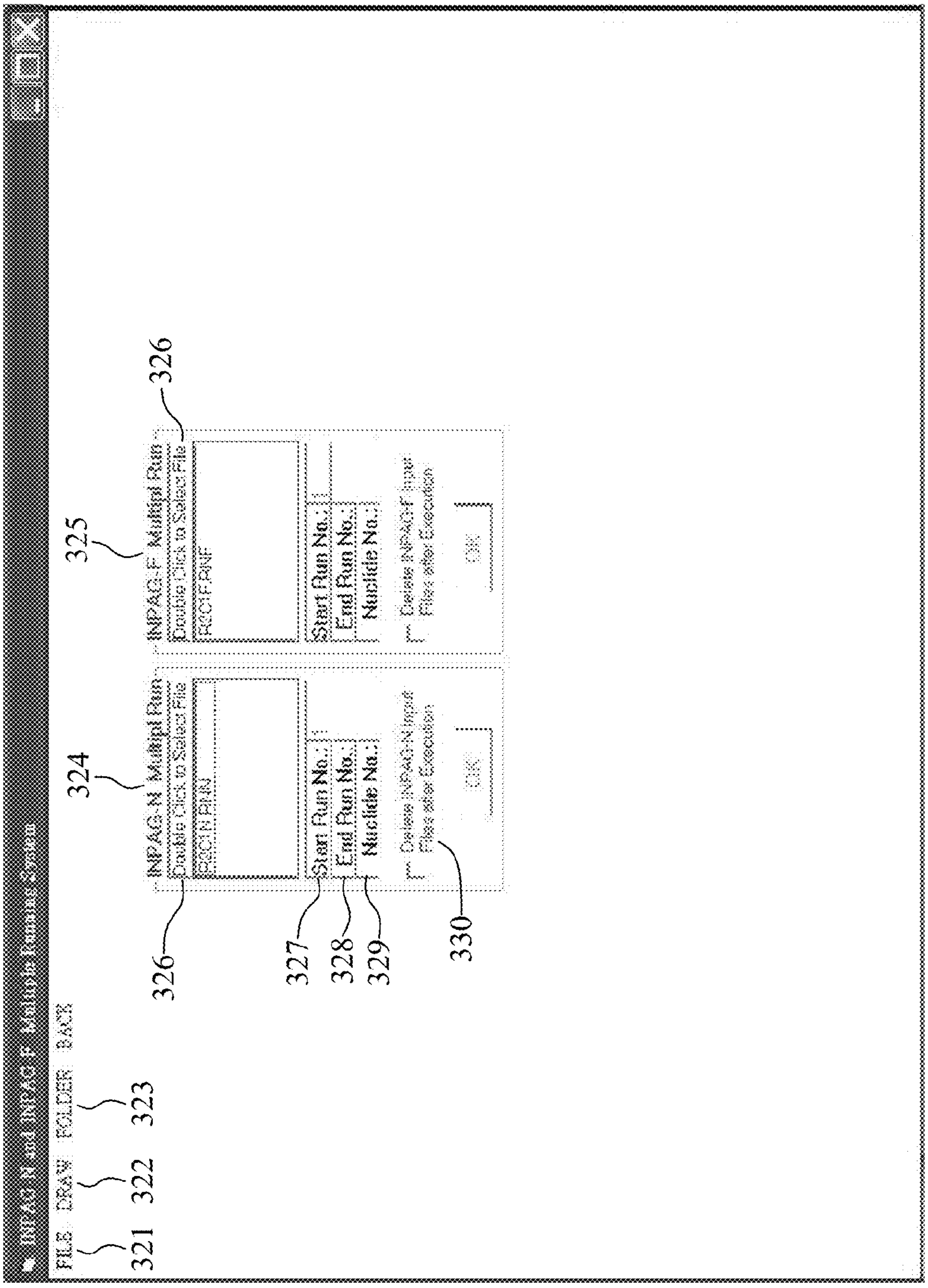
FIG. 32 is the diagram of implementing the multiple running for the system.

The system's multiple running function is as shown in FIG. 32, and from FIG. 6.1.1, the system multiple running function is included in those sub-functions, such as "File" 321, "Drawing" 322 and "Work Directory" 323. From FIG. 32, the system's multiple running function is also included in those functions, such as "multiple running of the near-field release assessment sub-system"324 and "multiple running of the far-field release assessment sub-system"325. File names displayed in the function of "single click/double click on these following files" 326 that can be implemented in the multiple running process, and these files have been established after respectively implementing the "preparation system of the input file for multiple running data of the near-field release assessment sub-system data" and "preparation system of the input file for multiple running data of the far-field release assessment sub-system data". After selecting certain files from these files, the bottom values of "final implementation round" 328 and "nuclide number" 329 will be automatically set then. After accessing the system's multiple running function, the function of "Work Directory" can be selected to change the Work Directory to those sub-directory items which have already saved the multiple running files for the near-field release assessment sub-system and the far-field release assessment sub-system.

Figure 33:
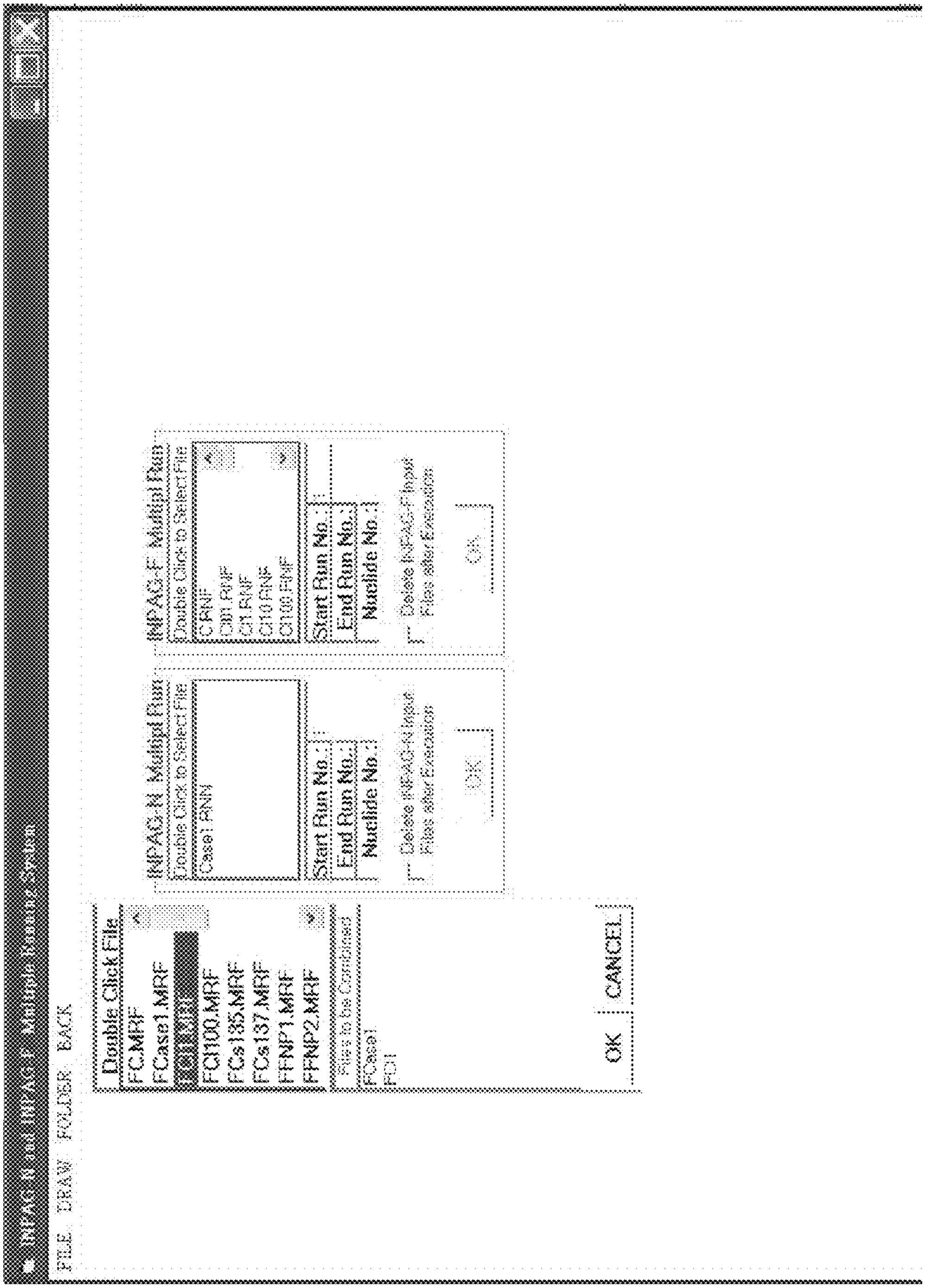
FIG. 33 is the diagram of implementing the file mergence function for the multiple running function sub-system in the system.

The "File" function of the system's multiple running function item i-s-includes 3 sub-function items, such as 『file mergence』, 『filename changing』 and 『file delete』, after selecting the 『file mergence』, as shown in FIG. 33, users can select those files they want to merge, and then the File name will be duplicated to the bottom menu. After selecting the merging files, and implementing the 『mergence』 function, the system will conduct the file mergence function. The system has file 『mergence』 function since the number of nuclide is too many, and it will consume a lot of time when implemented in the far-field release assessment sub-system; therefore, first divide the nuclide into several files to be individually implemented (only the decay chain related can be divided) to save the calculation time, wait to completely implement all divided files, and then merge the result of each implemented file into a complete output file.

Users can use the functions of 『filename changing』 and 『file delete』 to change the file names and delete the files that they want to change and delete.

The operation of the "Drawing" function of the system's multiple running function is totally identical to the "Drawing" 426 function in FIG. 4B, and it will not explain herein.

After selecting the "Work Directory" function item, the "Work Directory" function item is included in 3 sub-function items, such as 『Display the Current Work Directory』, 『Change Work Directory』 and 『Establish New Work Directory』, and the introduction is as follows.

The system's multiple running functions contains functions, such as 『Display the Current Work Directory』, 『Change Work Directory』 and 『Establish New Work Directory』, and makes users understand the current directory path for their system and data, and they can also select the designated directory path and establish the path of a new directory and save the data into such new directory as well, and it will not explain herein.

"Suspension" function item can only be used for carrying out the program of multiple running near-field release assessment sub-system or the far-field release assessment sub-system, its function is to terminate the currently operating multiple running procedures. Clicking on the "suspension" function item can suspend the implemented multiple running system, the current time consumption for the system will no longer increase; however, the current starting of the system for the near-field release assessment sub-system or the far-field release assessment sub-system will not suspend for implementation, it needs to be manually shut down or automatically suspended after completing the implementation.

If only needing to implement the multiple running of the near-field release assessment sub-system function, wait for completing the parameter sampling and establishing the multiple running of those data input files, and near-field release assessment sub-system system. After selecting the "proceeding multiple running" function item (as shown in FIG. 32) of the "multiple running" function, it will access into the multiple running system; then, after selecting the files from the list of "multiple running of the near-field release assessment sub-system", the system will state the pre-set sampling number and nuclide number. Users shall be notified when conducting the parameter sampling, as it's better to complete the multiple running of the far-field release assessment sub-system function and complete the consistence for parameter arrangement type in order to facilitate the use for further assessment and analysis of the far-field nuclide release. If the data input file has been established previously, then the multiple running of the near-field release assessment sub-system function can directly select the "proceeding multiple running" function item of the "multiple running" system function.

FIG. 32, as for the "initiate implementation round" 327 column value in the "multiple running of the near-field release assessment sub-system" 324 list, its default value is 1, "final implementation round" 328 column value, and the default value is the parameter sampling number, both values can be changed and modified, and it means that users can start calculating by selecting the number of sampling data, the scope will be 1~parameter sampling number. Also, users can directly change the number, but the "initiate implementation round" 327 column value is unable to be less than 1, if it is less than 1, the system is considered as 1, and it is unable to exceed "final implementation round" 328 column value, if it is exceeded the "final implementation round" 328 column value, the system will be considered as the "final implementation round" 328 column value. The "final implementation round" 328 column value cannot be less than the column value of "initiate implementation round" 327; if so, the "initiate implementation round" 327 column value of such system will be considered as the column value of the "initiate implementation round"327, and it cannot be exceeded by the parameter sampling number; if so, the system will be considered as the parameter sampling number.

In FIG. 32, the column of "nuclide number" 329 in the "multiple running of the near-field release assessment sub-system" list indicates that the set analyzing nuclide number in the data input file is unable to be modified or changed. After selecting the "delete the data input file of the near-field release assessment sub-system after implemented" 330 function, all input files after completely implementing the multiple running of the near-field release assessment sub-system data will be deleted then.

Figure 34:
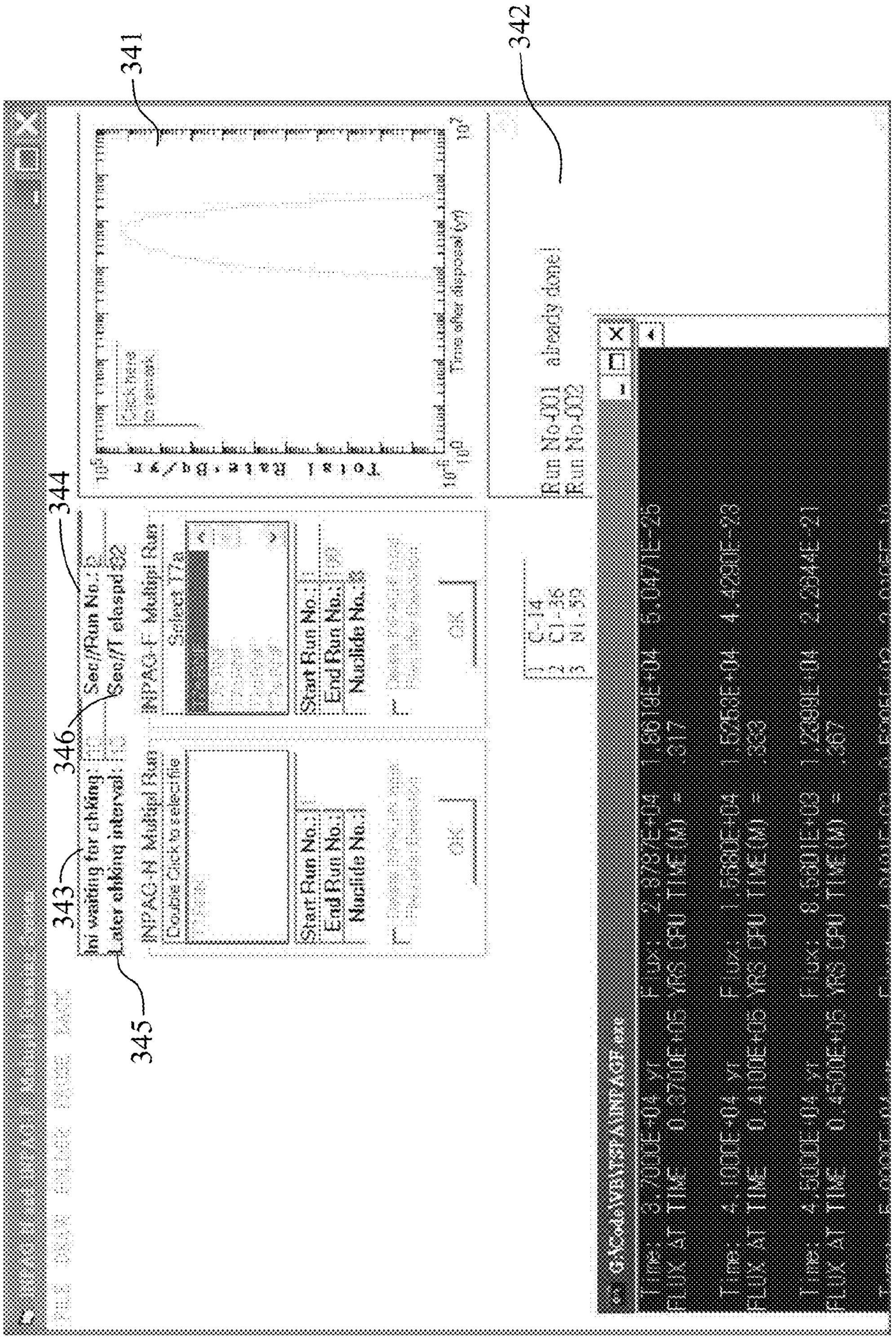
FIG. 34 is the diagram of the result after implementing the multiple running function sub-system of the system.
Figure 35:
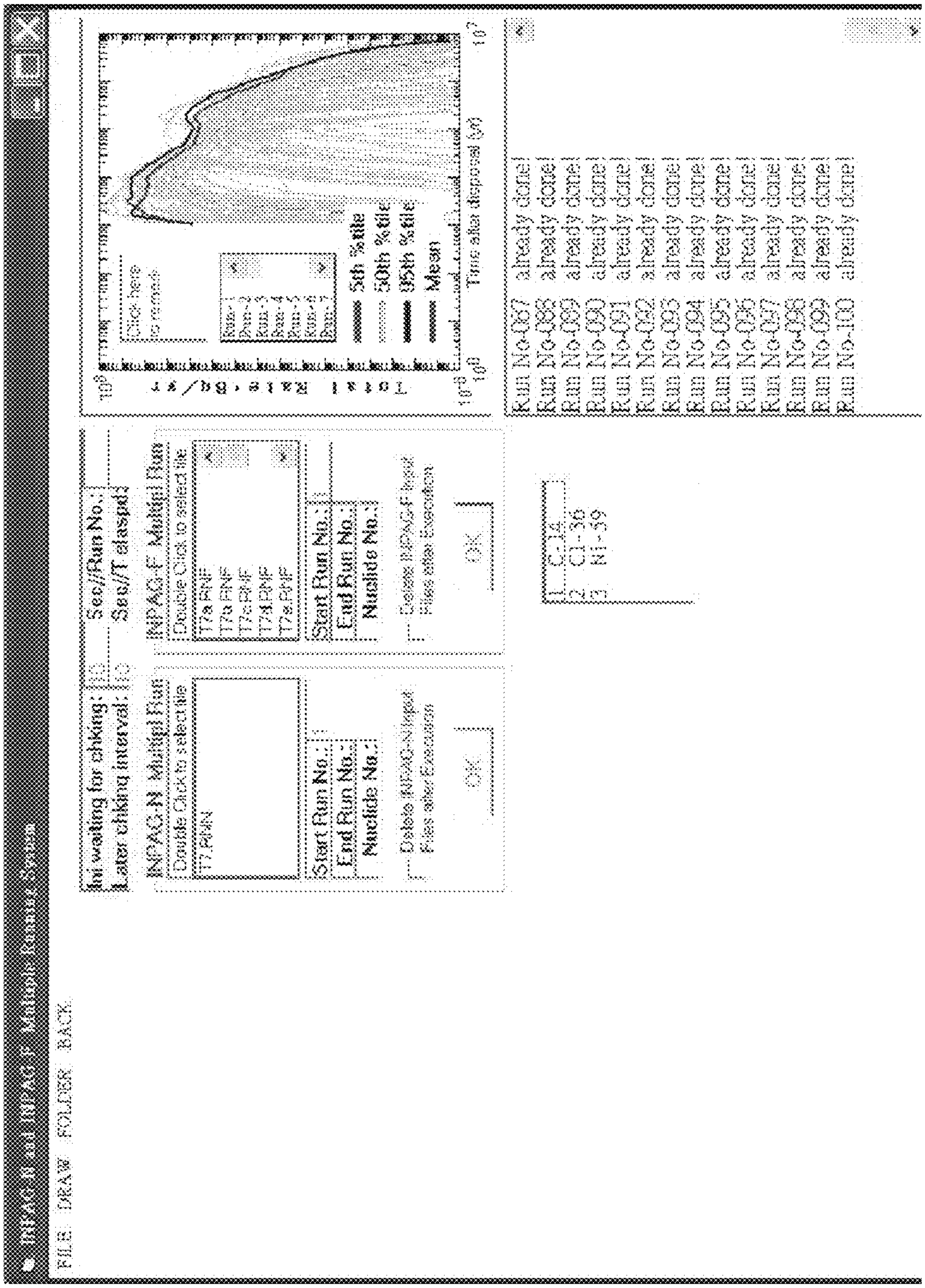
FIG. 35 is the diagram of the result after implementing the multiple running function sub-system of another system.

When each parameter has been completely inputted, and after completely implementing the first multiple running for the near-field release assessment sub-system, the system will draw the first-round nuclide release quantity figure and will automatically initiate the $2^{nd}$-round analysis of implementation, as shown in FIG. 34 until completed all currently selected sampling number as shown in FIG. 35.

FIG. 34 shows the drawing condition that results after implementing the multiple running. From FIG. 34, each complete implementation for the time relationship between the total nuclide release flux and time that can be drawn and displayed as in FIG. 341. If the number of rounds for previously implementing the multiple running, the system will not be implemented again, and will directly be drawn to the Figure for the result, which can save a great deal of time of implementation, such figure has also equipped a word block 342, which can input notes and words, and such FIG. 341 can be also shrunk and magnified to facilitate users' viewing.

From FIG. 34, the system function of "multiple running" contains 4 display items, such as: "set time consumption" 343, "implementation round" 344, "current time consumption" 345, and "time increment" 346, and they will be introduced as follows: "set time consumption" 343 means the multiple running system that after the set time (unit is second), it will start to check and inspect all calling programs if they have been completely implemented or not, and the default value is 1 (second), which can also be changed. "time increment" 346 means that since the time setting, that is the time interval for the system will check and inspect whether the calling program has been completely implemented or not, and the default value is 1 second, which can be changed as well. "Implementation round" 344 means that the number of rounds for the multiple running system is currently implemented. "Current time consumption" 345 means the consumed time (seconds) for the rounds of current implementation for the multiple running system.

Operation methods of implementing the multiple running process for the far-field release assessment sub-system function are similar to those methods of implementing the multiple running of the near-field release assessment sub-system function, and it will not be explained herein.

Next, it will explain the invention's parameter sensitivity and uncertainty analysis function, and the completely implemented multiple running of the near-field release assessment sub-system function and the multiple running of the far-field release assessment sub-system function, and the sensitivity and uncertainty analysis for the parameter of the invention can then be conducted.

Uncertainty and parameter sensitivity analysis is only focused to conduct the analysis on the result that is obtained from implementing the multiple running system. When users complete the near-field release assessment sub-system or the multiple running of the far-field release assessment sub-system process, users can then use the system to conduct the uncertainty and parameter sensitivity analysis on the near-field release assessment sub-system or the multiple running result.

Figure 36:
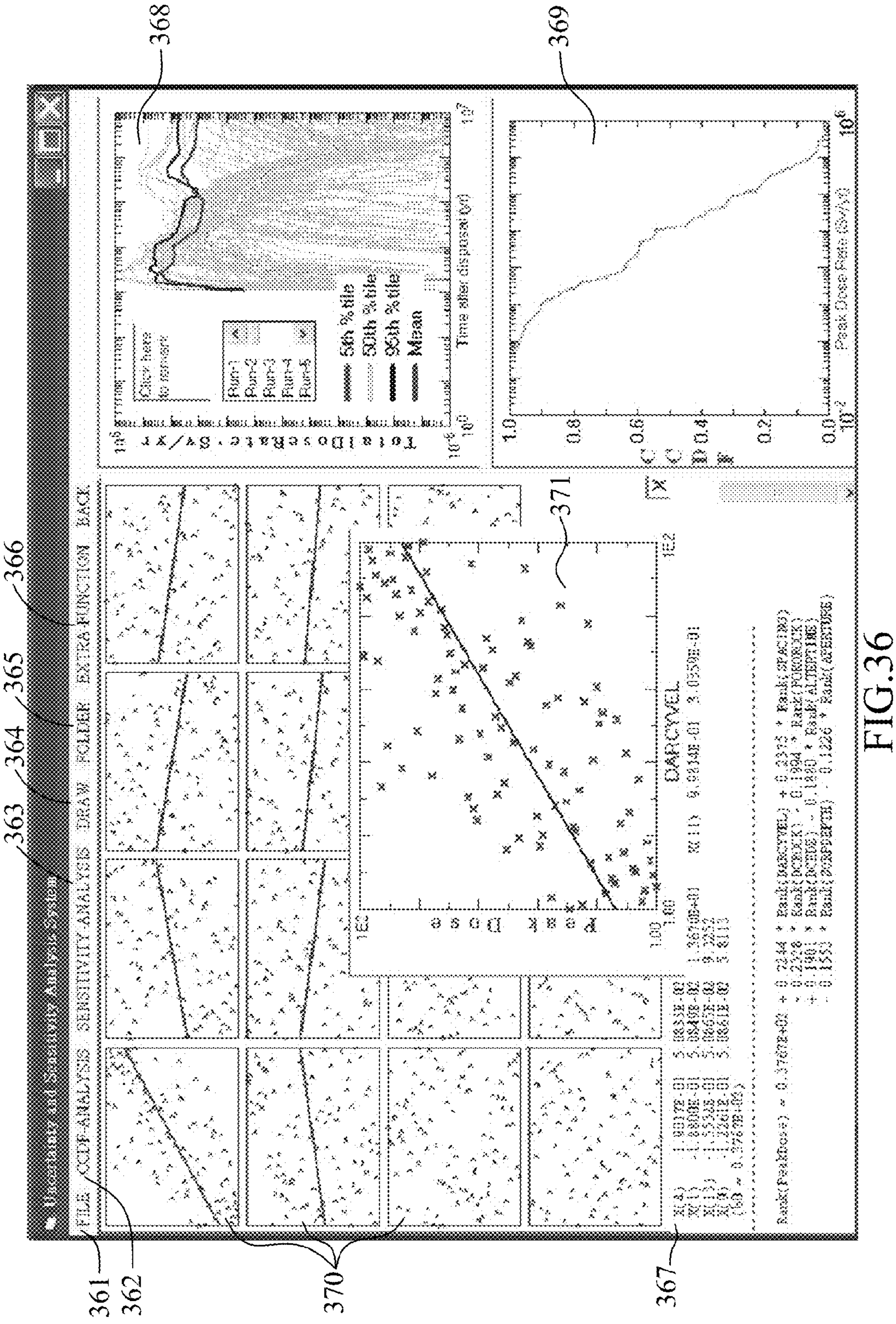
FIG. 36 is the diagram of implementing the uncertainty and parameter sensitivity analysis function for the system.

The invention's uncertainty and parameter sensitivity analysis function is as shown in FIG. 36, and it mainly includes and is composed of the following sub-functions, such as "File" 361, "probability analysis" 362, "sensitivity analysis" 363, "Drawing" 364, "Work Directory" 365 and "program verification" 366, "one word display zone" 367, and 4 "Drawing Zones": 368, 369, 370 and 371. "Word display zone" 367 is mainly to display data, and the temporary result in the process of regression analysis and the regression equation that is obtained from the last regression analysis. 4 "Drawing zones" 368, 369, 370, and 371 will be shown respectively: (1) near-field release assessment sub-system or multiple running of the far-field release assessment sub-system result (as shown in FIG. 36's 368), (2) assessed result of the complementary cumulative distribution function (CCDF) (as shown in FIG. 36's 369), (3) assessed result's multiple scatter plot for each parameter (as shown in FIG. 36's 370), and (4) magnified figure of assessed result's scatter plot for certain parameter (as shown in FIG. 36's 371).

If the implementation of the multiple running function is previously completed, it can directly select the "uncertainty and sensitivity analysis" sub-function item of the "sensitivity analysis" system function item to access the uncertainty and sensitivity analysis function. Operation methods of the system will be introduced as follows.

After implementing the "File" function in the "uncertainty and sensitivity analysis" sub-function, the "File" function item is also included 2 sub-function options, such as 『Open』 and 『Save As』. 『Open』 function item includes a 『multiple running figure』 sub-function item.

Figure 37:
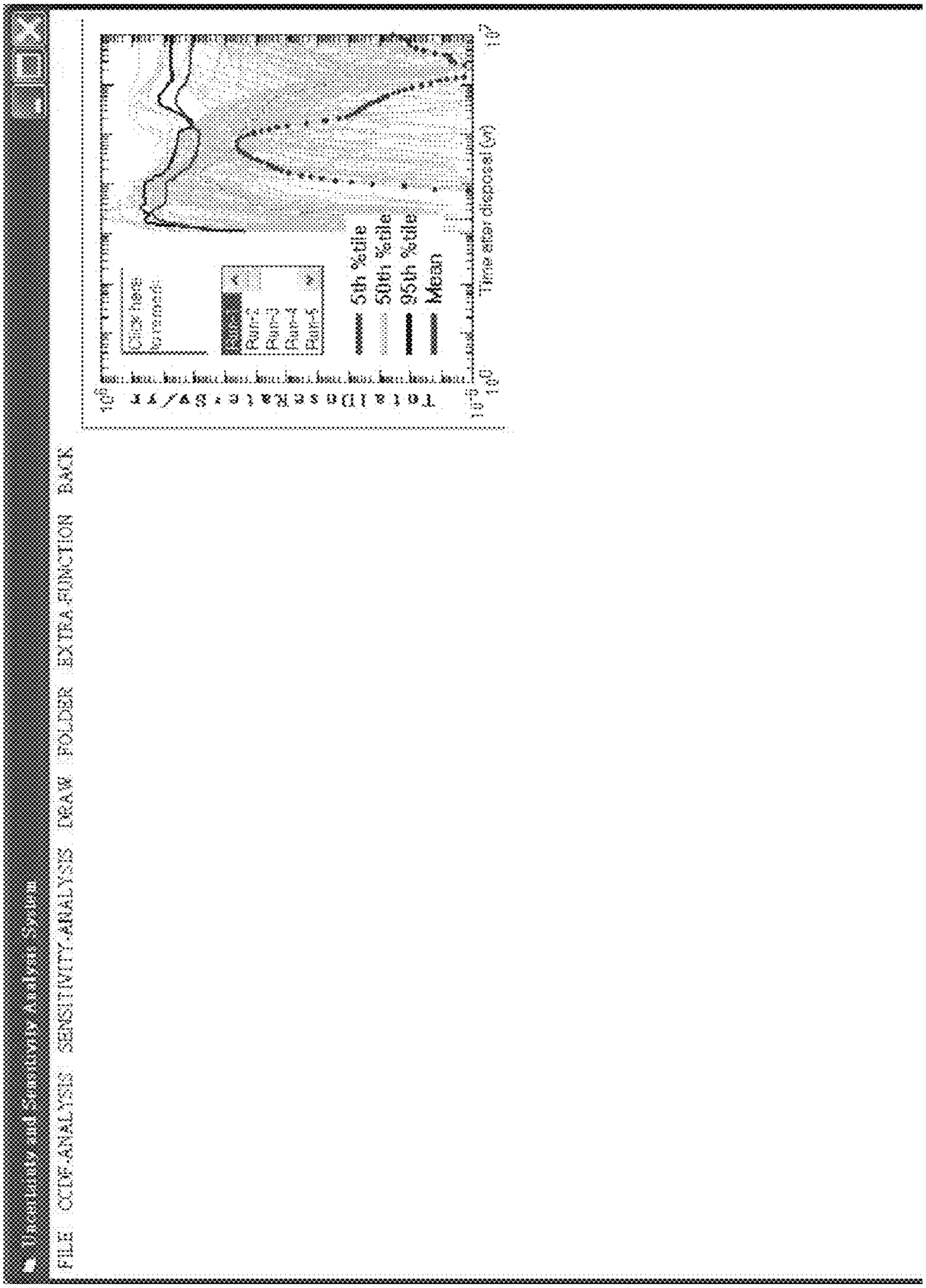
FIG. 37 is the diagram of implementing the multiple running of the uncertainty and parameter sensitivity analysis function for the system.

After implementing the 『multiple running figure』 function item, users can select the file list of multiple running figure to select the file that needs to be analyzed, as shown in FIG. 37. Such figure is also known as the multiple running result figure, and it can be magnified/shrunk as well. Figure's upper left is the word note zone which can input word data. In such figure, it can be seen that it is 5% of the multiple running result (that is, orderly arrange all analytic groups from small to big values, of 5% values). The distributive situation and position for the 50%, 95%, and average value curve figure that can be directly selected from the options of the list on figure's left-hand side (as shown in FIG. 37's Run-01), which can be used to observe the distributive situation for each round curve.

Figure 38:
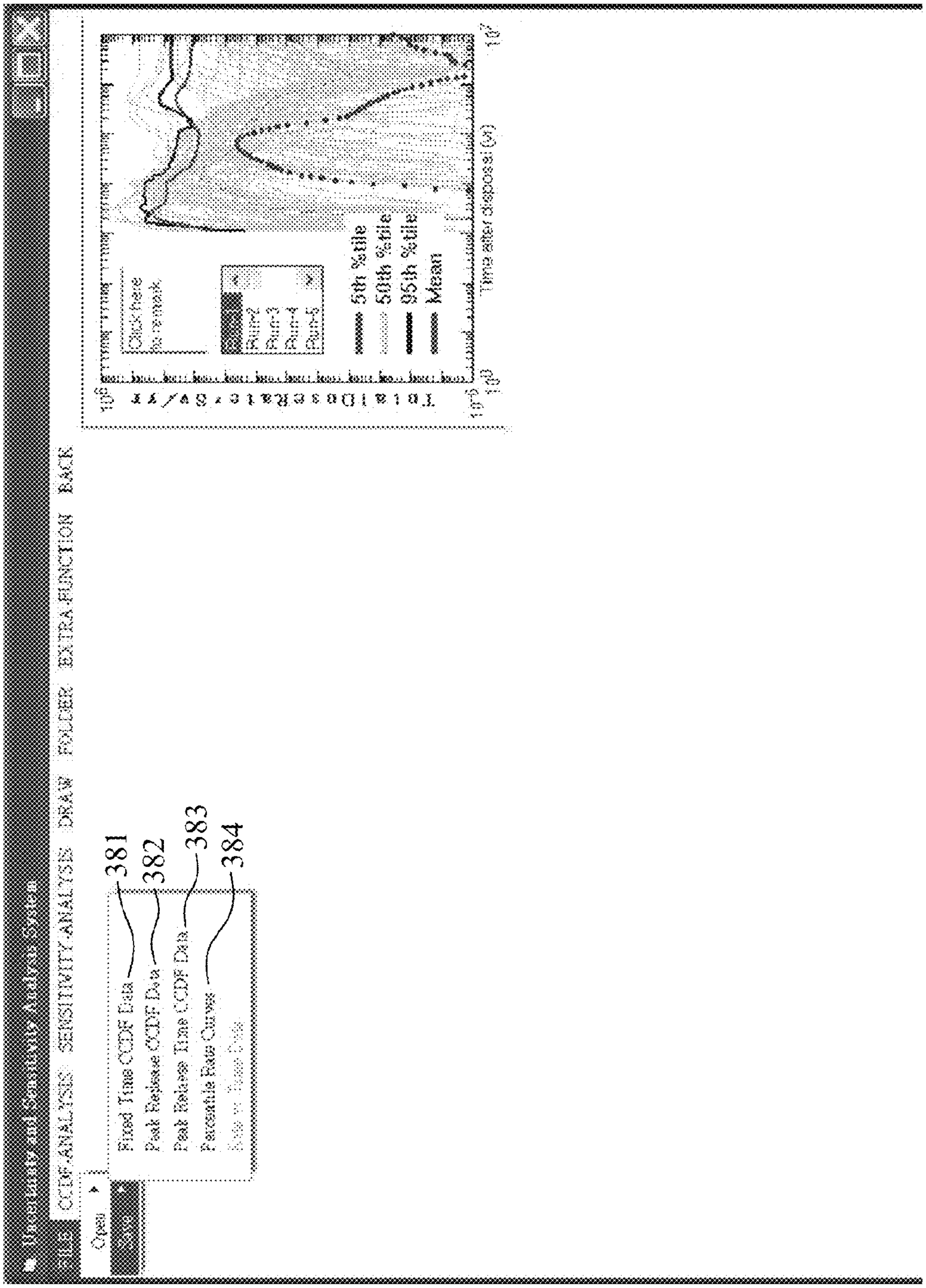
FIG. 38 is the diagram of saved data that after implementing the uncertainty and parameter sensitivity analysis function for the system.

After implementing the 『Save As』 function item, the 『Save As』 function item is also included 4 sub-function items, such as the 『fixed time release rate CCDF data』 381, 『release rate peak CCDF data』 382, 『peak occurrence time CCDF data』 383, and 『percentage total release rate curve』 384, as shown in FIG. 38.

Figure 39:
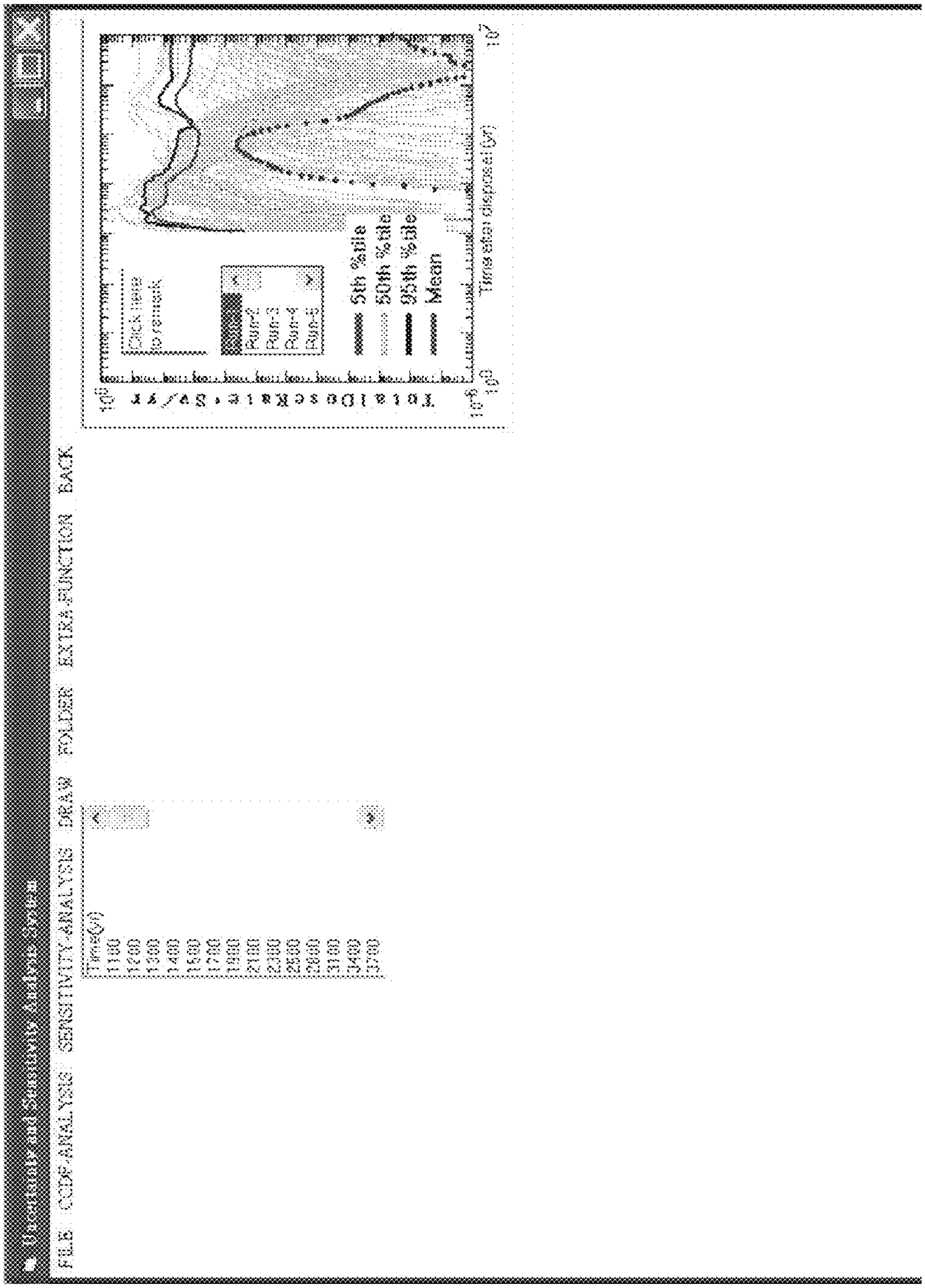
FIG. 39 is the diagram of the saved fixed time release rate CCDF data after implementing the uncertainty and parameter sensitivity analysis function for the system.

After implementing the 『fixed time release rate CCDF data』 381 function, as shown in FIG. 39, and selected the analyzing time point to complete the process of save. Similarly, users can select the 『release rate peak CCDF data』 382 function and complete the save process of file, and after selected the 『peak occurrence time CCDF data』 383 function to complete the file save process.

Figure 40:
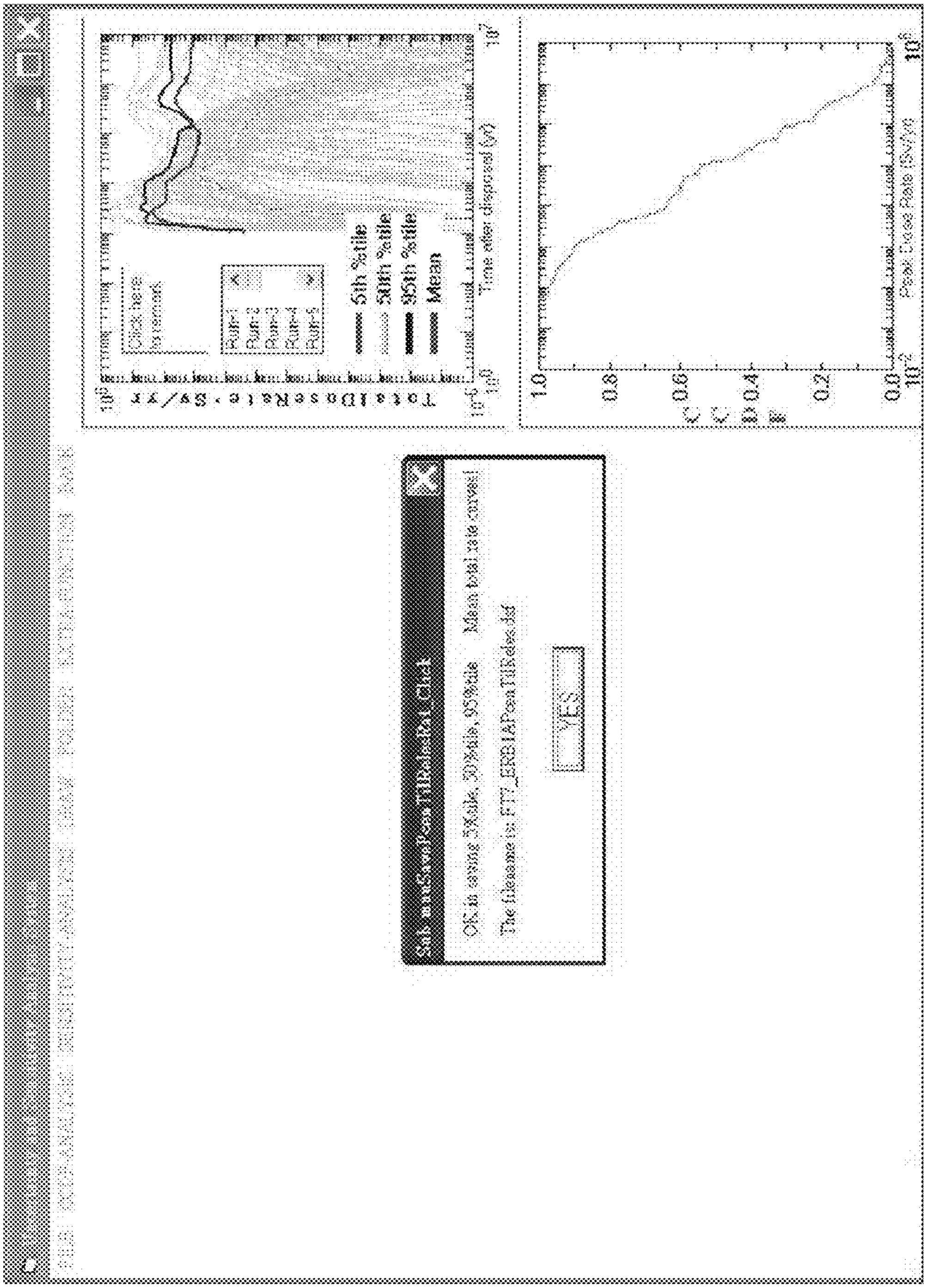
FIG. 40 is the diagram of saved percentage total release rate curve after implementing the uncertainty and parameter sensitivity analysis function for the system.

After implementing the 『percentage total release rate curve』 function as shown in FIG. 40, the system will automatically set the File name and save the data.

Figure 41:
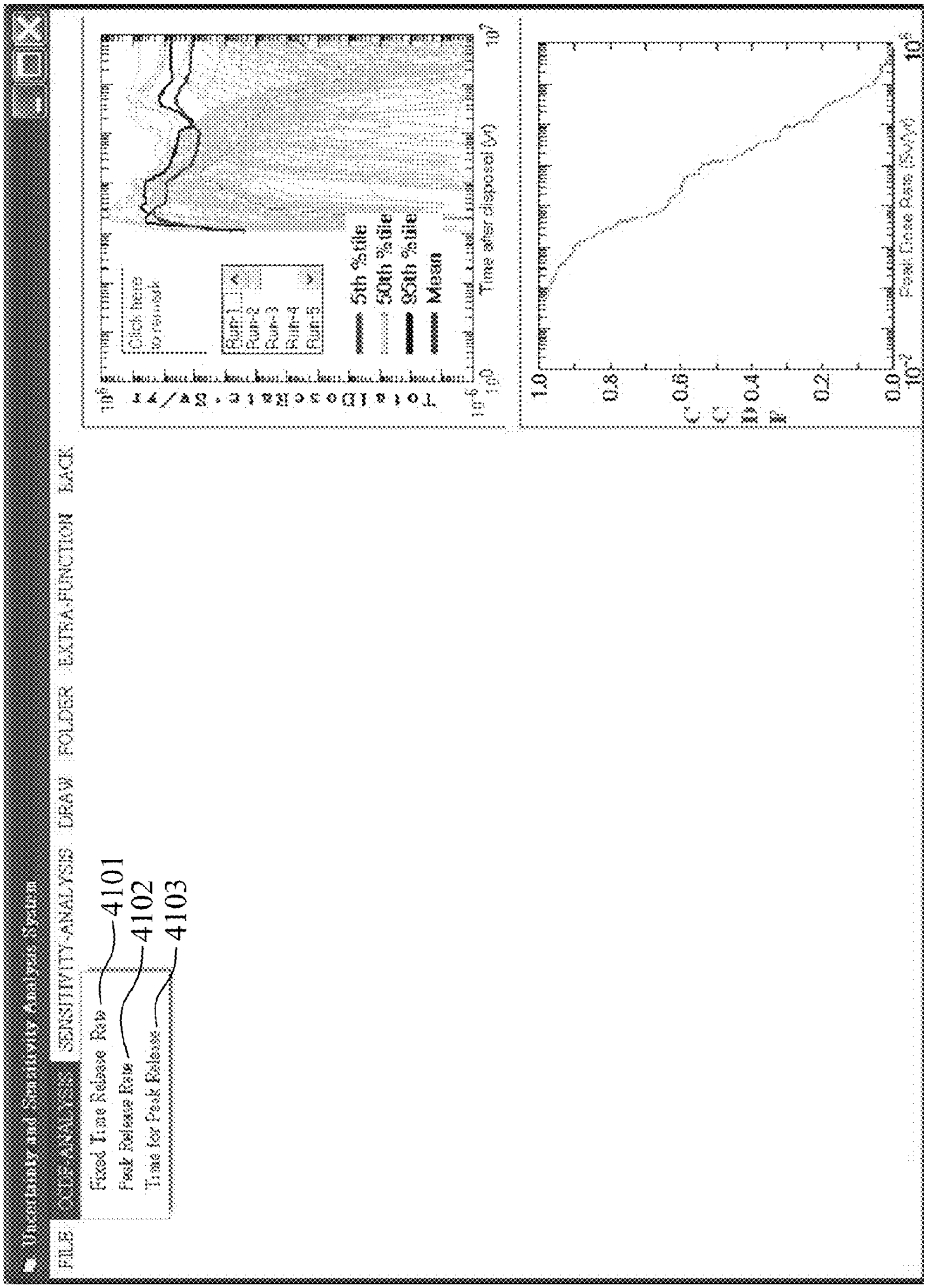
FIG. 41 is the diagram of probability analysis after implementing the uncertainty and parameter sensitivity analysis function for the system.

After implementing FIG. 36's "probability analysis" 362 function item, as shown in FIG. 41, the function item "probability analysis" includes 3 sub-function items, such as 『fixed time release rate』 4101, 『release rate peak』 4102 and 『peak occurrence time』 4103, and their further function property will be introduced as follows.

Figure 42:
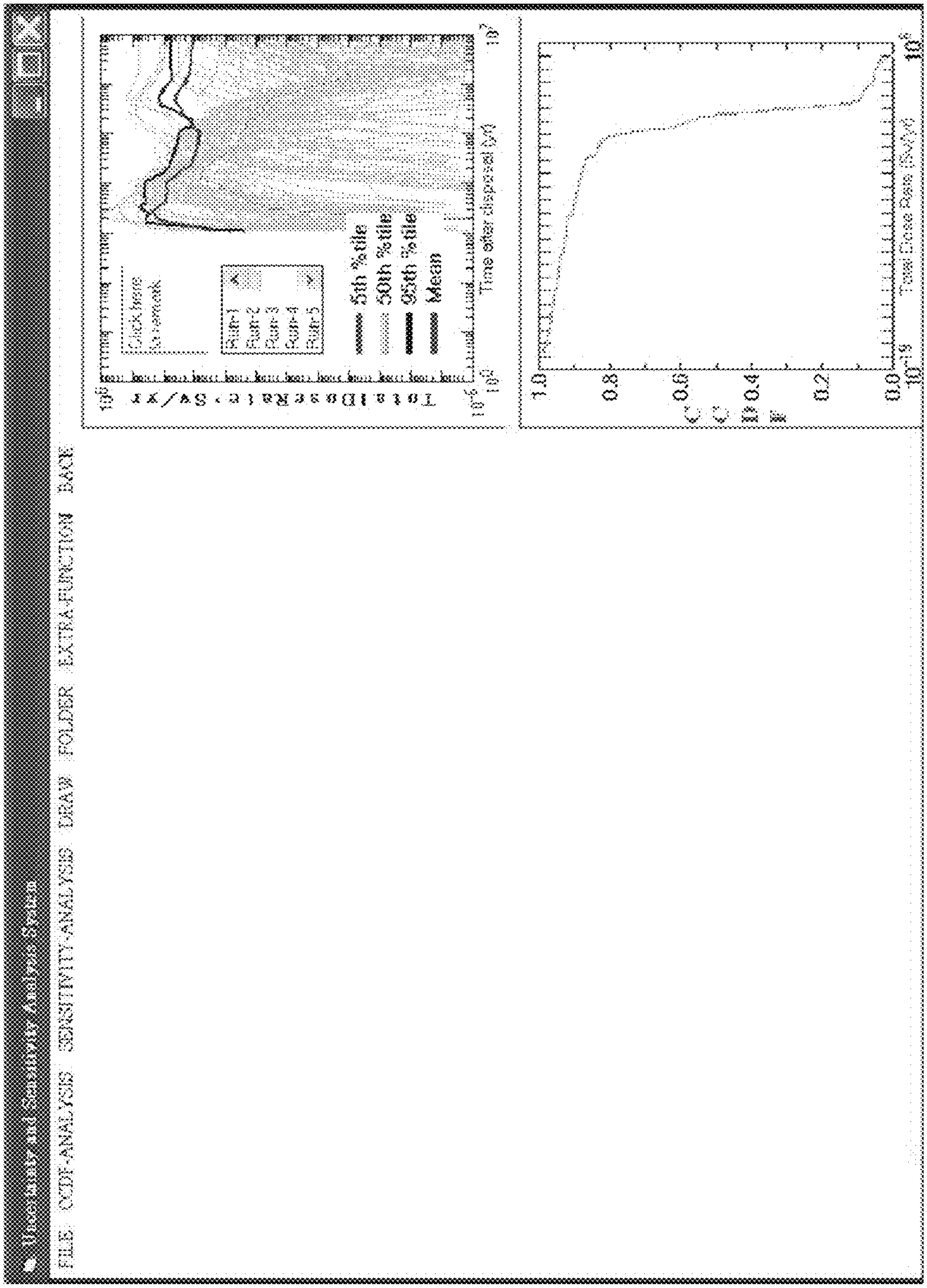
FIG. 42 is the diagram of the fixed time release rate in the probability analysis after implementing the uncertainty and parameter sensitivity analysis function for the system.

After implementing the 『fixed time release rate』 4101 sub-function item, the timetable will be shown in FIG. 39. Users can select the time that is needed to carry out the analysis and assessment, and then in the multiple running model, to obtain the CCDF figure of the current annual release flow rate (Bq/year), as shown in FIG. 42.

Figure 43:
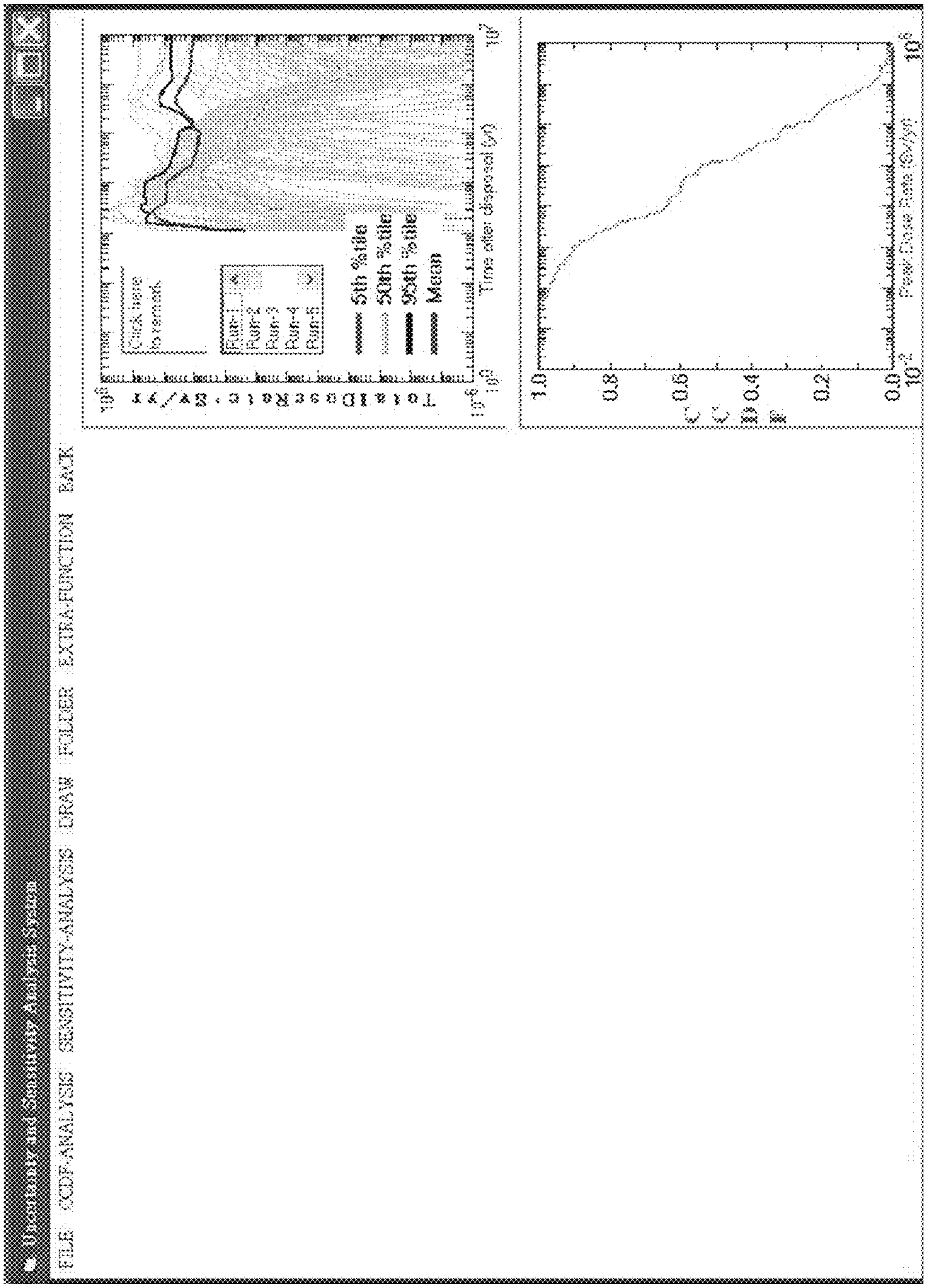
FIG. 43 is the diagram of the release rate peak in the probability analysis after implementing the uncertainty and parameter sensitivity analysis function for the system.

Users implementing the 『release rate peak』 4102 sub-function item can obtain the CCDF figure of the release flow rate (Bq/year) peak value for each round in the multiple running model, as shown in FIG. 43.

Figure 44:
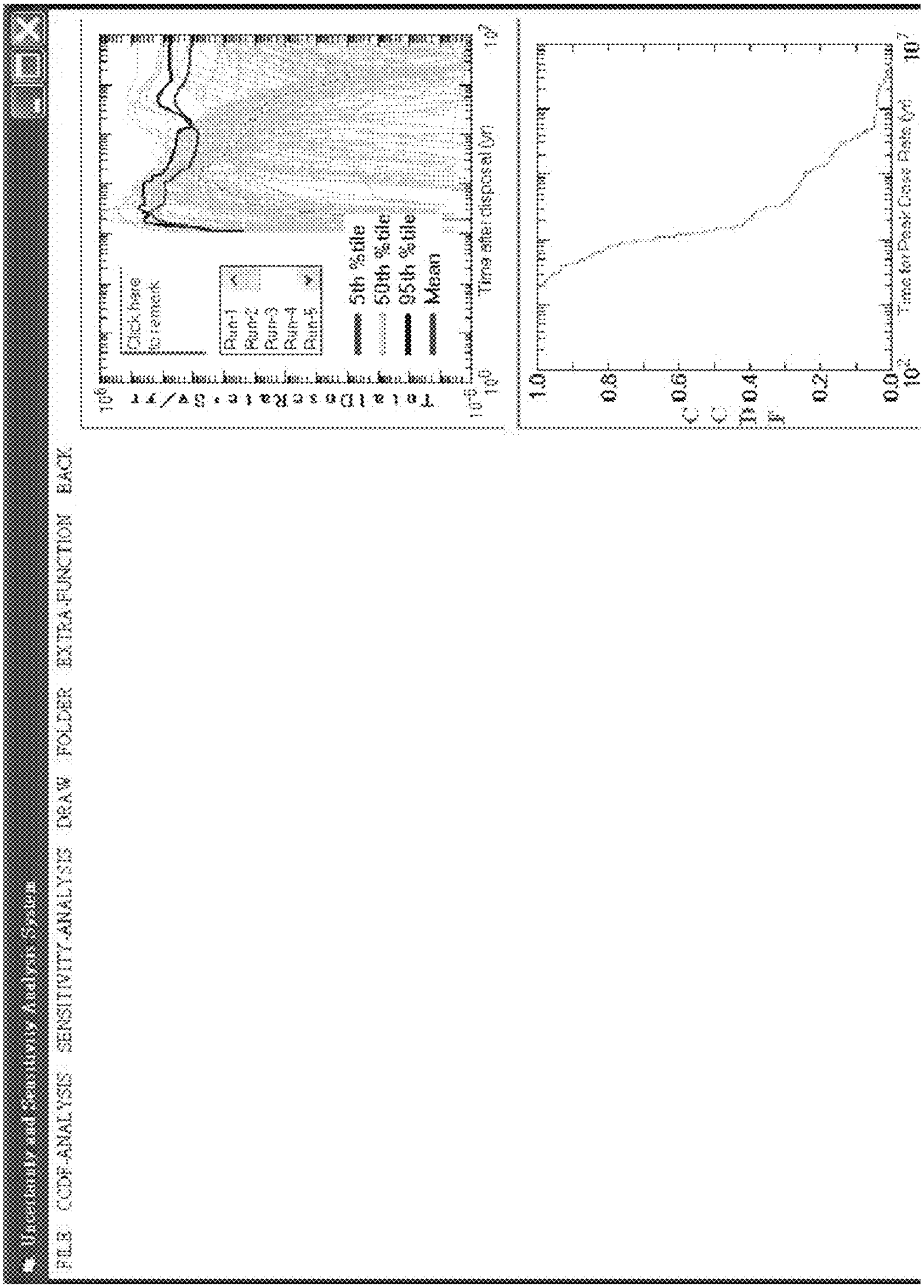
FIG. 44 is the diagram of the peak occurrence time in the probability analysis after implementing the uncertainty and parameter sensitivity analysis function for the system.

Users implementing the 『peak occurrence time』 4103 sub-function item can obtain the CCDF figure of the release flow rate peak occurrence time (year) for each round in the multiple running model, as shown in FIG. 44.

Figure 45:
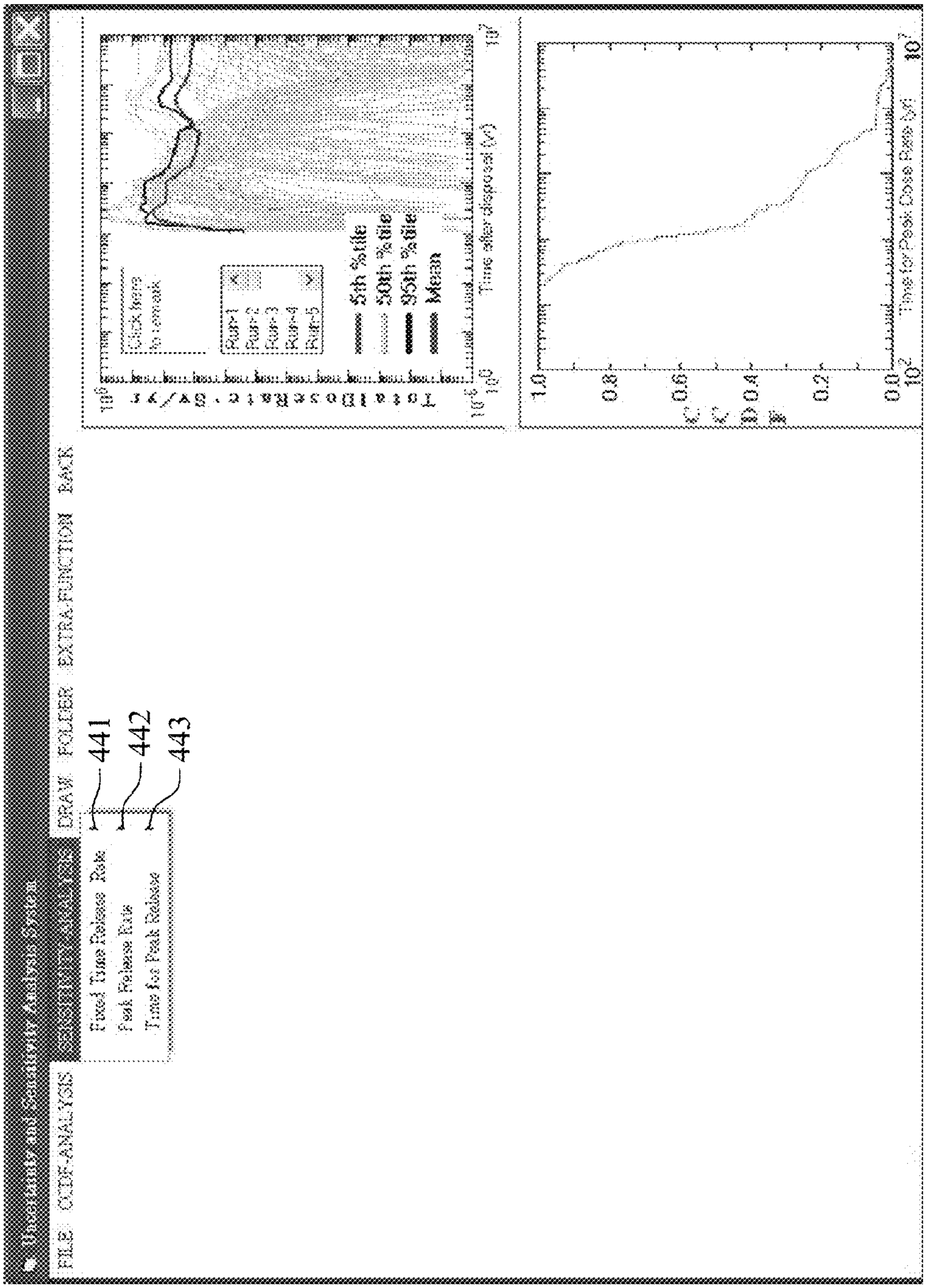
FIG. 45 is the diagram of the sensitivity analysis after implementing the uncertainty and parameter sensitivity analysis function for the system.

After implementing FIG. 36's "sensitivity analysis" 363 function item, the "sensitivity analysis" function is included 3 sub-function items, such as the 『fixed time release rate』 441, 『release rate peak』 442, and 『peak occurrence time』 443, as shown in FIG. 45, and their further function property will be introduced as follows.

Figure 46:
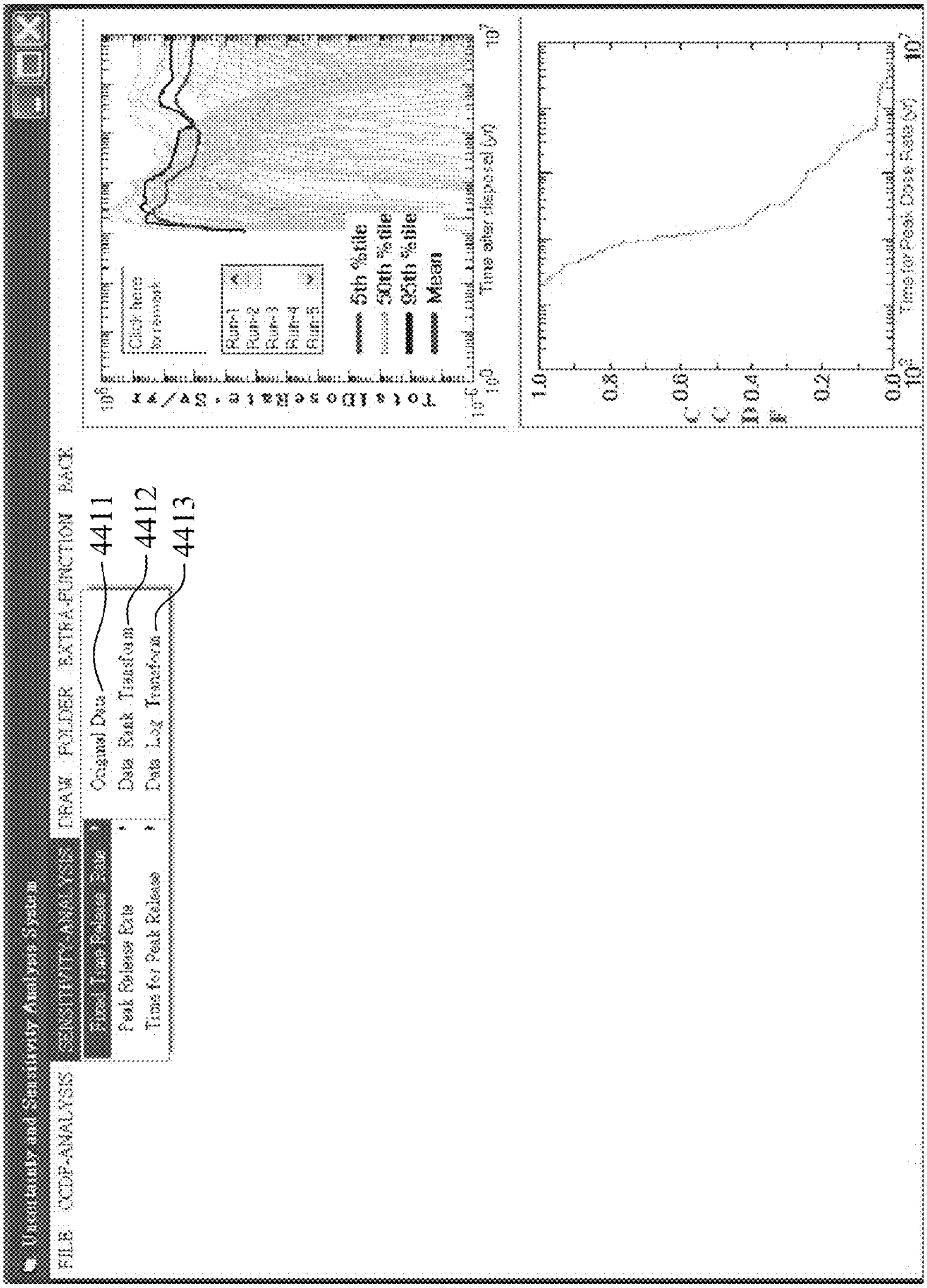
FIG. 46 is the diagram of the fixed time release rate in the sensitivity analysis after implementing the uncertainty and parameter sensitivity analysis function for the system.

After implementing the "fixed time release rate" 441 function, such function is also includes 3 sub-function items, such as 『data non-transformed』 4411, 『data Rank transformed』 4412 and 『data Log transformed』 4413, as shown in FIG. 46.

Figure 47:
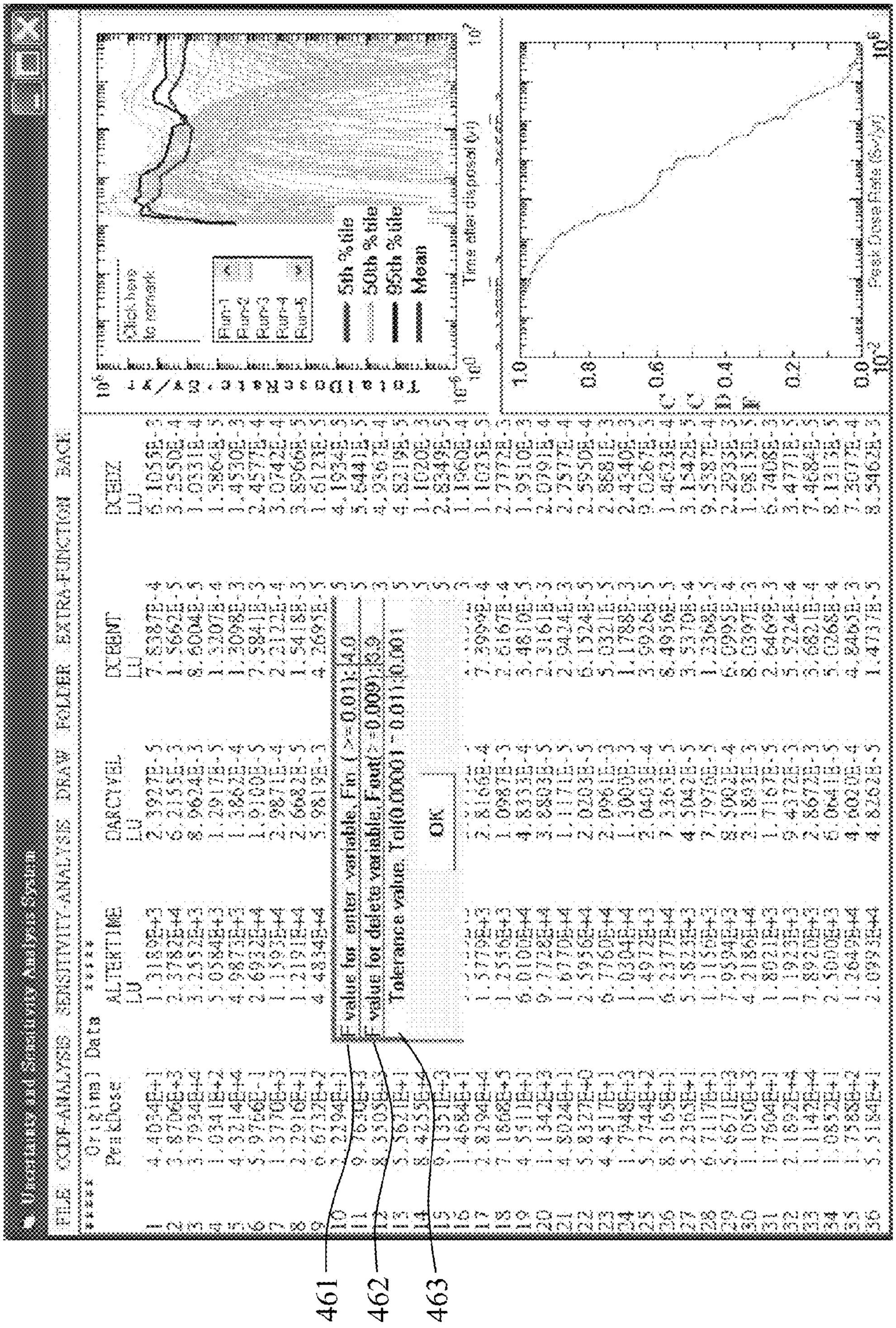
FIG. 47 is the diagram of the time analysis in the fixed time release rate of the sensitivity analysis after implementing the uncertainty and parameter sensitivity analysis function for the system.
Figure 48:
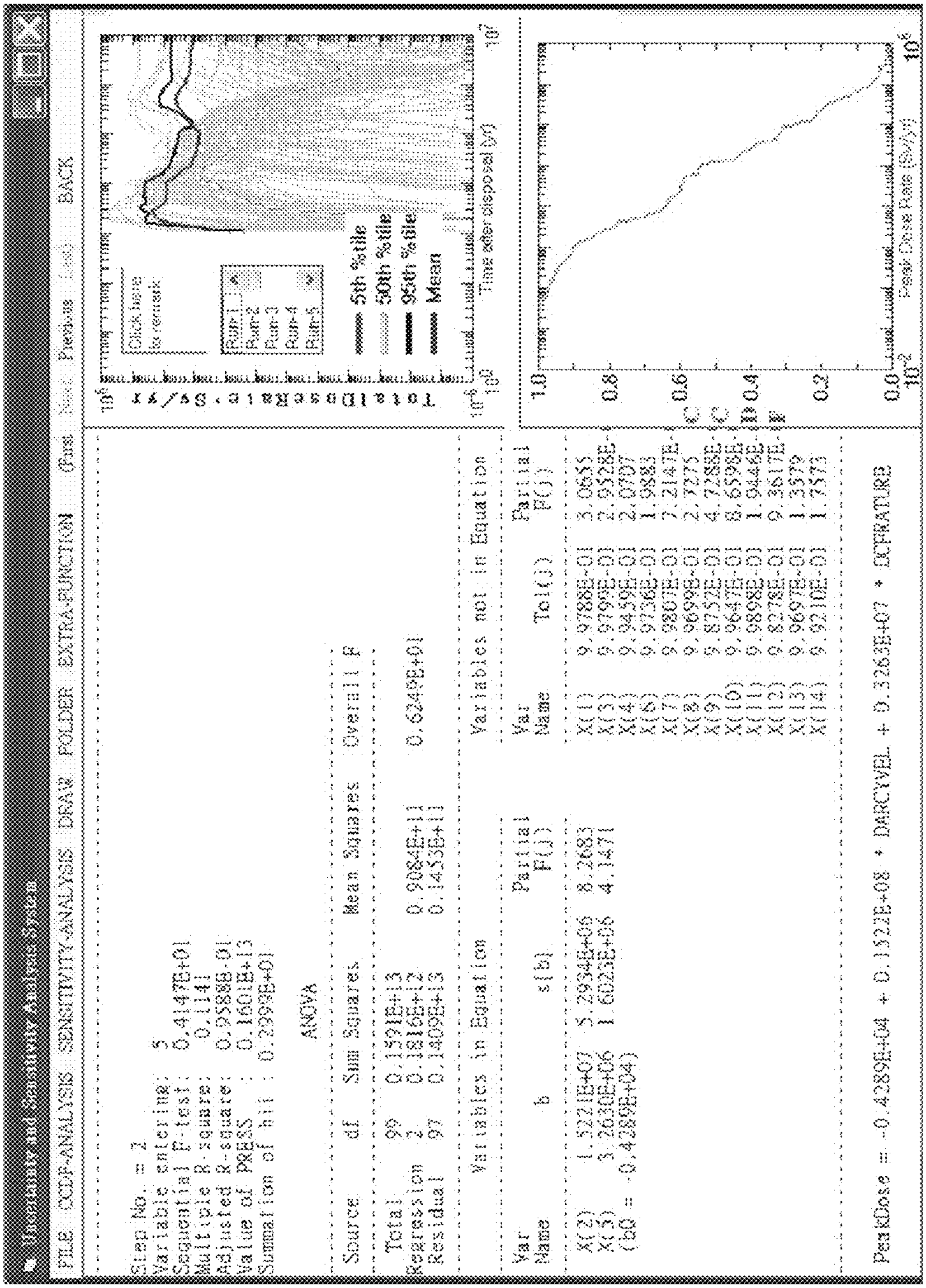
FIG. 48 is the diagram of the time analysis in the fixed time release rate of the sensitivity analysis after implementing the uncertainty and parameter sensitivity analysis function for the system.

After implementing the function item of 『data non-transformed』 4411 will display a time menu, as shown in FIG. 39. After selecting the time of carrying out the analysis as shown in FIG. 47, the system is displayed in 3 columns, such as "F VALUE (>=0.01) parameter that has included by regression equation"461, "F VALUE(<=0.009) parameter that has eliminated by regression equation" 462, "tolerance (0.00001~0.01) obtained by conducting the regression analysis" 463. In addition, the default values that are set by the system "parameter that has included by regression equation when F value(>=0.01)" and the column values is 4.0; for "parameter that has eliminated regression equation when F value(<=0.009)" and the column values is 3.9; for "tolerance (0.00001~0.01) obtained by conducting the regression analysis" and the column values will be 0.001. When F value is set too high, then the number of parameter that has been included will become less, thus the column values of "parameter that has included by regression equation F value (>=0.01)" column values have to be slightly greater than "parameter that has eliminated by regression equation when F value (<=0.009)" column values are greater their function will be better. The result of implementation is shown in FIG. 48.

Figure 49:
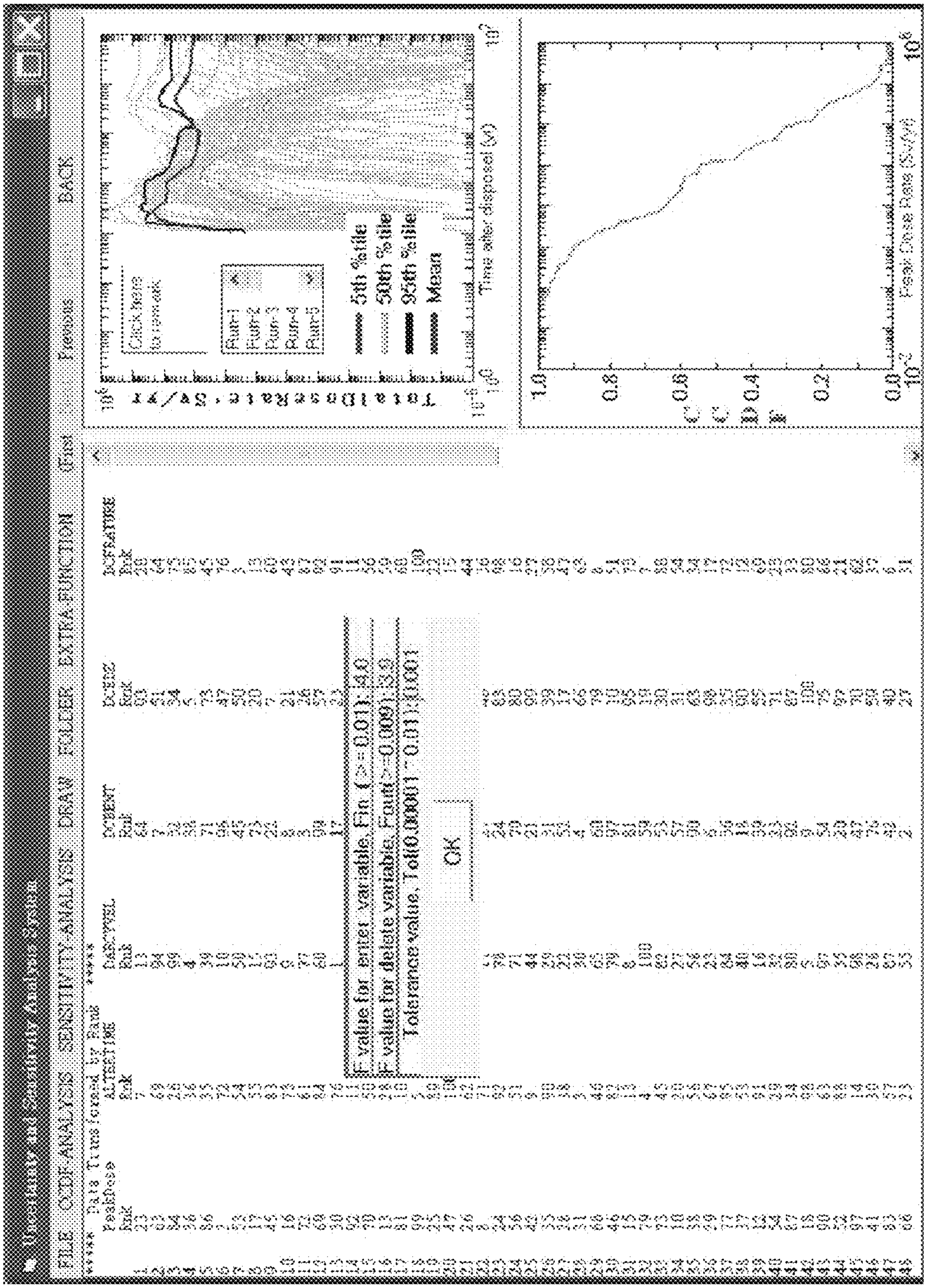
FIG. 49 is the diagram of the result that obtained from the sensitivity analysis and Rank transformation after implementing the uncertainty and parameter sensitivity analysis function for the system.

Similarly, the 『data Rank transformed』 function is identical to the 『data non-transformed』 function, and the difference between them is that each will be transformed into Rank in advance, then according to the value of each parameter data in the total data value to code it will be in the small to big sequence of arrangement. The minimum parameter data value is 1 (Rank=1), and the maximum parameter data value will be the number of sampling, and then will be transformed into the Rank value and conducted the regression analysis, as shown in FIG. 49.

Figure 50:
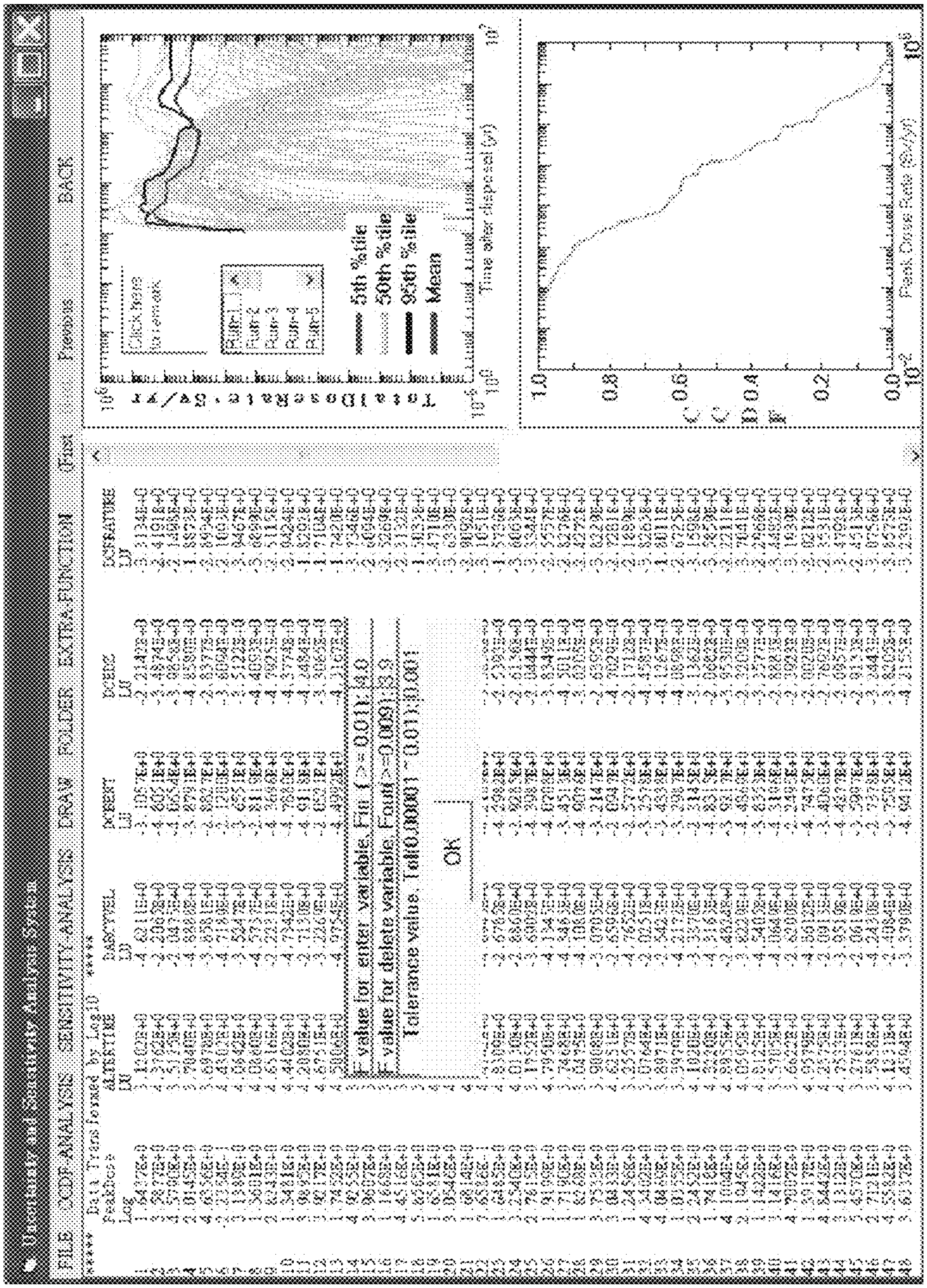
FIG. 50 is the diagram of the result that obtained from the sensitivity analysis and data Log transformation after implementing the uncertainty and parameter sensitivity analysis function for the system.

『Data Log transformed』 function is mainly focused on the Log-shape distributive parameter (such as Log Uniform, Log Normal, Log Triangular, etc) to conduct the 『data Log transformed』, and for non-Log-shape distributive parameter (such as Uniform, Normal, Triangular, Gamma, Beta, etc.) the function of 『data Log transformed』, after implementing such function, each parameter data will be obtained by the log value in advance, and then use the log values to continuously carry out the analysis on the regression equation, as shown in FIG. 50.

After selecting the "release rate peak" 442 function, "release rate peak" function also includes 3 sub-function items: such as 『data non-transformed』 『data Rank transformed』 and 『data Log transformed』. Its function is identical to abovementioned 『fixed time release rate』 441 function, and it will not explain herein.

After moving the mouse to "peak occurrence time" 443, 3 sub-function items will be displayed: 『data non-transformed』, 『data Rank transformed』 and 『data Log transformed』. Its function is identical to『fixed time release rate』 441, and it will not explain herein.

After implementing the "Drawing" 364 function item in FIG. 36, "Drawing" function includes 6 sub-function items: 『modified Y-axis』 3641, 『modified X-axis』 3642, 『drawing scatter plot』 3643, 『display—scatter plot parameter name tag』 3644, 『magnified CCDF』 3645 and 『adding figure』 3646. Users should note that if the "sensitivity analysis" function item is not yet implemented, and for those functions, such as 『drawing scatter plot』, 『display scatter plot parameter name tag』 and 『magnified CCDF』 etc., they are unable to use them. The following introduces the property for such function item.

The "modified Y-axis" function and "modified X-axis" function are identical to these "modified Y-axis" function and "modified X-axis" function in previous other function sub-systems, thus it will not be explained herein.

Figure 51:
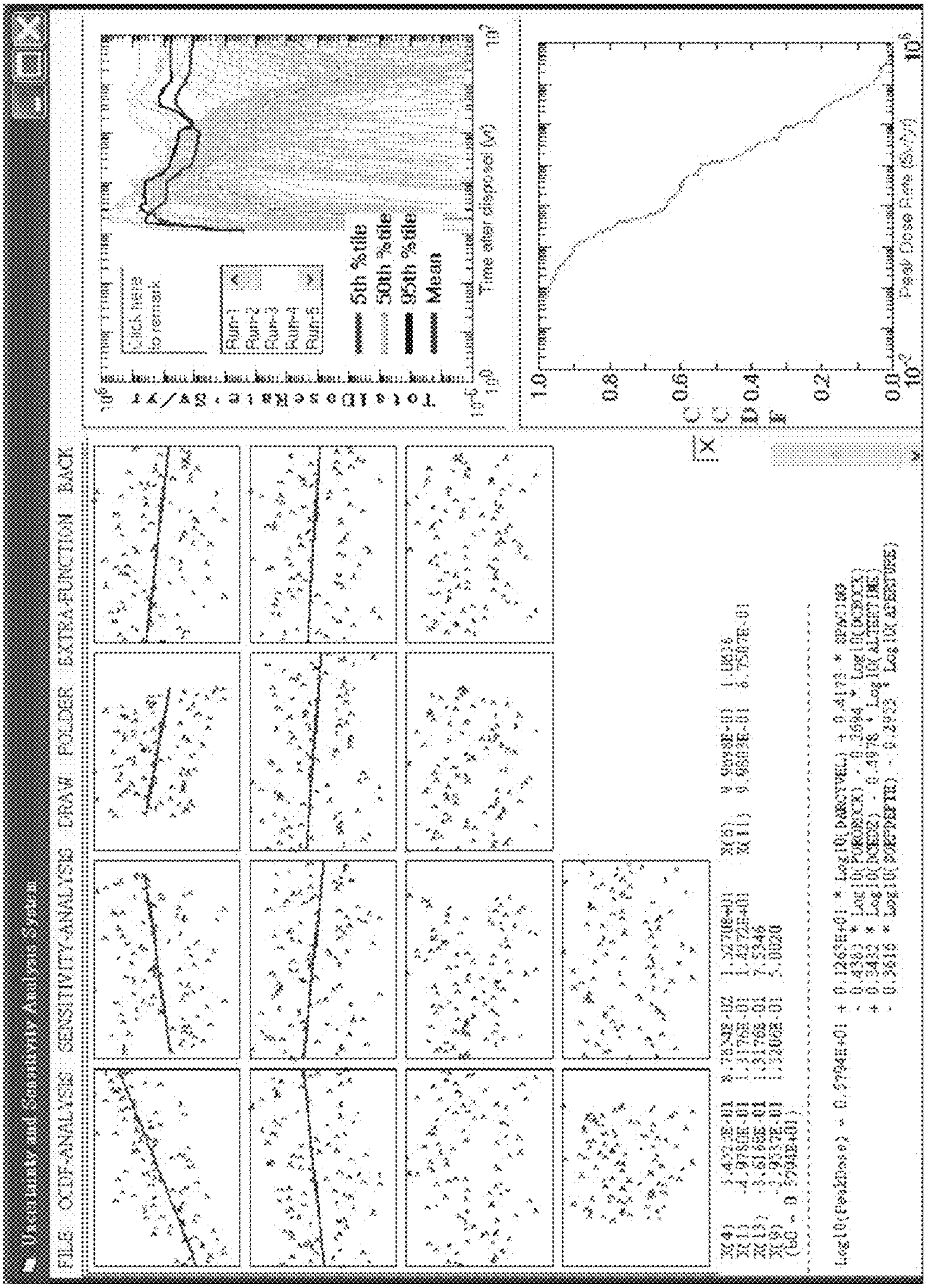
FIG. 51 is the diagram of the drawing scatter plot function that obtained from the sensitivity analysis and drawing function after implementing the uncertainty and parameter sensitivity analysis function for the system.
Figure 52:
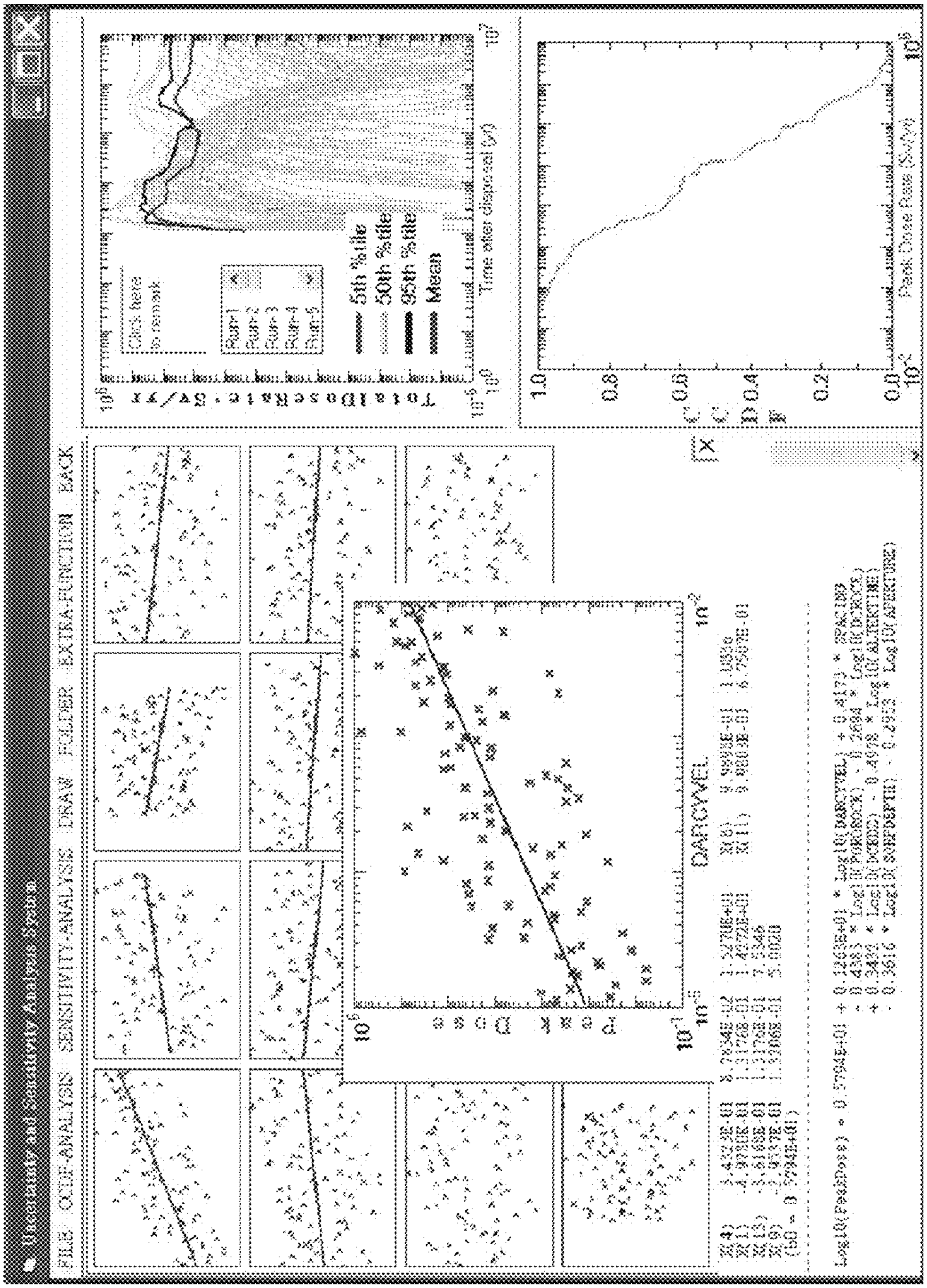
FIG. 52 is the diagram of the figure magnification function that obtained from the Drawing function after implementing the uncertainty and parameter sensitivity analysis function for the system.

As for the use of "drawing scatter plot" function item, it has implemented the "sensitivity analysis" function item and after implementing the "drawing scatter plot" function item, as shown in FIG. 51. As shown in FIG. 51, each small figure is a scatter plot which is a small figure that corresponds to an uncertain parameter, and these small figures from the upper left corner to bottom right corner, and from left to right will be arranged orderly by each uncertain parameter's influential level. Parameters are included into the regression line, their scatter plot can be marked by using a red regression line, and each parameter's relationship diagram can be magnified in order to facilitate users to observe as shown in FIG. 52.

Figure 53:
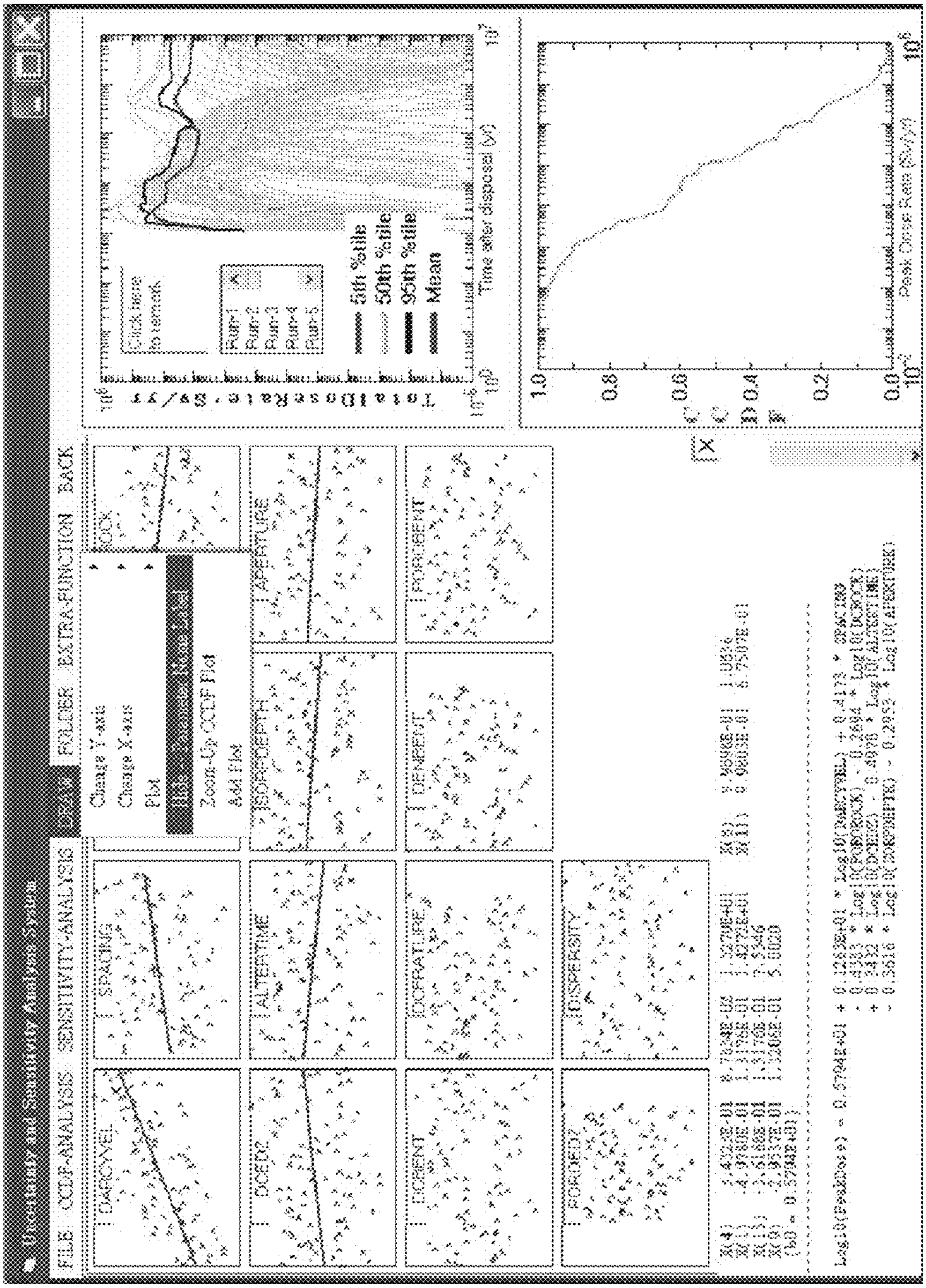
FIG. 53 is the diagram of the scatter plot parameter name tag display function item that obtained from the drawing function after implementing the uncertainty and parameter sensitivity analysis function for the system.

"Display scatter plot parameter name tag" function item adds the scatter plot correspondent parameter name into each small scatter plot, and after adding the parameter name into the small scatter plot, then the title name of the function item will be modified to become the "hidden scatter plot parameter name tag" as shown in FIG. 53; thus, the effect of the function item is toggled between positive and negative which can add a correspondent parameter name or hidden parameter name into each small scatter plot.

Figure 54:
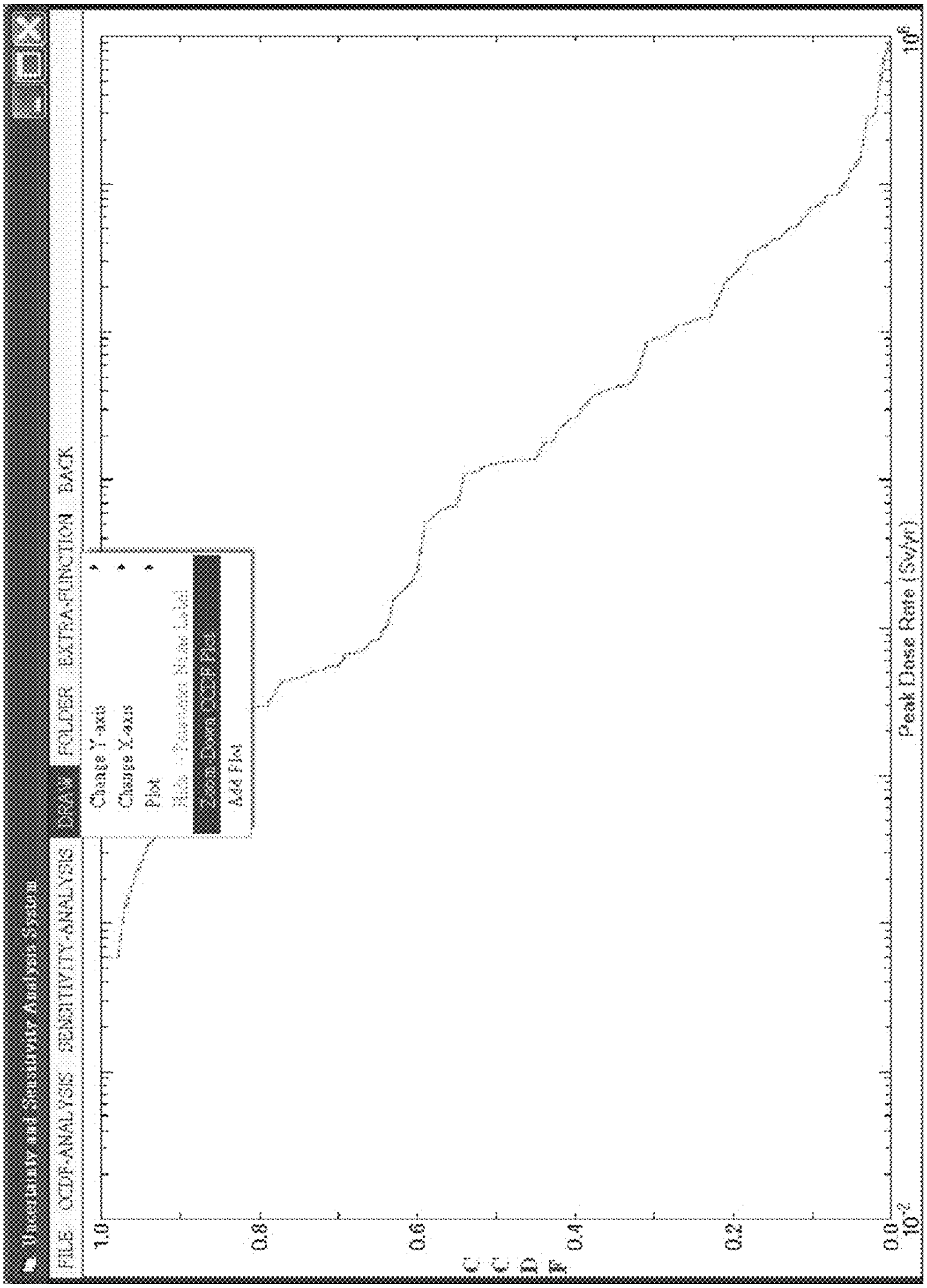
FIG. 54 is the diagram of the magnified CCDF function that obtained from the drawing function after implementing the uncertainty and parameter sensitivity analysis function for the system.

"Magnified CCDF" function item is focused on shrinking and magnifying the CCDF, and it is ineffective to other figures; thus, the function is unable to use if it has not made the CCDF. After selecting the "magnified CCDF" function item, the CCDF will be magnified to the full screen, and the title of function item will be changed into the "shrunk CCDF", as shown in FIG. 54. Therefore, the effect of the function item is a continuous circulation with magnifying and shrinking the CCDF.

Figure 55:
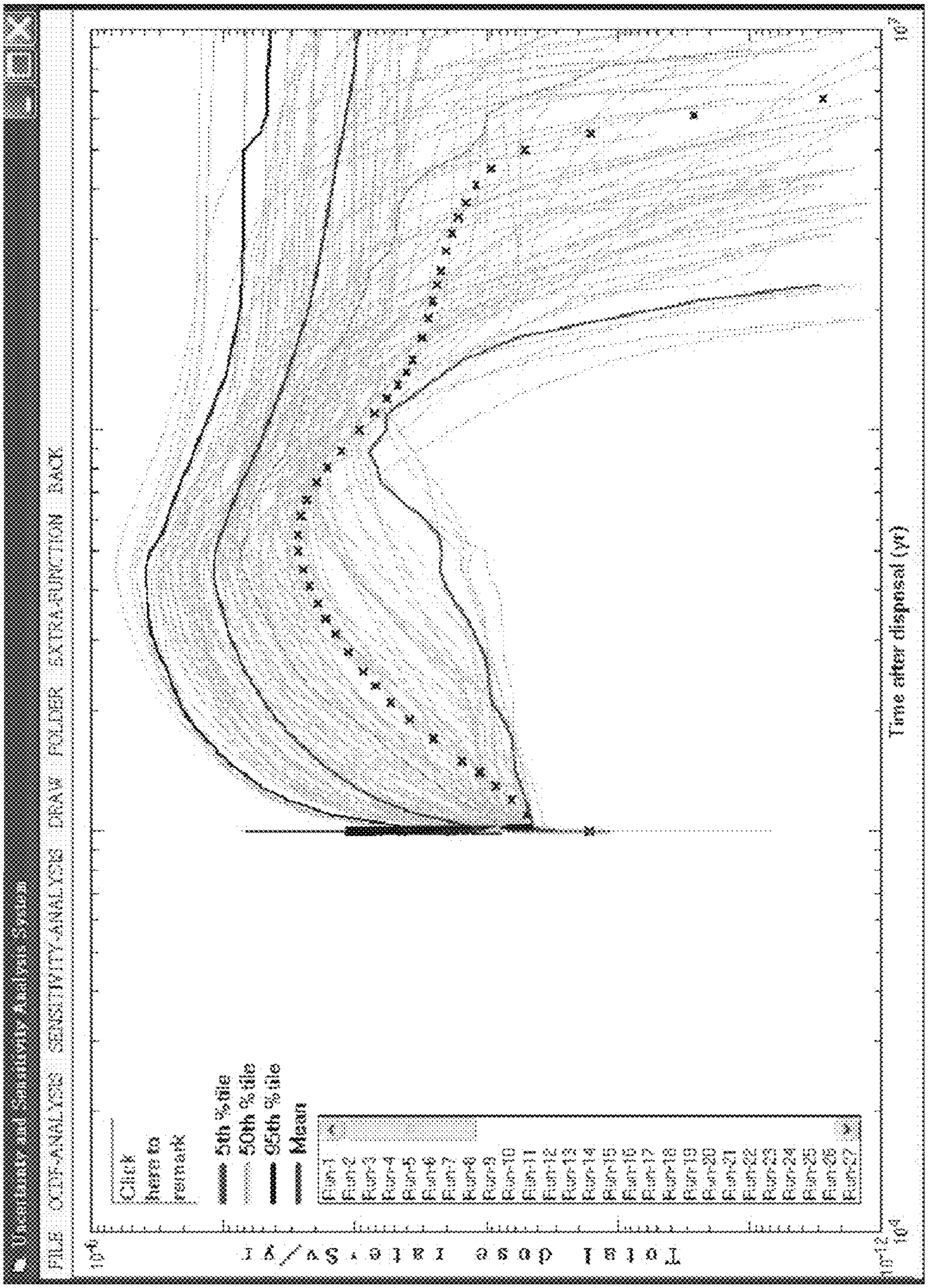
FIG. 55 is the diagram of adding the basic assessed result after implementing the uncertainty and parameter sensitivity analysis function for the system.

"Adding figure" function item is the figure of the assessed result of adding the base case in the multiple running figure for the purpose of comparison. After implementing the "adding figure" function item and the magnified multiple running figure as shown in FIG. 55. In such figure, the X mark curve adopts the base case to obtain the assessed result of parameter data, and this can easily assess the influence of uncertainty parameter's maximum/minimum value on the assessed result, and whether the setting scope of maximum/minimum values is biased or not.

Figure 56:
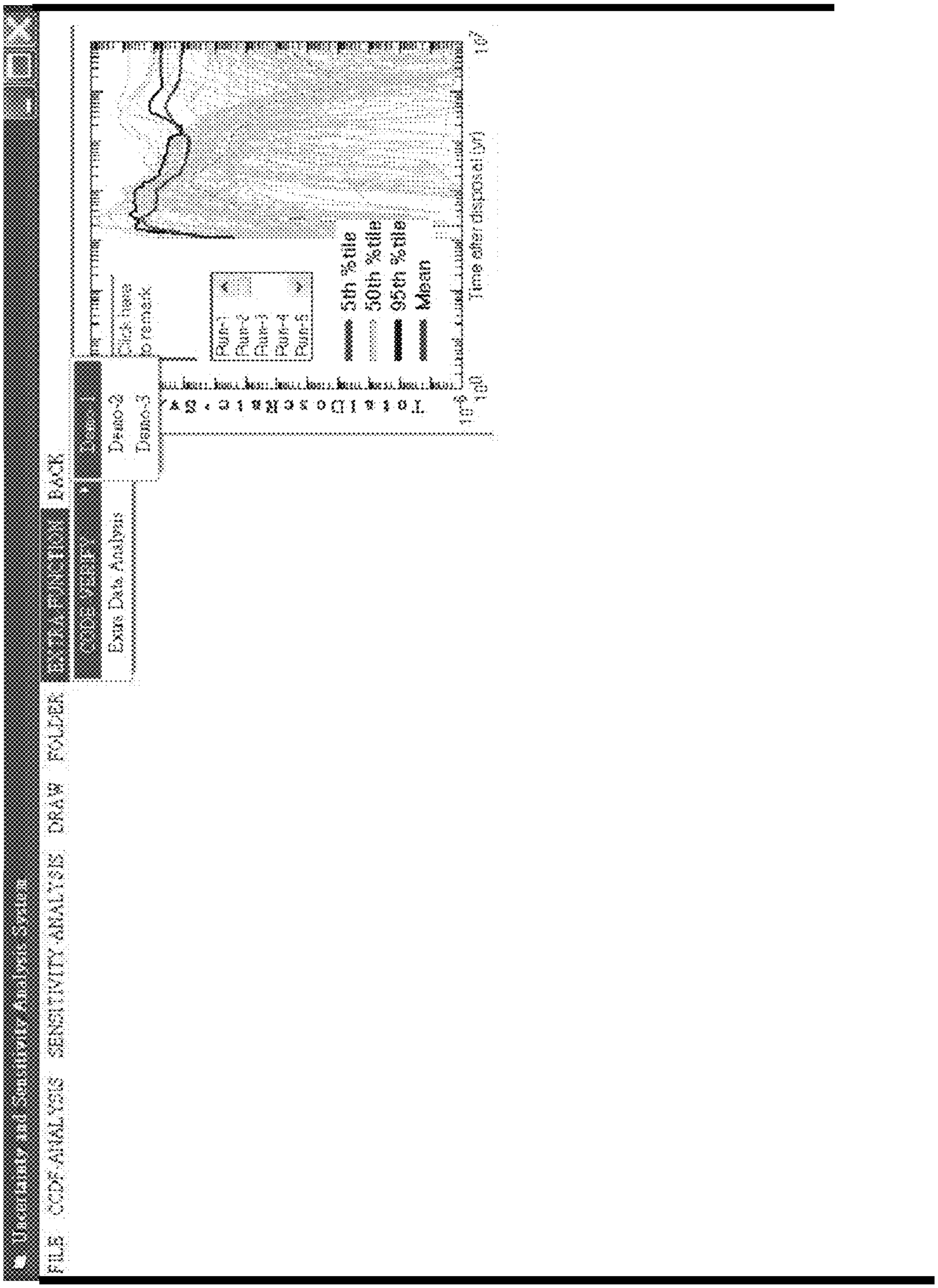
FIG. 56 is the diagram of the program verification function item after implementing the uncertainty and parameter sensitivity analysis function for the system.

After selecting the "program verification" function item, 3 build-in examples of the system are as shown in FIG. 56. These 3 examples are extracted from the textbooks of Statistics, has standard regression analysis result which can be carried out the comparison. Users are able to use these 3 examples that provided by the system to verify this program's validity and accuracy for the regression analysis, and its operation methods are identical to abovementioned "sensitivity analysis" function item, thus it will not be explained herein.

From the detailed introduction, the radioactive waste deep geologic repository performance assessment system disclosed by the invention can be simplified in order to reduce the difficulty in near-field release assessment and far-field release assessment and any possible man-made error when constructing the radioactive waste deep geologic repository near-field release assessment and far-field release assessment; in addition, it will be helpful to integrate and connect each individual and independent sub-system or external program (such as FORTRAN) to facilitate conduct the safety assessment for the recycled radioactive waste deep geologic repository.

Currently, the radioactive waste deep geologic repository performance assessment system disclosed in the invention can be calculated from analyzing the nuclide from waste tanks. The tank has broken and it will be released with following the groundwater, through the buffered material of Bentonite, excavation disturbed zone, the disposed geologic host rock, and the diffusion, advection and dispersion effects on the geologic crack to release to biosphere, and it can be analyzed the sequence of influential factors for the near-/far-field release rate.

To sum up, the structural characteristics of the invention and each actual implementing case has been disclosed in details, and then the invention can be significantly displayed on its purpose and efficiency with having great originality and improvement for implementation, which really has the value of industrial usage. The invention is a unique and exclusive operation and application that ever seen in the current market, according to the spirit of the Patent Act, the invention case is totally conformed to the important conditions of invention patent.

However, the above mentioned is only the optimal actual case of implementation for the invention, and cannot be the scope of limiting the implementation scope for the invention; that is, in most cases will according to the invention claims to conduct the equal change and modification, and all of such condition will still belong to the coverage scope of patent of the invention.

Dear review committee member, please give your kind review and approve the application of the invention.

What is claimed is:

1. A non-transitory computer readable storage medium storing a radioactive waste deep geologic repository performance assessment system, for processing by a microprocessor, wherein said assessment system comprises:

a basic data input sub-system for collecting basic data for a radioactive waste buried at a bury site;

a parameter setting sub-system for setting a parameter;

a near-field release assessment sub-system for calculating and assessing radioactivity within a near field of the bury site;

a far-field release assessment sub-system for calculating and assessing radioactivity within a far field of the bury site;

a biosphere dose assessment sub-system for calculating and assessing biosphere dose around the bury site;

a multiple calculation sub-system for operating the near-field release assessment sub-system, the far-field release assessment sub-system, and the biosphere dose assessment sub-system;

a uncertainty analysis sub-system for calculating and assessing uncertainty obtained from the multiple running sub-system; and a sensitivity analysis sub-system, for calculating parameter sensitivity;

wherein the basic data and the parameter are processed by the near-field release assessment sub-system, the far-field release assessment sub-system, and biosphere does assessment sub-system; and wherein the uncertainty analysis sub-system accesses uncertainty from the multiple calculation sub-system's result along with a complementary cumulative distribution function (CCDF), and then the sensitivity analysis sub-system calculates the parameter sensitivity based on the accessed uncertainty.

2. The non-transitory computer readable storage medium as recited in claim 1, wherein the basic data input sub-system further comprises a near-field release assessment data input sub-system, a far-field release assessment data input sub-system, and a biosphere dose assessment data input sub-system.

3. The non-transitory computer readable storage medium as recited in claim 2, wherein the basic data for the near-field release assessment data input sub-system comprises:

waste property data including a waste inventory time and a complete waste dissolution time;

waste tanks property data including a waste tank life-span, a waste tank erosion density, a waste tank inner radius, a waste tank length, a waste tank erosion porosity, and a waste tank erosion diffusion coefficient;

buffered layer property data including a buffered layer density, a buffered layer porosity, a buffered layer outer radius, and a buffered layer diffusion coefficient;

excavation disturbed zone property data including a disturbed zone rock density, disturbed zone outer radius, disturbed zone porosity, and disturbed zone diffusion coefficient;

host rock property data including a host rock Darcy flow rate, a host rock crack diffusion coefficient, a host rock crack spacing, and a host rock crack opening;

a released nuclide title;

a release nuclide half-life;

a release nuclide decay phase data;

a host nuclide title;

a host nuclide half-life;

a host nuclide sub-nuclide data;

a main nuclide title;

a main nuclide inventory;

a main nuclide Instant Release Fraction (IRF) data;

an element solubility; and a sorption coefficient.

4. The non-transitory computer readable storage medium as recited in claim 2, wherein the basic data for the far-field release assessment comprises:

geometric property data including a geological cycle transportation distance, a waste repository spacing, a nuclide absorption depth, a waste tank length, a crack spacing, a crack opening, a crack transportation division number, and number rock mass diffusion blocks;

host rock property data including host rock density and host rock porosity;

transportation property data including a transportation Darcy flow rate, a transportation crack diffusion coefficient, a transportation rock mass diffusion coefficient, and a transportation dispersivity;

nuclide flux input data;

nuclide concentration output timetable data;

nuclide decay chain data including a host nuclide title, nuclide half-life, and sub-nuclide data; and sorption coefficient data for a chemical element within a host rock.

5. The non-transitory computer readable storage medium as recited in claim 2, wherein the basic data for the biosphere dose assessment data input sub-system comprises:

a far-field nuclide release rate;

a nuclide percentage for entering a well;

an annual outlet volume of the well;

an annual drinking water volume of an individual; and an annual dose rate.

6. The non-transitory computer readable storage medium as recited in claim 1, wherein said parameter setting sub-system further comprises:

a fixed parameter sub-system for setting a fixed parameter; and a distributive parameter sub-system for setting a distributive parameter, comprising:

a Latin Hypercube Sampling sub-system for calculating a Latin Hypercube Sampling; and a Monte Carlo random Sampling sub-system for calculating a Monte Carlo Random Sampling.

7. The non-transitory computer readable storage medium as recited in claim 1, wherein the near-field release assessment sub-system further comprises a preparation sub-system for inputting a data file to the near-field release assessment sub-system, a single-running sub-system for implementing a single calculation according to a set parameter, and a multiple-running sub-system for implementing a multiple-calculation according to the set parameter;

wherein the preparation sub-system further comprises:

a disposal facility design and the geologic property correlative setting sub-system for setting a pre-calculated parameter, a correlative value between the pre-calculated parameter and a variable sensitivity from the near-field release assessment sub-system, and a random parameter from the near-field release assessment sub-system;

a chemical element solubility correlative setting sub-system for setting a chemical element solubility;

a chemical element's sorption coefficient correlative setting sub-system in buffered materials for setting a chemical element sorption coefficient in buffered materials;

a chemical element's sorption coefficient correlative setting sub-system in host rock for setting a chemical element's sorption coefficient correlative value in host rock; and a chemical element's sorption coefficient correlative setting sub-system for the erosion in waste tanks for setting a chemical element's sorption coefficient correlative value for the erosion in waste tanks; and wherein the multiple-running sub-system further comprises:

a pre-calculated parameter data sub-system for selecting a variable sensitivity parameter;

a pre-calculated parameter and the correlative setting sub-system for calculating a correlating sensitivity between the pre-calculated parameter and an assessment variable from the near-field release assessment sub-system;

a near-field release assessment sub-system in random parameter sub-system for setting a correlative assessing variable sensitivity parameter for the near-field release assessment sub-system;

a chemical element solubility setting sub-system for setting a the assessing variable sensitivity parameter;

a chemical element's sorption coefficient setting in sub-system host rock for setting a assessing variable sensitivity parameter;

a chemical element's sorption coefficient setting sub-system in the buffered materials for setting an assessing variable sensitivity parameter;

a chemical element's sorption coefficient setting sub-system for the erosion in waste tanks for setting an assessing the variable sensitivity parameter;

a data arrangement sub-system for assessing a result data arrangement, comprising: a random arrangement sub-system for assessing the result data arrangement by random method, a non-correlative arrangement sub-system for assessing the result data arrangement by the non-correlative method, and a specific correlative arrangement sub-system for assessing the result data arrangement by the specific correlative method.

8. The non-transitory computer readable storage medium as recited in claim 1, wherein the near-field release assessment sub-system further comprises:

a file function sub-system for managing a data file for the near-field release assessment sub-system, comprises:

an implementing previous data file sub-system, for calculating the existed data file;

an existing file sub-system, for managing an existed data file; and an establishing new data file sub-system, for creating a new data file;

wherein the implementing previous data file sub-system comprises:

a nuclide decay chain, half-life, and sorption coefficient data setting sub-system, for selecting a released nuclide name, a half-life, and a decay chain from the near-field release assessment sub-system;

a data of natural barrier system (NBS) property setting sub-system, for selecting a natural barrier system (NBS) property file;

a calculation and implementing data setting sub-system, for selecting an existed calculated data file; and a complete implementing sub-system, for distributing the released nuclide name, the half-life, the decay chain, the sorption coefficient, the natural barrier system property file, and a calculated data file;

a save file function sub-system, for saving data file for the near-field release assessment sub-system, comprises:

a data save sub-system, for saving the nuclide decay chain, the half-life and the sorption coefficient;

a natural barrier system (NBS) property data save sub-system, for saving the natural barrier system (NBS) property;

a program implementation setting data save sub-system, for saving a setting data of program implementation; and a complete implementing case save sub-system, for completing saving of the data saving sub-system, the NBS property data save sub-system, and the program implementation setting data save sub-system;

an insert file function sub-system, for inserting other new content of nuclide data;

a clear file function sub-system, for deleting nuclide data, including the decay chain, the half-life, the sorption coefficient, and element's sorption coefficient in the host rock;

a review file function sub-system, for reviewing a program implementing data input file, a program implementing output file, a and program implementing output explanatory file;

a drawing function sub-system, for creating and displaying a result figure of the calculation from the near-field release assessment sub-system, comprises:

a recently implemented case sub-system, for retrieving and displaying recent calculation from the near-field release assessment sub-system;

a previously implemented case sub-system for displaying a correlative result and figure of selected file;

a modified Y-axis sub-system for modifying and displaying maximum and minimum values for Y-axis value;

a modified X-axis sub-system for modifying and displaying maximum and minimum values for X-axis value;

an adding figure sub-system for displaying different output results in a same figure by stacking multiple figure outputs; and a Work Directory sub-system for displaying, replacing, and establish work directory.

9. The non-transitory computer readable storage medium as recited in claim 1, wherein the far-field release assessment sub-system further comprises:

a geometry property setting sub-system for setting a geometry property data;

a host rock property setting sub-system for setting a host rock property data;

a transport property setting sub-system for setting a transportation property data;

a nuclide flux input file setting sub-system for setting a nuclide flux input file setting data;

a nuclide concentration output time setting sub-system for setting a nuclide concentration output time setting data;

an assessing the release rate for the nuclide decay chain setting sub-system for setting a nuclide decay chain data; and a chemical element's sorption coefficient sub-system for setting a chemical element's sorption coefficient in the host rock.

10. The non-transitory computer readable storage medium as recited in claim 1, wherein the far-field release assessment sub-system further comprises:

a file function sub-system, for managing data file for the far-field release assessment sub-system, comprises:

an existing file sub-system, for managing an existed data file, comprises:

a nuclide decay chain, half-life, and sorption coefficient data setting sub-system, for selecting a released nuclide name, a half-life, and a decay chain from the far-field release assessment sub-system;

a data of natural barrier system (NBS) property setting sub-system, for selecting a natural barrier system (NBS) property file;

a calculation and implementing data setting sub-system, for selecting an existed calculated data file; and a complete implementing sub-system, for distributing the released nuclide name, the half-life, the decay chain, the sorption coefficient, the natural barrier system property file, and a calculated data file; and an establishing new data file sub-system, for creating a new data file;

an implementing previous data file sub-system, for calculating the existed data file;

a file processing sub-system, for file management, comprises:

a file mergence sub-system, for file merging;

a file name changing sub-system, for file renaming; and a file delete sub-system, for file deletion;

a save file function sub-system, for saving data file for the far-field release assessment sub-system, comprises:

a data save sub-system, for saving the nuclide decay chain, the half-life and the sorption coefficient;

a natural barrier system (NBS) property data save sub-system, for saving the natural barrier system (NBS) property;

a program implementation setting data save sub-system, for saving a setting data of program implementation; and a complete implementing case save sub-system, for completing saving of the data saving sub-system, the NBS property data save sub-system, and the program implementation setting data save sub-system;

an insert file function sub-system, for inserting other new content of nuclide data;

a clear file function sub-system, for deleting nuclide data, including the decay chain, the half-life, the sorption coefficient, and element's sorption coefficient in the host rock;

a review file function sub-system, for reviewing a program implementing data input file, a program implementing output file, a and program implementing output explanatory file;

a drawing function sub-system, for creating and displaying a result figure of the calculation from the far-field release assessment sub-system, comprises:

a recently implemented case sub-system, for retrieving and displaying recent calculation from the far-field release assessment sub-system;

a previously implemented case sub-system, for correlated data and figures for a selected file;

a modified Y-axis sub-system, for modifying and displaying a maximum value and a minimum value for Y-axis;

a modified X-axis sub-system, for modifying and displaying a maximum value and a minimum value for X-axis; and a figure insertion sub-system, for creating a new figure by stacking and overlapping selected figures; and a work directory sub-system, for displaying a current display directory, updating the current work directory, and creating a new work directory.

11. The non-transitory computer readable storage medium as recited in claim 1, wherein the far-field release assessment sub-system further comprises:

a far-field release assessment preparation sub-system, for multiple calculations, comprises:

a disposal facility design and geologic property correlative setting sub-system, for setting pre-calculated parameter adopting the near-field release assessment sub-system to assess the correlative value of a variable sensitivity, and a random parameter of the near-field release assessment sub-system; and a chemical element's sorption coefficient in a host rock setting sub-system, for setting a correlative value of chemical element's sorption coefficient in the host rock; and a single-calculation sub-system, for implementing a single calculation according to the set parameter; and a multi-calculation sub-system, for implementing a multiple calculations according to the set parameter, and the multiple-calculation sub-system further comprises:

a pre-calculated parameter sub-system, for selecting a variable sensitivity assessing parameter;

a pre-calculated parameter and far-field release assessment correlative setting sub-system, for correlating the variable sensitivity and the pre-calculated parameter;

a far-field release assessment random parameter sub-system, for setting a correlative near-field release assessment parameter for assessing variable sensitivity;

a chemical element's sorption coefficient setting sub-system in a host rock, for setting the assessing the variable sensitivity parameter; and a data arrangement sub-system, for setting result data arrangement, comprises:

a random arrangement sub-system, for arranging a result data in a random method;

a non-correlative arrangement sub-system, for arranging the result data in a non-correlative method; and a specific correlative arrangement sub-system, for arranging the result data in a specific correlative method.

12. The non-transitory computer readable storage medium as recited in claim 1, wherein the multiple calculation sub-system further comprises:

a file control sub-system, for merging files, changing file names, and deleting files;

a drawing sub-system, for displaying output of the near-field release assessment sub-system and the far-field release assessment sub-system further comprises:

a previously implemented case sub-system, for displaying is used to display an existing completed calculation;

a modified Y-axis sub-system, for modifying a maximum value and a minimum value for Y-axis; and a modified X-axis sub-system, for modifying a maximum value and a minimum value for X-axis;

a work directory sub-system, for displaying a current work directory, and for switching the current work direction and creating a new work directory;

a near-field release assessment multiple calculation sub-system, for selecting file data from a preparation system for the multiple running, and conducting multiple calculations for the near-field release assessment sub-system, and for setting final implementation and nuclide number;

a far field release assessment multiple calculation sub-system, for selecting file data from the preparation system, and conducting multiple calculations for the far-field release assessment sub-system, and for setting final implementation and nuclide number;

a suspended sub-system, for suspending any calculation for the near-field release assessment sub-system or far-field release assessment sub-system; and a display function sub-system, for displaying a set time consumption, a implementation round, a current time consumption, and a time increment, wherein the set time consumption indicates a set time with 1 as default in unit of second for activating a verification process after calculation starts, the time increment indicates a time interval with 1 as default for repeating the verification process, and the implementation round indicates number of calculations, and the current time consumption indicates a total consumed time in unit of second the multiple calculation sub-system.

13. The non-transitory computer readable storage medium as recited in claim 1, wherein the uncertainty analysis sub-system and sensitivity analysis sub-system further comprises:

a file control sub-system for controlling a file, comprising an open sub-system and a save sub-system; wherein the open sub-system opens a multiple-calculation figure;

a probability analysis sub-system for calculating a probability analysis;

a sensitivity analysis sub-system for calculating a sensitivity analysis;

a work directory control sub-system for controlling a work directory;

a program verification sub-system for result verifying;

a text display sub-system for data displaying, resetting any buffered transitional data, and resetting end result; and a drawing sub-system for displaying a multiple-calculation result from the near-field release assessment sub-system, the far-field release assessment sub-system, a complementary cumulative distribution function (CCDF) result from the complementary cumulative distribution function (CCDF), and a multiple scatter plot for the a complementary cumulative distribution function (CCDF) result;

wherein the save sub-system further comprises:

a fixed time release rate complementary cumulative distribution function (CCDF) data sub-system, for selecting an assessing time point and for storing a fixed time release rate CCDF file with a filed time release rate CCDF file name;

a release rate peak CCDF data sub-system, for storing a release rate peak CCDF file with a release rate peak CCDF file name;

a peak occurrence time CCDF data sub-system for storing a peak occurrence time CCDF file with a peak occurrence time CCDF file name; and a percentage total release rate curve sub-system for automatically setting a percentage total release rate curve file name and storing a percentage total release rate curve data;

wherein the probability analysis sub-system further comprises:

a probability analysis fixed time release rate sub-system, for selecting a probability analysis time and outputting an annual release flow rate (Bq/year) CCDF figure in a multiple-calculation model;

a probability analysis release rate peak sub-system, for outputting a peak realse flow rate (Bq/year) CCDF figure in each calculation in the multiple-calculation model; and a probability analysis peak occurrence time sub-system, among which, for outputting a peak release flow rate occurrence time (year) in each calculation in the multiple-calculation model; and wherein the sensitivity analysis sub-system further comprises:

a sensitivity analysis fixed time release rate sub-system;

a sensitivity analysis release rate peak sub-system; and a sensitivity analysis peak occurrence time sub-system;

wherein the sensitivity analysis fixed time release rate sub-system further comprises:

a sensitivity analysis fixed time release rate data non-transformed sub-system, for selecting sensitivity analysis time with a regression equation parameter when a regression equation selected value F>=0.01, without the regression equation parameter when the regression equation value F<=0.009, and a tolerance of 0.00001~0.01;

a sensitivity analysis fixed time release rate data rank transformed sub-system, for ranking parameter data for a regression analysis; and a sensitivity analysis fixed time release rate data log-transformed sub-system, for conducting a data log-transformed process with a logarithmic value, and conducting a regression analysis;

wherein the sensitivity analysis release rate peak sub-system further comprises:

a release rate peak data non-transformed sub-system, for selecting a release rate peak analyzing time, and selectable values are F VALUE (>=0.01) when the regression equation parameter is included by regression equation, and F VALUE(<=0.009) when the regression equation parameter is eliminated by regression equation; and conducting the regression analysis with the tolerance (0.00001~0.01);

a release rate peak data rank transformed sub-system, for ranking parameter data, and then conducting the regression analysis; and a release rate peak data log-transformed sub-system, for conducting log-transformed process on the parameter data, and then continuously conducting the regression analysis; and wherein the sensitivity analysis peak occurrence time sub-system further comprises:

a peak occurrence time data non-transformed sub-system, for selecting a peak occurrence analysis time, with selectable values F VALUE>=0.01 when the regression equation parameter is included by regression equation, and F VALUE<=0.009 when that regression equation parameter is eliminated by regression equation, and conducting the regression analysis with the tolerance (0.00001-0.01);

a peak occurrence time data Rank transformed sub-system, for ranking parameter data, and then conducting the regression analysis; and a peak occurrence time data log-transformed sub-system, for conducting a log-transformed process on parameter data, and then continuously conducting the regression analysis; and wherein the Drawing sub-system further comprises:

a modified Y-axis sub-system;

a modified X-axis sub-system;

a drawing scatter plot sub-system, for depicting and displaying the scatter plot;

a display scatter plot parameter name tag sub-system, for a display scatter plot parameter name tag sub-system, for adding a correspondent parameter title to the scatter plot;

a magnified CCDF sub-system, for magnifying or shrinking CCDF figure; and an adding figure sub-system, for adding a base case into the multiple-executing figure for comparison; and wherein the modified Y-axis sub-system further comprises:

a modified Y-axis maximum value sub-system, for modifying a maximum value of Y-axis in the multiple-calculation analysis figure; and a modified Y-axis minimum value sub-system, for modifying a minimum value of Y-axis in the multiple-calculation analysis figure; and wherein the modified X-axis sub-system further comprises:

a modified X-axis maximum value sub-system, for modifying a maximum value of X-axis in the multiple-calculation analysis figure; and a modified X-axis minimum value sub-system, for modifying a minimum value of X-axis in the multiple-calculation analysis figure.

* * * * *